US012804548B2

(12) United States Patent
Zhou et al.

(10) Patent No.: US 12,804,548 B2
(45) Date of Patent: Nov. 17, 2026

(54) CHANNEL STATE INFORMATION CONFIGURATION AND REPORTING IN ENERGY SAVING

(71) Applicant: Ofinno, LLC, Reston, VA (US)

(72) Inventors: Hua Zhou, Vienna, VA (US); Ali Cagatay Cirik, Chantilly, VA (US); Esmael Hejazi Dinan, McLean, VA (US); Hyoungsuk Jeon, Centreville, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/667,698

(22) Filed: May 17, 2024

(65) Prior Publication Data

US 2024/0340796 A1 Oct. 10, 2024

Related U.S. Application Data

(63) Continuation of application No. PCT/US2023/017459, filed on Apr. 4, 2023.

(Continued)

(51) Int. Cl.

*H04W 52/02* (2009.01)
*H04B 7/06* (2006.01)
*H04L 1/00* (2006.01)

(52) U.S. Cl.

CPC ...... *H04W 52/0235* (2013.01); *H04B 7/0626* (2013.01); *H04L 1/0027* (2013.01)

(58) Field of Classification Search

CPC ..... H04W 36/00222; H04W 36/00698; H04W 36/302; H04W 48/18; H04W 76/30;

(Continued)

(56) References Cited

U.S. PATENT DOCUMENTS 11,191,071 B2 11/2021 et al.
11,229,022 B2 1/2022 Lin et al.

(Continued)

FOREIGN PATENT DOCUMENTS

CN 111757438 A 10/2020
EP 3 598 806 A1 1/2020

(Continued)

OTHER PUBLICATIONS

3GPP TR 36.887 V12.0.0 (Jun. 2014); Technical Report; 3rd Generation Partnership Project; Technical Specification Group Radio Access Network; Evolved Universal Terrestrial Radio Access Network; (E-UTRAN); Study on energy saving enhancement for E-UTRAN; (Release 12).

(Continued)

*Primary Examiner* — Omer S Mian

(74) *Attorney, Agent, or Firm* — Jacob L. Mangan; Kavon Nasabzadeh; Brett K. Gardner

(57) ABSTRACT

A wireless device receives one or more radio resource control (RRC) messages indicating configuration parameters of a first number of periodic channel state information (CSI) reference signals (P-CSI-RSs) of a cell. The wireless device receives, via the cell, the P-CSI-RSs. The wireless device receives a DCI comprising an energy saving indication indicating a transition of the cell from a non-energy-saving state to an energy saving state. Based on receiving the DCI and during the energy saving state, the wireless device stops receiving a second number of P-CSI-RSs of the first number of the P-CSI-RSs and receives a third number of P-CSI-RSs of the first number of the P-CSI-RSs. The wireless device transmits a CSI report obtained based on the third number of P-CSI-RSs.

20 Claims, 46 Drawing Sheets

Related U.S. Application Data

(60) Provisional application No. 63/331,470, filed on Apr. 15, 2022.

(58) Field of Classification Search
CPC ............ H04W 36/0027; H04W 48/20; H04W 52/0212; H04W 72/23; H04W 80/02; H04W 52/0229; H04W 52/0245; H04W 52/028; H04W 52/0216; H04B 7/0417; Y02D 30/70
USPC ........................................................ 370/311
See application file for complete search history.

(56) References Cited

U.S. PATENT DOCUMENTS

| | | | |
|---|---|---|---|
| 11,979,833 B2 | 5/2024 | Noh et al. | |
| 2011/0170466 A1 | 7/2011 | Kwun | |
| 2014/0302855 A1 | 10/2014 | Nory et al. | |
| 2015/0009877 A1 | 1/2015 | Chiang et al. | |
| 2016/0174150 A1 | 6/2016 | Comsa et al. | |
| 2017/0195031 A1* | 7/2017 | Onggosanusi | H04B 7/0632 |
| 2018/0279343 A1 | 9/2018 | Zhou et al. | |
| 2019/0149213 A1 | 5/2019 | Zhou et al. | |
| 2019/0289552 A1 | 9/2019 | Jain et al. | |
| 2019/0356438 A1 | 11/2019 | Lee et al. | |
| 2019/0357221 A1 | 11/2019 | Davydov et al. | |
| 2020/0067631 A1 | 2/2020 | Kakishima et al. | |
| 2020/0119800 A1 | 4/2020 | Rune et al. | |
| 2020/0351674 A1 | 11/2020 | Zhou et al. | |
| 2021/0258900 A1 | 8/2021 | Park et al. | |
| 2021/0336687 A1 | 10/2021 | Pezeshki et al. | |
| 2021/0351826 A1* | 11/2021 | Wei | H04L 1/20 |
| 2021/0360667 A1 | 11/2021 | Moon et al. | |
| 2021/0409148 A1 | 12/2021 | Xu et al. | |
| 2022/0060223 A1* | 2/2022 | Jung | H04W 72/23 |
| 2022/0132564 A1* | 4/2022 | Ouchi | H04W 72/0453 |
| 2023/0080106 A1 | 3/2023 | Ji et al. | |
| 2023/0090986 A1* | 3/2023 | Jang | H04W 56/001 370/329 |
| 2023/0362817 A1* | 11/2023 | Da Silva | H04W 24/10 |
| 2024/0236857 A1* | 7/2024 | Abdelghaffar | H04W 52/0229 |
| 2024/0284233 A1* | 8/2024 | Maleki | H04L 5/0048 |

FOREIGN PATENT DOCUMENTS

| | | |
|---|---|---|
| WO | 2012/092066 A1 | 7/2012 |
| WO | 2021015475 A1 | 1/2021 |
| WO | 2023/114493 A1 | 6/2023 |
| WO | 2023/196223 A1 | 10/2023 |

OTHER PUBLICATIONS

3GPP TR 36.927 V16.0.0 (Jul. 2020); Technical Report; 3rd Generation Partnership Project; Technical Specification Group Radio Access Network; Evolved Universal Terrestrial Radio Access (E-UTRA); Potential solutions for energy saving for E-UTRAN; (Release 16).

3GPP TS 38.133 V17.4.0 (Dec. 2021); Technical Specification; 3rd Generation Partnership Project; Technical Specification Group Radio Access Network; NR; Requirements for support of radio resource management; (Release 17).

3GPP TS 38.212 V16.4.0 (Dec. 2020); Technical Specification; 3rd Generation Partnership Project; Technical Specification Group Radio Access Network; NR; Multiplexing and channel coding; (Release 16).

3GPP TS 38.213 V17.0.0 (Dec. 2021); Technical Specification; 3rd Generation Partnership Project; Technical Specification Group Radio Access Network; NR; Physical layer procedures for control; (Release 17).

3GPP TS 38.214 V16.4.0 (Dec. 2020); Technical Specification; 3rd Generation Partnership Project; Technical Specification Group Radio Access Network; NR; Physical layer procedures for data; (Release 16) .

3GPP TS 38.215 V16.0.1 (Jan. 2020); Technical Specification; 3rd Generation Partnership Project; Technical Specification Group Radio Access Network; NR; Physical layer measurements; (Release 16).

3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).

3GPP TS 38.321 V16.7.0 (Dec. 2021); Technical Specification; 3rd Generation Partnership Project; Technical Specification Group Radio Access Network; NR; Medium Access Control (MAC) protocol specification; (Release 16).

3GPP TS 38.331 V16.7.0 (Dec. 2021); Technical Specification; 3rd Generation Partnership Project; Technical Specification Group Radio Access Network; NR; Radio Resource Control (RRC) protocol specification; (Release 16).

R3-212523; 3GPP TSG-RAN WG3 Meeting #112-e; May 17-27, 2021, E-meeting; Title: Further discussions on detailed procedure and potential specification impacts of energy saving; Source: Huawei; Agenda item: 18.3; Document Type: Other.

RP-211663; 3GPP TSG RAN Meeting #93-e; Electronic Meeting, Sep. 13-17, 2021; Source: Huawei, HiSilicon; Title: Moderator's summary for discussion [RAN93e-R18Prep-13] Network energy savings; Agenda item: 9.0.1; Document for: Discussion and decision.

RP-212669; 3GPP TSG RAN Meeting #94-e; Electronic Meeting, Dec. 6-17, 2021; Source: Huawei; Title: Moderator's summary for [RAN94e-R18Prep-09] Network energy savings; Agenda item: 8A. 1; Document for: Discussion and decision.

RP-212709; 3GPP TSG RAN Meeting #94e; Electronic Meeting, Dec. 6-17, 2021 (revision of RP-21xxxx); Source: Moderator (Huawei); Title: New study on network energy savings for 5G; Document for: Approval; Agenda Item: 8A.1.

RWS-210064; 3GPP TSG RAN Rel-18 workshop; Electronic Meeting, Jun. 28-Jul. 2, 2021; Agenda Item: 4.3; Source: Spreadtrum Communications; Title: UE power saving enhancements for R18; Document for: Discussion and decision.

RWS-210106; 3GPP TSG RAN Rel-18 Workshop; Jun. 28-Jul. 2, 2021; Agenda Item 4.3; [x-area] System Energy Enhancements; MediaTek Inc.

RWS-210110; 3GPP TSG RAN Rel-18 Workshop; Electronic Meeting, Jun. 28-Jul. 2, 2021; Source: MediaTek Inc.; Title: Draft WID: System Energy Efficiency Enhancements; Type: WID new; Document for: Discussion; Agenda Item: 4.3; Release Rel-18.

RWS-210118; Network Energy Efficiency in Rel-18; RAN Rel-18 Workshop; Jun. 28-Jul. 2, 2021; Nokia, Nokia Shanghai Bell.

RWS-210152; 3GPP TSG RAN Rel-18 workshop; Electronic Meeting, Jun. 28-Jul. 2, 2021; Source: China Telecom; Title: Draft SID on NR network energy saving enhancement; Document for: Discussion; Agenda Item: 4.3.

RWS-210153; 3GPP TSG RAN Rel-18 workshop; Electronic Meeting, Jun. 28-Jul. 2, 2021; Agenda: 4.3; Title: NR network energy saving enhancement for Rel-18; Source: China Telecom.

RWS 210168; 3GPP TSG RAN Rel; 18 workshop; Electronic Meeting, Jun. 28-Jul. 2, 2021; Motivation for new study item on ultra low power wake up signal in Rel 18; Source: vivo; Spreadtrum communications, Guangdong Genius; Document for: Discussion & Decision; Agenda Item: 4.3.

RWS 210281; 3GPP Rel-18 Workshop: 5G-Advanced Electronic Meeting, Jun. 28-Jul. 2, 2021; Source: LGU+; Title: LG Uplus views on Rel-18 Non eMBB area.

RWS-210310; 3GPP TSG RAN Rel-18 workshop; Electronic Meeting; Jun. 28-Jul. 2, 2021; Agenda Item: 4.1; Title: Motivation for Network Energy Saving in Rel-18; Source: Ericsson.

RWS-210311; 3GPP TSG RAN Rel-18 workshop; Electronic Meeting, Jun. 28-Jul. 2, 2021; Source: Ericsson; Title: New SID on NR Network Energy Saving ; Document for: Discussion; Agenda Item: 4.1.

RWS-210312; 3GPP TSG RAN Rel-18 workshop; Electronic Meeting; Jun. 28-Jul. 2, 2021; Agenda Item: 4.1; Title: Views on NR UE Power Saving in Rel-18; Source: Ericsson.

(56) References Cited

OTHER PUBLICATIONS

RWS-210358; 3GPP TSG RAN Rel-18 workshop; Electronic Meeting, Jun. 28-Jul. 2, 2021; Title: Network energy saving; Agenda Item: 4.3; Source: CMCC.

RWS-210363; Agenda: 4.3; Document For: Discussion; Title: KT's View on cross functionalities for Release-18; Chungwoo Hwang; Jun. 28, 2021.

RWS 210398; 3GPP TSG RAN Rel-18 workshop; Electronic Meeting, Jun. 28-Jul. 2, 2021; Title: Network Power Savings in NR; Agenda Item: 4.3; Source: Lenovo, Motorola Mobility; Document for: Discussion.

RWS-210415; 3GPP TSG RAN Rel-18 workshop; Electronic Meeting, Jun. 28-Jul. 2, 2021; Agenda Item: 4.3; Source: CATT; Title: On energy saving in Rel-18; Document for: Information.

RWS-210438; 3GPP TSG RAN Meeting #92-e; Electronic Meeting, Jun. 28-Jul. 2, 2021; Source: Huawei, HiSilicon; Title: NR FR2 enhancements; Agenda item: 4.1; Document for: Discussion and decision.

RWS-210447; 3GPP TSG RAN Rel-18 workshop; Electronic Meeting, Jun. 28-Jul. 2, 2021; Source: Huawei, HiSilicon; Title: Network energy saving and green operation for NR; Agenda item: 4.3; Document for: Discussion and decision.

RWS-210462; 3GPP TSG RAN Rel-18 workshop; Electronic Meeting, Jun. 28-Jul. 2, 2021; Title: Energy Efficiency Improvements; Source: Vodafone; Agenda Item 4.3.

RWS-210486; 3GPP TSG RAN Rel-18 workshop; Electronic Meeting, Jun. 28-Jul. 2, 2021; Source: ZTE, Sanechips; Agenda: 4.3; Title: Discussion on network power saving for 5G Advanced.

RP-213309; 3GPP TSG RAN Meeting #94-e; Electronic Meeting, Dec. 6-17, 2021; Source: China Academy of Telecommunication Technology; Title: Views on Rel-18 Network Energy Saving.

International Search Report and Written Opinion of the International Searching authority mailed Aug. 23, 2023, in International Application No. PCT/US2023/017459.

European Office Action mailed Jan. 23, 2025 in EP Patent Application No. 23720003.5.

European Office Action mailed Jul. 11, 2025 in EP Patent Application No. 23720003.5.

R1-1711024; 3GPP TSG-RAN WG1 NR Ad-Hoc#2; Qingdao, China, Jun. 27-30, 2017; Source: Ericsson; Title: Further Details of the CSI Framework; Agenda Item: 5.1.2.3.1; Document for: Discussion and Decision.

R1-1909287; 3GPP TSG-RAN WG1 #98; Prague, Czech Republic, Aug. 26-30, 2019; Agenda item: 7.2.13.3; Source: Qualcomm Incorporated; Title: Fast SCG and SCell Activation; Document for: Discussion/Decision.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
| --- | --- |
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 23

```
MIB ::=                     SEQUENCE {
   systemFrameNumber            BIT STRING (SIZE (6)),
   subCarrierSpacingCommon      ENUMERATED {scs15or60, scs30or120},
   ssb-SubcarrierOffset         INTEGER (0..15),
   dmrs-TypeA-Position          ENUMERATED {pos2, pos3},
   pdcch-ConfigSIB1             PDCCH-ConfigSIB1,
   cellBarred                   ENUMERATED {barred, notBarred},
   intraFreqReselection         ENUMERATED {allowed, notAllowed},
   spare                        BIT STRING (SIZE (1))}

PDCCH-ConfigSIB1 ::=        SEQUENCE {
   controlResourceSetZero       ControlResourceSetZero,
   searchSpaceZero              SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | $O$ | Number of search space sets per slot | $M$ | First symbol index |
|---|---|---|---|---|
| 0 | 0 | 1 | 1 | 0 |
| 1 | 0 | 2 | 1/2 | {0, if $i$ is even}, {$N$, if is odd} |
| 2 | 2 | 1 | 1 | 0 |
| 3 | 2 | 2 | 1/2 | {0, if $i$ is even}, {$N$, if $i$ is odd} |
| 4 | 5 | 1 | 1 | 0 |
| 5 | 5 | 2 | 1/2 | {0, if $i$ is even}, $N$, if $i$ is odd |
| 6 | 7 | 1 | 1 | 0 |
| 7 | 7 | 2 | 1/2 | {0, if $i$ is even}, {$N$, if $i$ is odd} |
| ... | ... | ... | ... | ... |

FIG. 24C

```
SIB1 ::=      SEQUENCE {
   cellSelectionInfo              SEQUENCE {
      q-RxLevMin                     Q-RxLevMin,
      q-RxLevMinOffset                INTEGER (1..8) ...}
   cellAccessRelatedInfo           CellAccessRelatedInfo,
   connEstFailureControl           ConnEstFailureControl
   si-SchedulingInfo              SI-SchedulingInfo
   servingCellConfigCommon           ServingCellConfigCommonSIB
   ims-EmergencySupport             ENUMERATED {true}
   eCallOverIMS-Support            ENUMERATED {true}
   ue-TimersAndConstants             UE-TimersAndConstants
   uac-BarringInfo                SEQUENCE { ...}
   useFullResumeID                 ENUMERATED {true}
   lateNonCriticalExtension         OCTET STRING
   nonCriticalExtension            SIB1-v16xy-IEs  }

ServingCellConfigCommonSIB ::=     SEQUENCE {
   downlinkConfigCommon              DownlinkConfigCommonSIB,
   uplinkConfigCommon              UplinkConfigCommonSIB
   supplementaryUplink             UplinkConfigCommonSIB
   n-TimingAdvanceOffset             ENUMERATED { n0, n25600, n39936 }
   ssb-PositionsInBurst            SEQUENCE {
      inOneGroup                   BIT STRING (SIZE (8)),
      groupPresence                  BIT STRING (SIZE (8)) },
   ssb-PeriodicityServingCell        ENUMERATED {ms5, ms10, ms20, ms40, ms80, ms160},
   tdd-UL-DL-ConfigurationCommon      TDD-UL-DL-ConfigCommon
   ss-PBCH-BlockPower                INTEGER (-60..50),
   ...,}

DownlinkConfigCommonSIB ::=    SEQUENCE {
   frequencyInfoDL            FrequencyInfoDL-SIB,
   initialDownlinkBWP          BWP-DownlinkCommon,
   bcch-Config                BCCH-Config,
   pcch-Config                PCCH-Config,  ...}

PCCH-Config ::=          SEQUENCE {
   defaultPagingCycle             PagingCycle,
   nAndPagingFrameOffset             CHOICE {
      oneT                      NULL,
      halfT                     INTEGER (0..1), ...},
   ns                      ENUMERATED {four, two, one},
   firstPDCCH-MonitoringOccasionOfPO   CHOICE {
      sCS15KHZoneT       SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

FIG. 25

```
BWP-DownlinkCommon ::=          SEQUENCE {
   genericParameters            BWP,
   pdcch-ConfigCommon           SetupRelease { PDCCH-ConfigCommon }
   pdsch-ConfigCommon           SetupRelease { PDSCH-ConfigCommon }
   ...}
PDCCH-ConfigCommon ::=          SEQUENCE {
   controlResourceSetZero       ControlResourceSetZero
   commonControlResourceSet     ControlResourceSet
   searchSpaceZero              SearchSpaceZero
   commonSearchSpaceList        SEQUENCE (SIZE(1..4)) OF SearchSpace
   searchSpaceSIB1              SearchSpaceId
   searchSpaceOtherSystemInformation   SearchSpaceId
   pagingSearchSpace            SearchSpaceId
   ra-SearchSpace               SearchSpaceId
    [[
   firstPDCCH-MonitoringOccasionOfPO   CHOICE {
      sCS15KHZoneT    SEQUENCE (SIZE (1..maxPO-perPF)) OF INTEGER (0..139),
      ...
   }OPTIONAL    -- Cond OtherBWP
    ]]
   ...,}
PDCCH-ServingCellConfig ::=     SEQUENCE {
   slotFormatIndicator          SetupRelease { SlotFormatIndicator }...,
   [[
   availabilityIndicator-r16    SetupRelease {AvailabilityIndicator-r16}
   searchSpaceSwitchTimer-r16       INTEGER (1..80)
   ]]
}

SearchSpaceSwitchConfig-r16 ::=    SEQUENCE {
   cellGroupsForSwitchList-r16     SEQUENCE(SIZE (1..4)) OF CellGroupForSwitch-r16
   searchSpaceSwitchDelay-r16      INTEGER (10..52)
}
CellGroupForSwitch-r16 ::= SEQUENCE(SIZE (1..16)) OF ServCellIndex

ControlResourceSet ::=          SEQUENCE {
   controlResourceSetId         ControlResourceSetId,
   frequencyDomainResources     BIT STRING (SIZE (45)),
   duration                     INTEGER (1..maxCoReSetDuration),
   cce-REG-MappingType          CHOICE {
      interleaved               SEQUENCE {
         reg-BundleSize         ENUMERATED {n2, n3, n6},
         interleaverSize        ENUMERATED {n2, n3, n6},
         shiftIndex             INTEGER(0..maxNrofPhysicalResourceBlocks-1)},
      nonInterleaved            NULL},
   precoderGranularity          ENUMERATED {sameAsREG-bundle, allContiguousRBs},
   pdcch-DMRS-ScramblingID      INTEGER (0..65535)
   ...,  }
```

FIG. 26

```
SearchSpace ::=                    SEQUENCE {
   searchSpaceId                      SearchSpaceId,
   controlResourceSetId                  ControlResourceSetId
   monitoringSlotPeriodicityAndOffset      CHOICE {
      sl1                           NULL,
      sl2                           INTEGER (0..1),...}
   duration                         INTEGER (2..2559)
   monitoringSymbolsWithinSlot          BIT STRING (SIZE (14))
   nrofCandidates                    SEQUENCE {
      aggregationLevel1                  ENUMERATED {n0, n1, n2, ... n8},
      aggregationLevel2                  ENUMERATED {n0, n1, n2, ... n8},
      ...}
   searchSpaceType                    CHOICE {
      common                         SEQUENCE {
         dci-Format0-0-AndFormat1-0          SEQUENCE {...}
         dci-Format2-0                   SEQUENCE {
            nrofCandidates-SFI               SEQUENCE {
               aggregationLevel1               ENUMERATED {n1, n2}
               aggregationLevel2               ENUMERATED {n1, n2}...},
            ...}
         dci-Format2-1                   SEQUENCE {...}
...
      },
      ue-Specific                      SEQUENCE {
         dci-Formats       ENUMERATED {formats0-0-And-1-0, formats0-1-And-1-1},
         ...,}
   }
}

SearchSpaceExt-r16 ::=               SEQUENCE {
   controlResourceSetId-r16             ControlResourceSetId-r16
   searchSpaceType-r16                 SEQUENCE {
      common-r16                     SEQUENCE {
         dci-Format2-4-r16                SEQUENCE {
            nrofCandidates-CI-r16              SEQUENCE {
               aggregationLevel1-r16             ENUMERATED {n1, n2}...},...}
         dci-Format2-5-r16               SEQUENCE {
            nrofCandidates-IAB-r16             SEQUENCE {
               aggregationLevel1-r16             ENUMERATED {n1, n2}...},...}
         dci-Format2-6-r16                SEQUENCE {...}
         ...}
   }
   searchSpaceGroupIdList-r16        SEQUENCE (SIZE (1.. 2)) OF INTEGER (0..1)
   freqMonitorLocations-r16                BIT STRING (SIZE (5))
}

SearchSpaceSwitchTrigger-r16 ::=   SEQUENCE {
   servingCellId-r16            ServCellIndex,
   positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 32

| Row | Ports $X$ | Density $\rho$ | cdm-Type | $(\bar{k}, \bar{l})$ | CDM group index $j$ | $k'$ | $l'$ |
|---|---|---|---|---|---|---|---|
| 1 | 1 | 3 | noCDM | $(k_0,l_0)$, $(k_0+4,l_0)$, $(k_0+8,l_0)$ | 0,0,0 | 0 | 0 |
| 2 | 1 | 1, 0.5 | noCDM | $(k_0,l_0)$ | 0 | 0 | 0 |
| 3 | 2 | 1, 0.5 | fd-CDM2 | $(k_0,l_0)$ | 0 | 0,1 | 0 |
| 4 | 4 | 1 | fd-CDM2 | $(k_0,l_0)$, $(k_0+2,l_0)$ | 0,1 | 0,1 | 0 |
| 5 | 4 | 1 | fd-CDM2 | $(k_0,l_0)$, $(k_0,l_0+1)$ | 0,1 | 0,1 | 0 |
| 6 | 8 | 1 | fd-CDM2 | $(k_0,l_0)$, $(k_1,l_0)$, $(k_2,l_0)$,$(k_3,l_0)$ | 0,1,2,3 | 0,1 | 0 |
| 7 | 8 | 1 | fd-CDM2 | $(k_0,l_0)$, $(k_1,l_0)$, $(k_0,l_0+1)$,$(k_1,l_0+1)$ | 0,1,2,3 | 0,1 | 0 |
| 8 | 8 | 1 | cdm4-FD2-TD2 | $(k_0,l_0)$, $(k_1,l_0)$ | 0,1 | 0,1 | 0,1 |
| ⋮ | | | | | | | |
| 17 | 32 | 1, 0.5 | cdm4-FD2-TD2 | $(k_0,l_0)$, $(k_1,l_0)$, $(k_2,l_0)$, $(k_3,l_0)$,$(k_0,l_1)$, $(k_1,l_1)$, $(k_2,l_1)$, $(k_3,l_1)$ | 0,1,2,3,4,5,6,7 | 0,1 | 0,1 |
| 18 | 32 | 1, 0.5 | cdm8-FD2-TD4 | $(k_0,l_0)$, $(k_1,l_0)$, $(k_2,l_0)$,$(k_3,l_0)$ | 0,1,2,3 | 0,1 | 0,1,2,3 |

FIG. 35

```
CSI-RS-ResourceMapping ::=        SEQUENCE {
   frequencyDomainAllocation        CHOICE {
      row1                      BIT STRING (SIZE (4)),
      row2                      BIT STRING (SIZE (12)),
      row4                      BIT STRING (SIZE (3)),
   },
   nrofPorts                   ENUMERATED {p1,p2,p4,p8,p12,p16,p24,p32},
   firstOFDMSymbolInTimeDomain       INTEGER (0..13),
   firstOFDMSymbolInTimeDomain2       INTEGER (2..12)
   cdm-Type                     ENUMERATED {noCDM, fd-CDM2, cdm4-FD2-TD2, ...},
   density                     CHOICE {
      dot5                      ENUMERATED {evenPRBs, oddPRBs},
      one                       NULL,
      three                     NULL,
   },
   freqBand                    CSI-FrequencyOccupation,
...}

CSI-FrequencyOccupation ::=       SEQUENCE {
   startingRB                  INTEGER (0..maxNrofPhysicalResourceBlocks-1),
   nrofRBs                     INTEGER (24..maxNrofPhysicalResourceBlocksPlus1),
...}

NZP-CSI-RS-Resource ::=          SEQUENCE {
   nzp-CSI-RS-ResourceId            NZP-CSI-RS-ResourceId,
   resourceMapping               CSI-RS-ResourceMapping,
   powerControlOffset             INTEGER (-8..15),
   powerControlOffsetSS             ENUMERATED{db-3, db0, db3, db6}
   scramblingID                Scramblingld,
   periodicityAndOffset           CSI-ResourcePeriodicityAndOffset
   qcl-InfoPeriodicCSI-RS            TCI-StateId
...}

NZP-CSI-RS-ResourceSet ::=        SEQUENCE {
   nzp-CSI-ResourceSetId    NZP-CSI-RS-ResourceSetId,
   nzp-CSI-RS-Resources    SEQUENCE OF NZP-CSI-RS-ResourceId,
   repetition                ENUMERATED { on, off }
   aperiodicTriggeringOffset         INTEGER(0..6)
   trs-Info                 ENUMERATED {true}
   ...,}


CSI-ResourceConfig ::=     SEQUENCE {
   csi-ResourceConfigId      CSI-ResourceConfigId,
   csi-RS-ResourceSetList     CHOICE {
      nzp-CSI-RS-SSB           SEQUENCE {
         nzp-CSI-RS-ResourceSetList  SEQUENCE OF NZP-CSI-RS-ResourceSetId
         csi-SSB-ResourceSetList    SEQUENCE OF CSI-SSB-ResourceSetId
      },...
   },
   bwp-Id                BWP-Id,
   resourceType             ENUMERATED { aperiodic, semiPersistent, periodic },
   ...}
```

FIG. 36

```
CSI-ReportConfig ::=            SEQUENCE {
  reportConfigId                  CSI-ReportConfigId,
  carrier                       ServCellIndex
  resourcesForChannelMeasurement        CSI-ResourceConfigId,
  csi-IM-ResourcesForInterference      CSI-ResourceConfigId
  nzp-CSI-RS-ResourcesForInterference    CSI-ResourceConfigId
  reportConfigType                CHOICE {
    periodic                    SEQUENCE {
      reportSlotConfig               CSI-ReportPeriodicityAndOffset,
      pucch-CSI-ResourceList  SEQUENCE OF PUCCH-CSI-Resource
    },
     ...
    aperiodic                    SEQUENCE {
      reportSlotOffsetList            SEQUENCE OF INTEGER(0..32)
    }
  },
  reportQuantity                  CHOICE {
    none                        NULL,
 ...
    cri-RSRP                      NULL,
    ssb-Index-RSRP                   NULL,
    cri-RI-LI-PMI-CQI                NULL
  },
  ...
  timeRestrictionForChannelMeasurements   ENUMERATED {configured, notConfigured},
  codebookConfig                      CodebookConfig
  groupBasedBeamReporting                 CHOICE {
    enabled                       NULL,
    disabled                      SEQUENCE {
      nrofReportedRS                  ENUMERATED {n1, n2, n3, n4}
    }
  },
  ...,
 }

CSI-ReportPeriodicityAndOffset ::=  CHOICE {
  slots4                      INTEGER(0..3),
  ...
  slots320                     INTEGER(0..319)}
```

FIG. 39

```
CSI-MeasConfig ::=              SEQUENCE {
...
   nzp-CSI-RS-ResourceSetToAddModList  SEQUENCE OF NZP-CSI-RS-ResourceSet
   csi-IM-ResourceToAddModList        SEQUENCE OF CSI-IM-Resource
   csi-IM-ResourceSetToAddModList     SEQUENCE OF CSI-IM-ResourceSet
   csi-SSB-ResourceSetToAddModList    SEQUENCE OF CSI-SSB-ResourceSet
   csi-ResourceConfigToAddModList     SEQUENCE  OF CSI-ResourceConfig
   csi-ReportConfigToAddModList       SEQUENCE  OF CSI-ReportConfig
   reportTriggerSize                  INTEGER (0..6)
   aperiodicTriggerStateList          SetupRelease { CSI-AperiodicTriggerStateList }
   ...,
}

ServingCellConfig ::=           SEQUENCE {
   tdd-UL-DL-ConfigurationDedicated   TDD-UL-DL-ConfigDedicated
   initialDownlinkBWP                 BWP-DownlinkDedicated
   downlinkBWP-ToReleaseList  SEQUENCE (SIZE (1..maxNrofBWPs)) OF BWP-Id
   downlinkBWP-ToAddModList  SEQUENCE (SIZE (1..maxNrofBWPs)) OF BWP-Downlink
   firstActiveDownlinkBWP-Id          BWP-Id
   bwp-InactivityTimer                ENUMERATED {ms2, ms3, ms4, ... }
   defaultDownlinkBWP-Id              BWP-Id
   uplinkConfig                       UplinkConfig
   supplementaryUplink                UplinkConfig
   pdcch-ServingCellConfig            SetupRelease { PDCCH-ServingCellConfig }
   pdsch-ServingCellConfig            SetupRelease { PDSCH-ServingCellConfig }
   csi-MeasConfig                     SetupRelease { CSI-MeasConfig }
   sCellDeactivationTimer             ENUMERATED {ms20, ms40, ms80,...}
...
}
```

FIG. 40

CHANNEL STATE INFORMATION CONFIGURATION AND REPORTING IN ENERGY SAVING

CROSS-REFERENCE TO RELATED APPLICATIONS

This application is a continuation of International Application No. PCT/US2023/017459, filed Apr. 4, 2023, which claims the benefit of U.S. Provisional Application No. 63/331,470, filed Apr. 15, 2022, all of which are hereby incorporated by reference in their entireties.

BRIEF DESCRIPTION OF THE DRAWINGS

Examples of several of the various embodiments of the present disclosure are described herein with reference to the drawings.

FIG. 19 illustrates an example of multiple LCIDs of downlink.

FIG. 20 illustrates an example of multiple LCIDs of uplink.

FIG. 23 illustrates examples of various DCI formats.

FIG. 24A illustrates an example of MIB message.

FIG. 24B illustrates an example of configuration of CORESET 0.

FIG. 24C illustrates an example of configuration of search space 0.

FIG. 25 illustrates an example of SIB1 message.

FIG. 26 illustrates an example of RRC configurations of a BWP, PDCCH, and a CORESET.

FIG. 27 illustrates an example of RRC configuration of a search space.

FIG. 32 illustrates an example of SSB configurations.

FIG. 35 illustrates an example of CSI-RS resource configuration.

FIG. 36 illustrates an example of RRC configuration of CSI-RS resource and resource set.

FIG. 39 illustrates an example of RRC configuration of CSI reporting.

FIG. 40 illustrates an example of RRC configuration of CSI reporting in a cell.

DETAILED DESCRIPTION

Figure 1A:
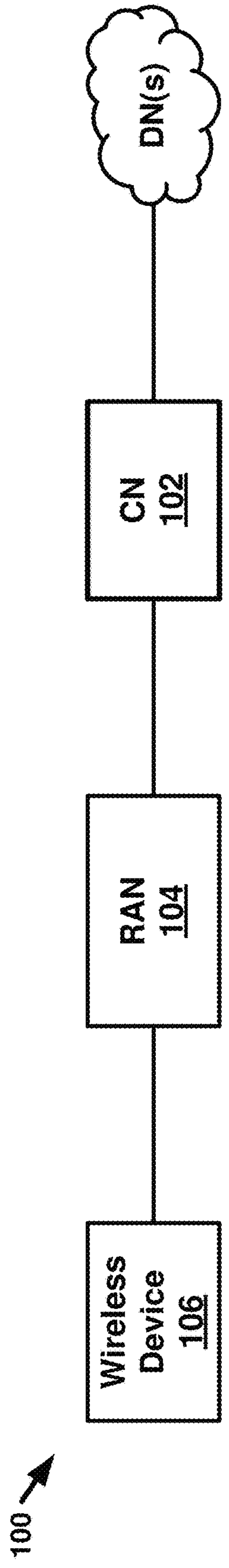
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
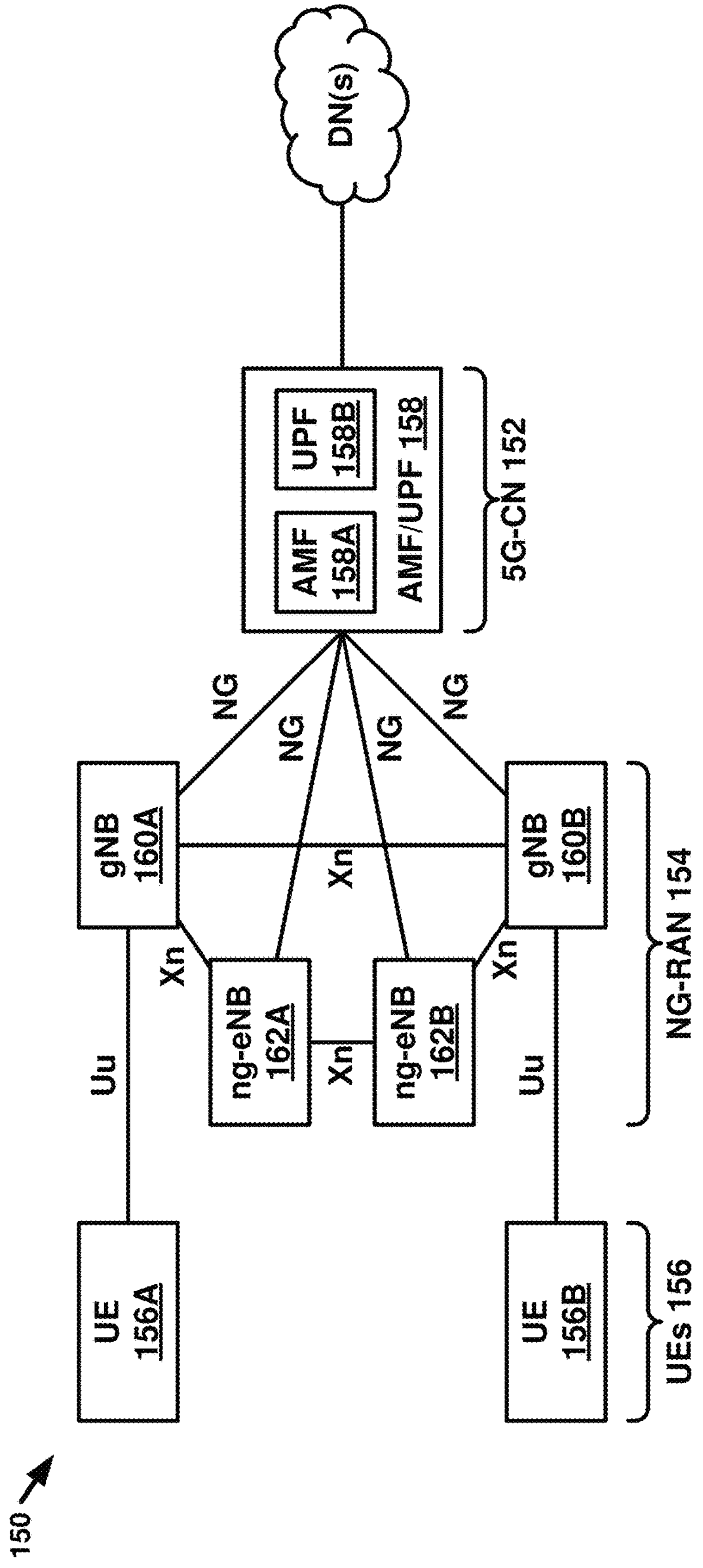

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
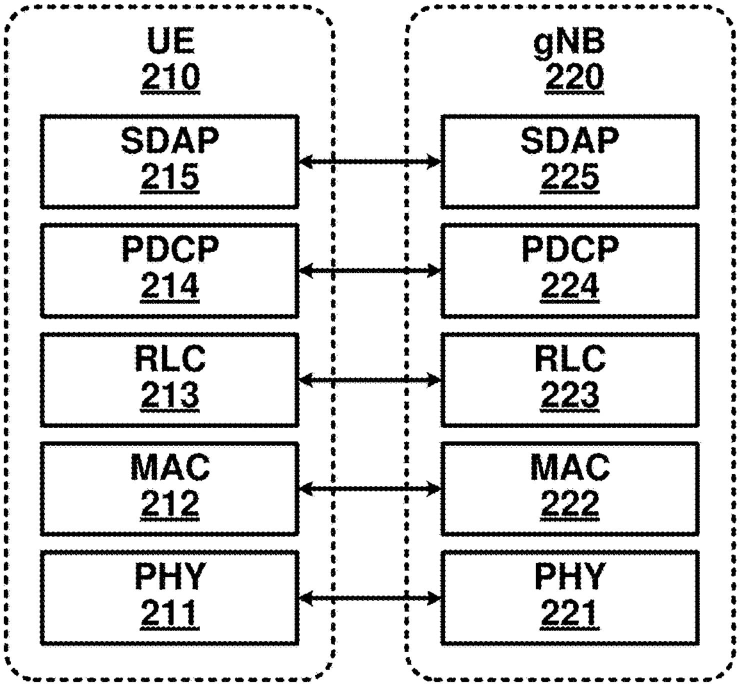
FIG. 2A and FIG. 2B respectively illustrate a New Radio (NR) user plane and control plane protocol stack.
Figure 2B:
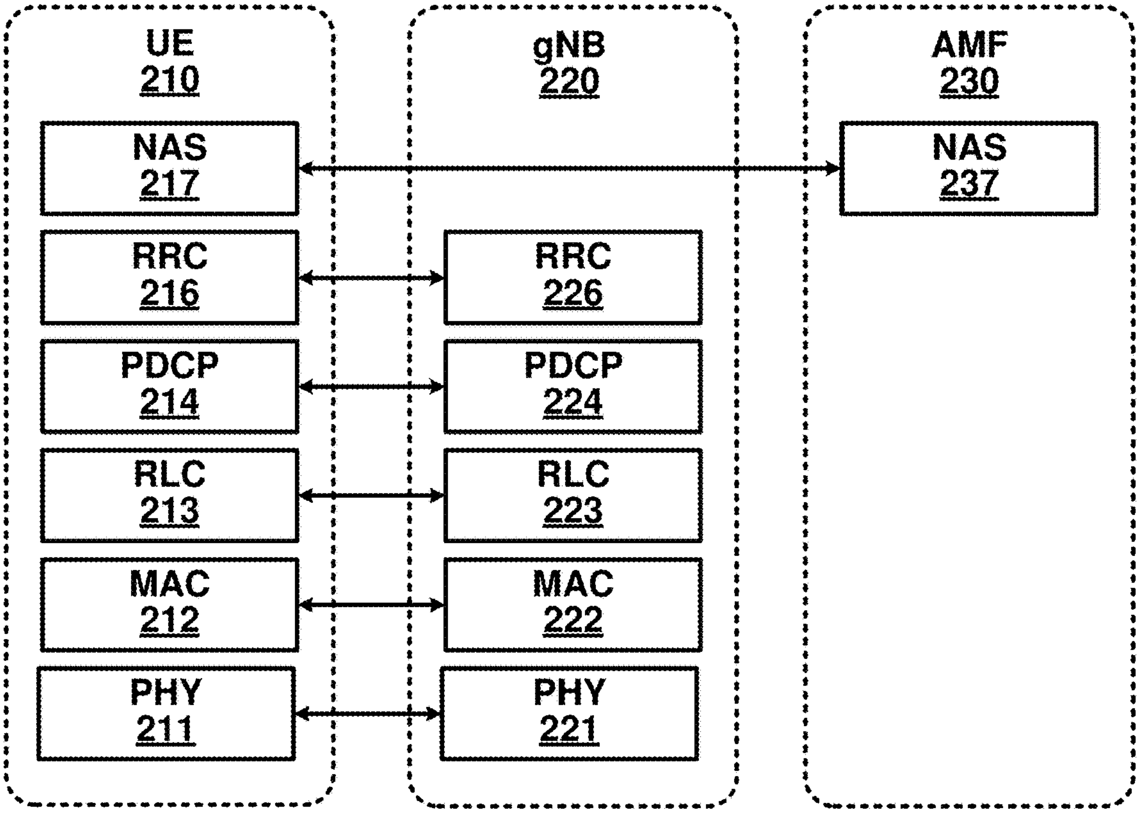

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
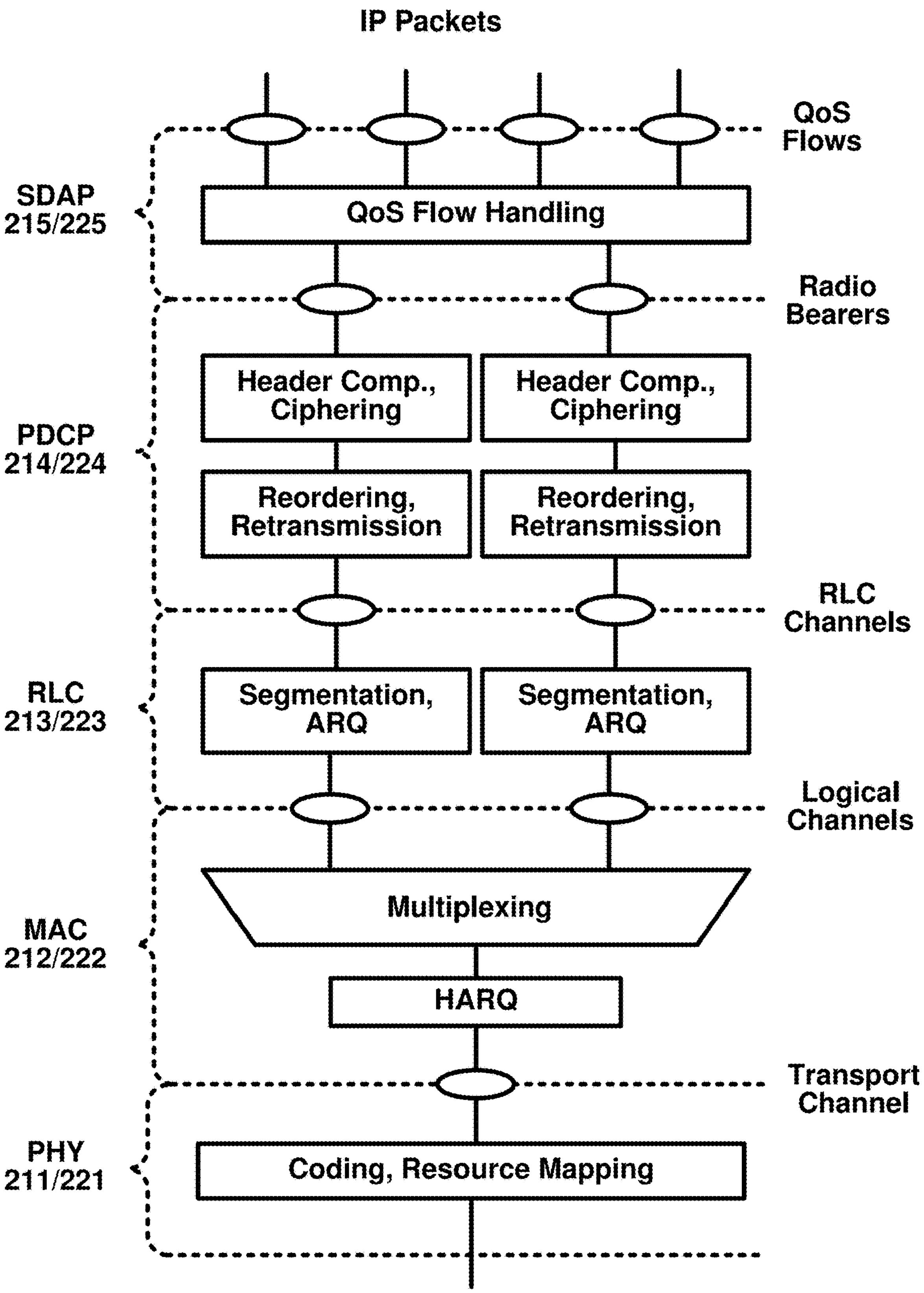
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
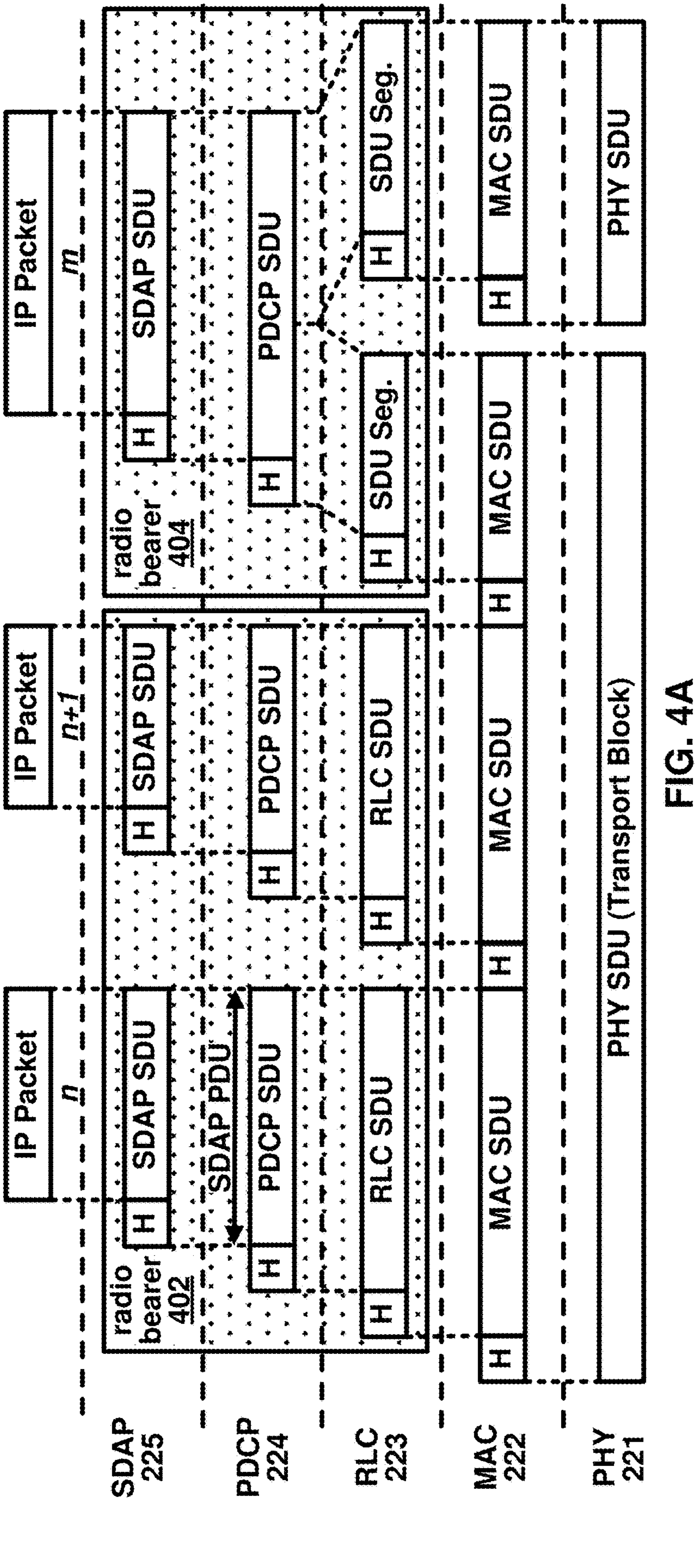
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
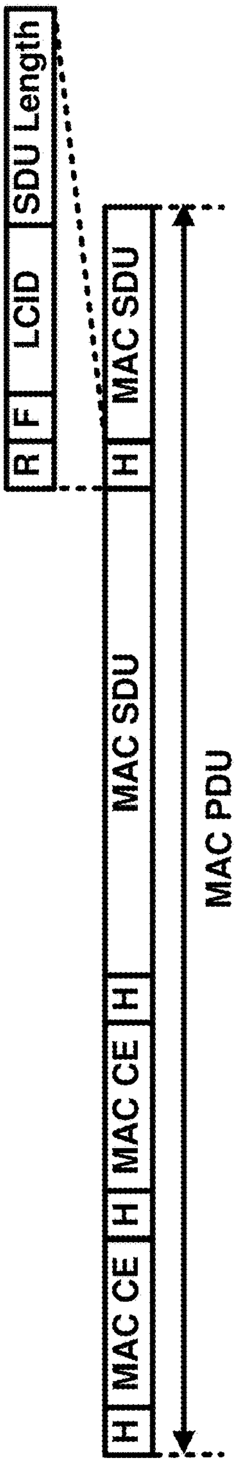
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
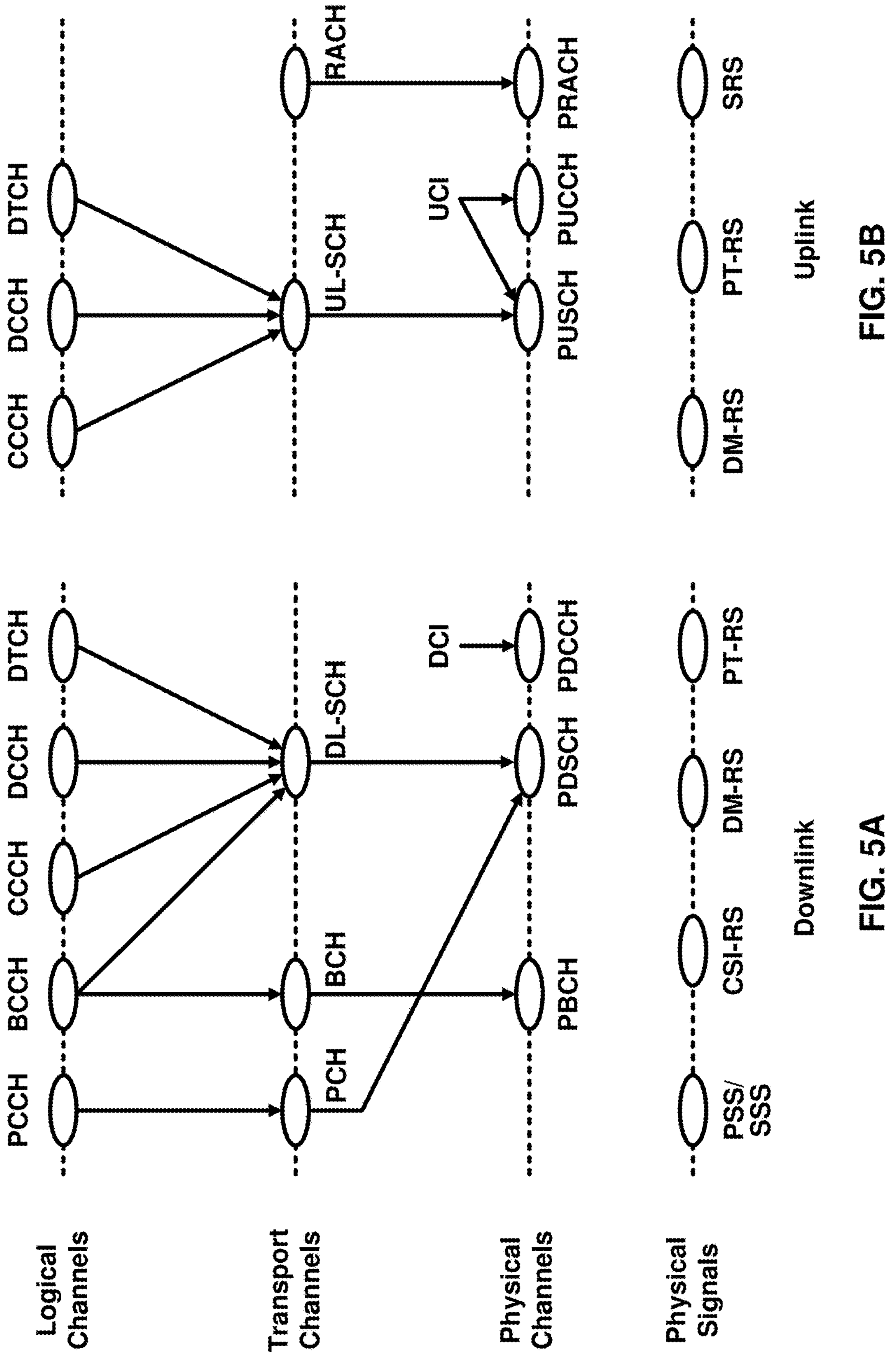
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
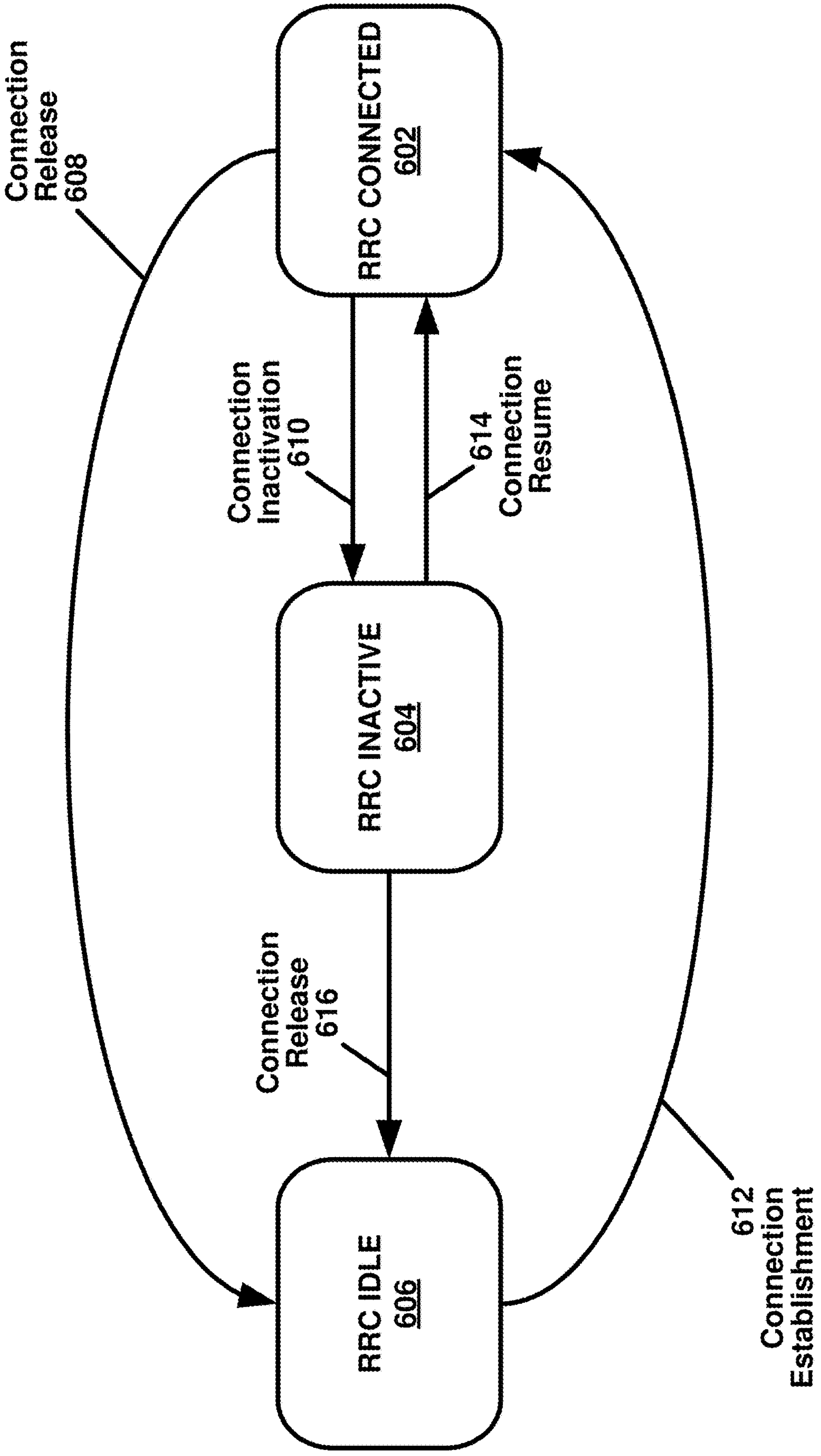
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
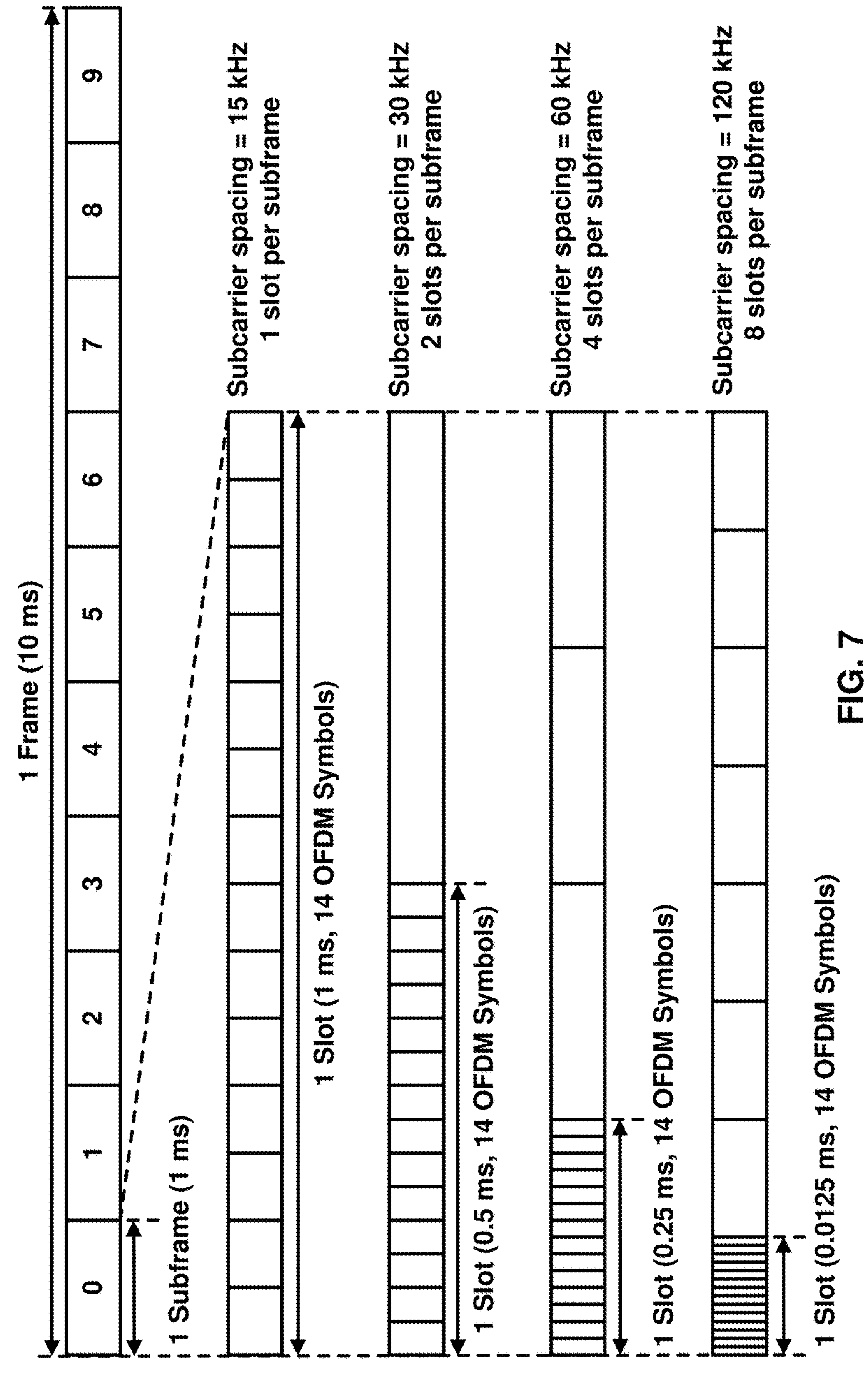
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 KHz/2.3 μs; 60 KHz/1.2 μs; 120 KHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
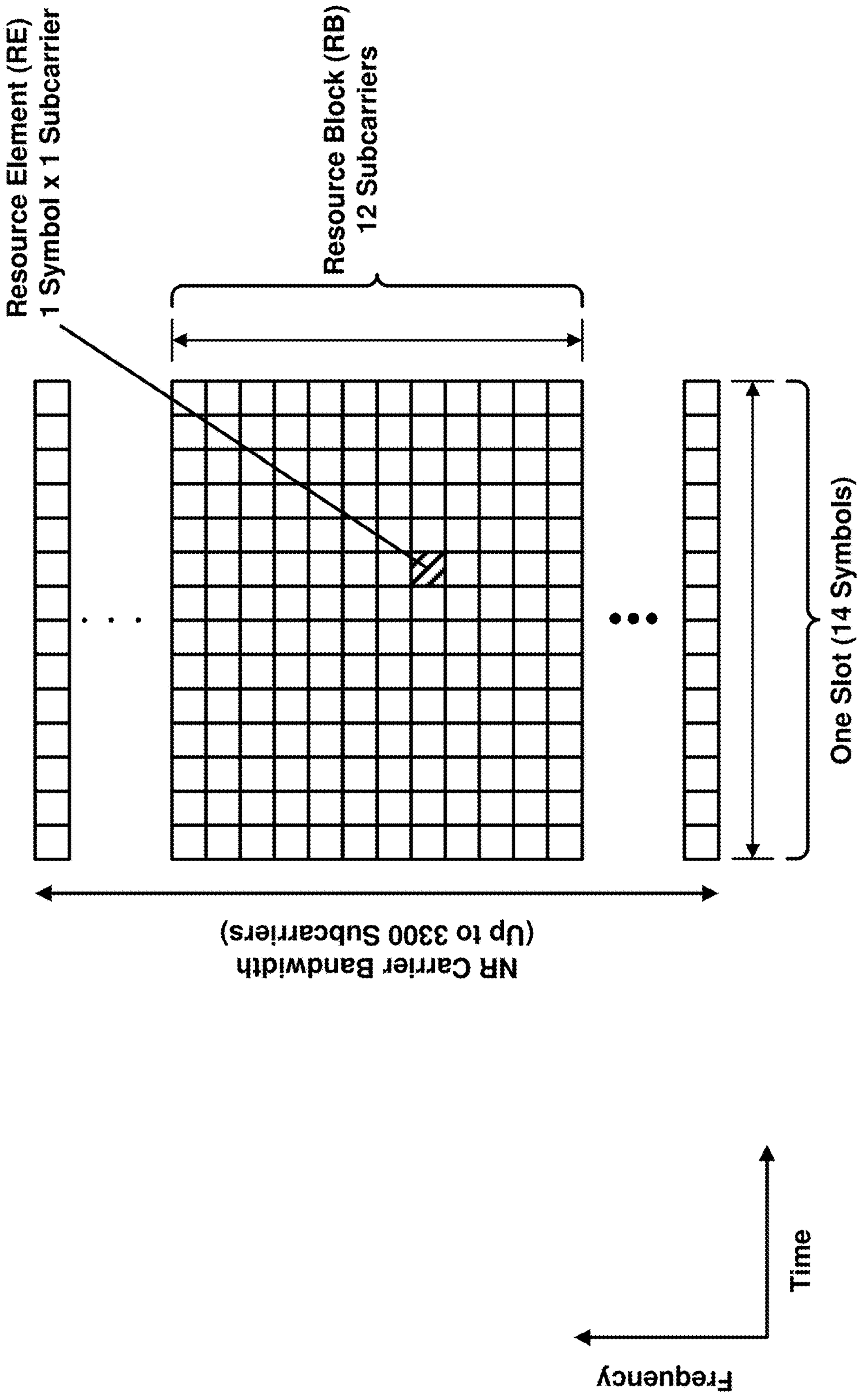
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
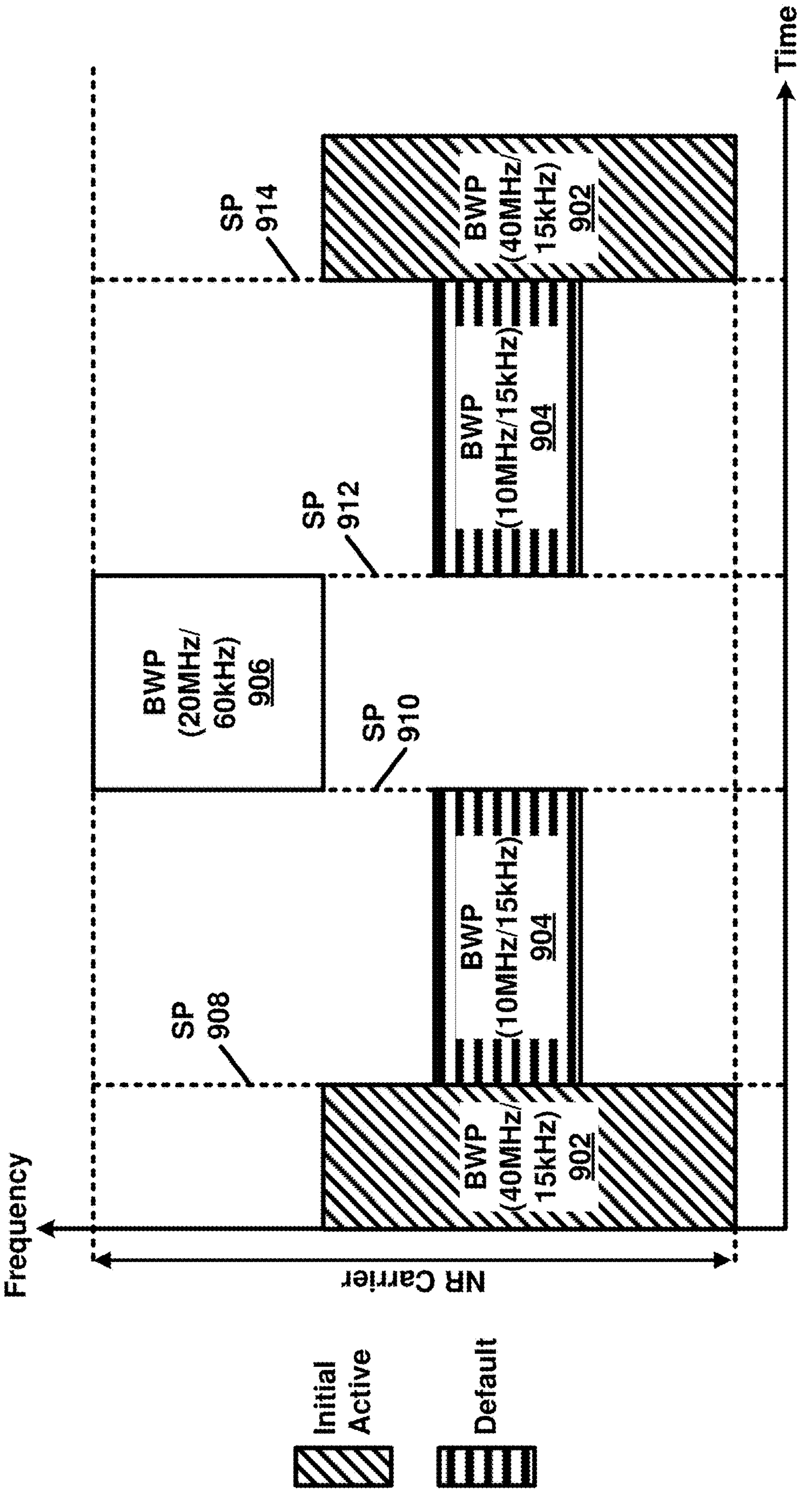
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHZ and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
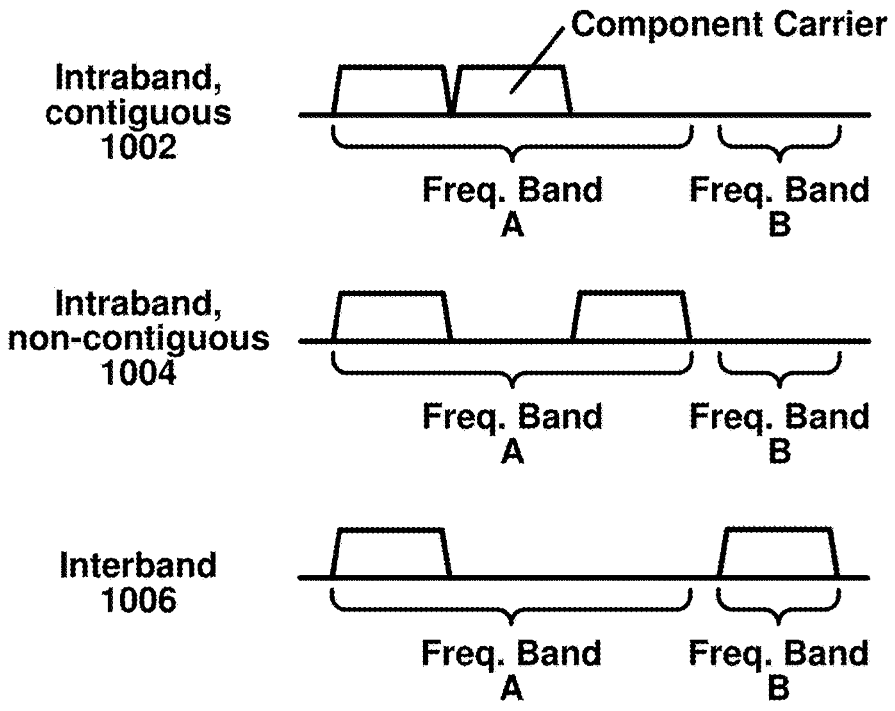
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
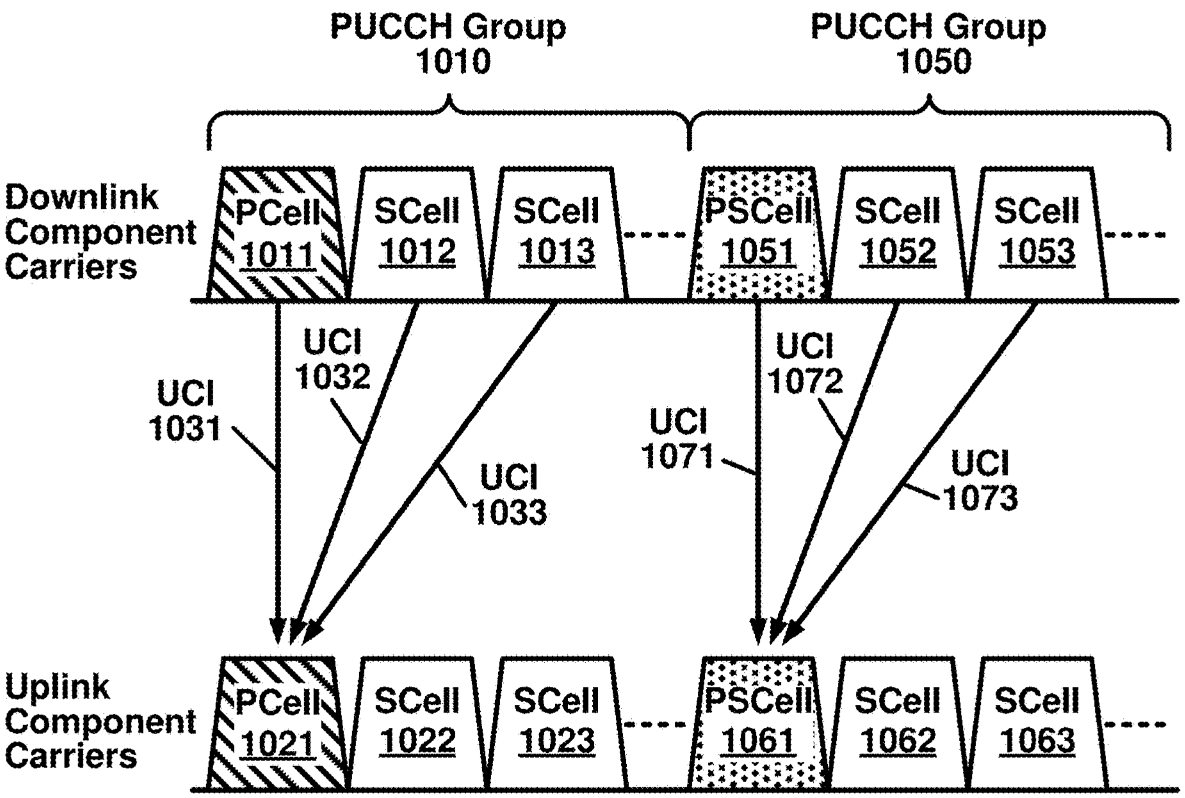
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
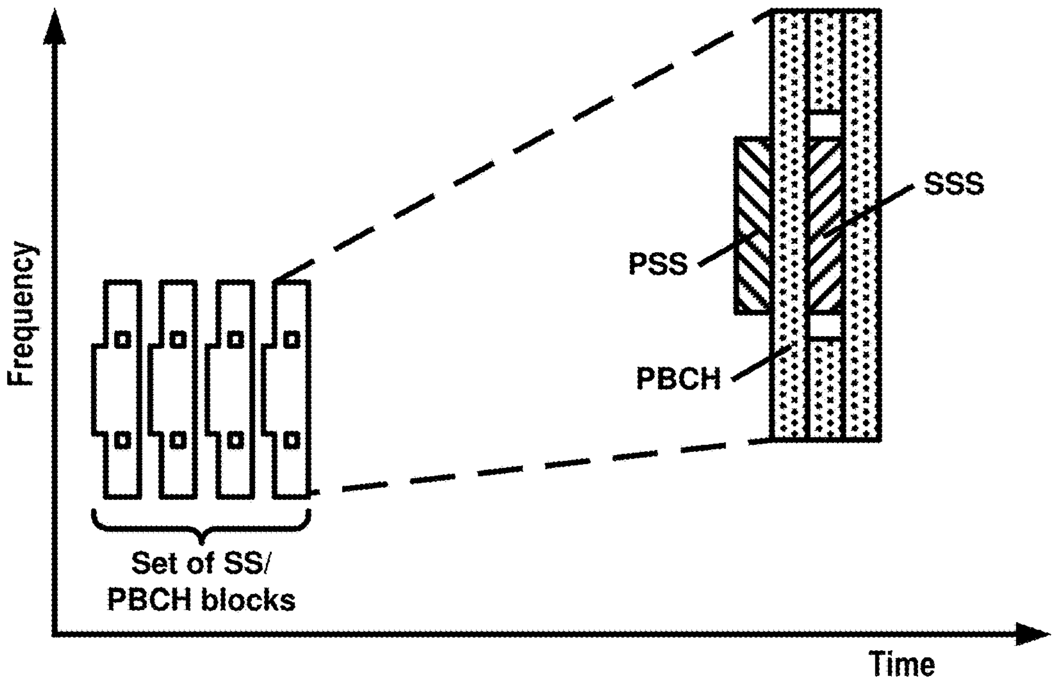
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
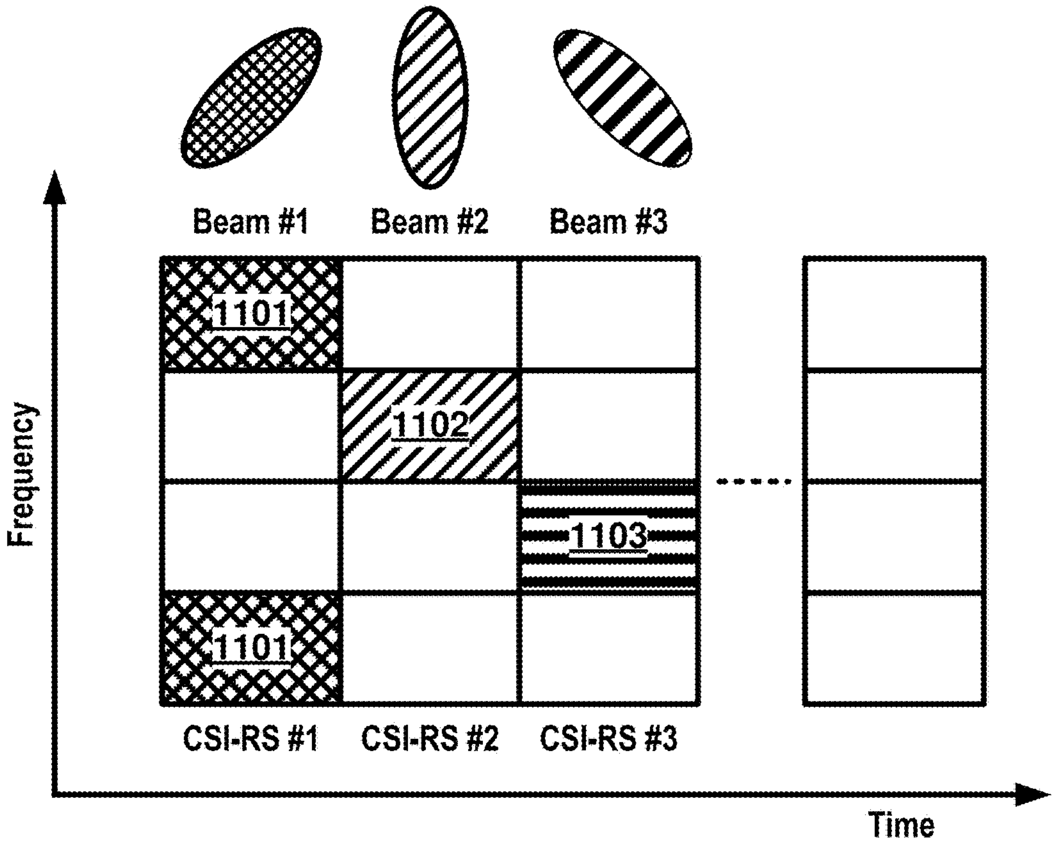
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
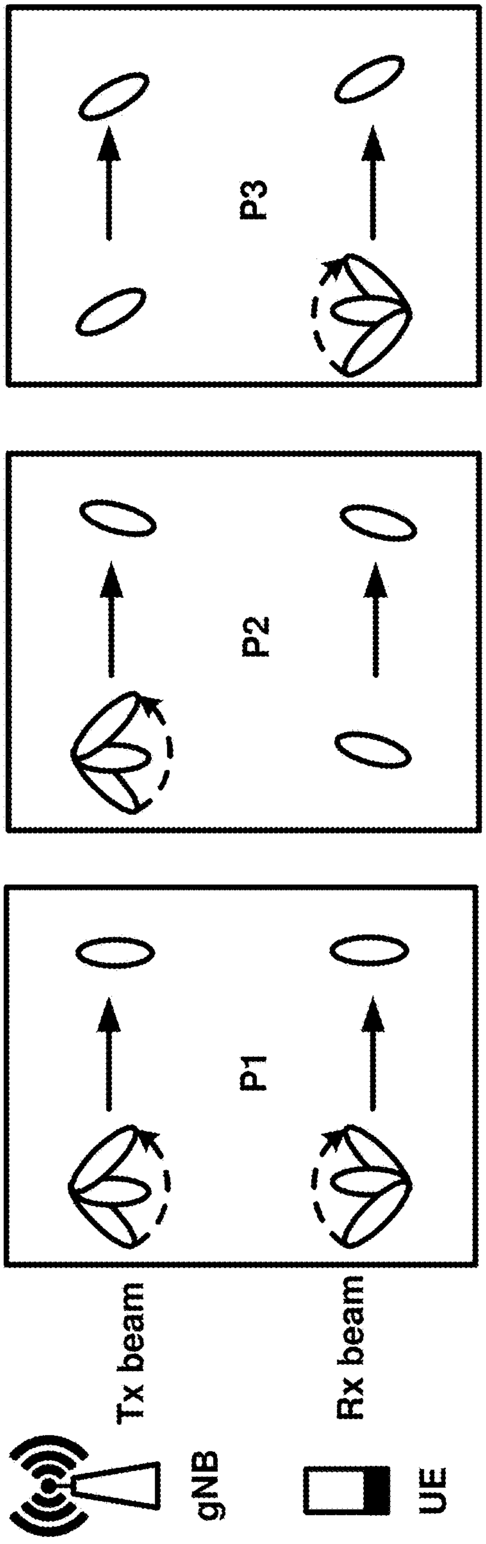
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
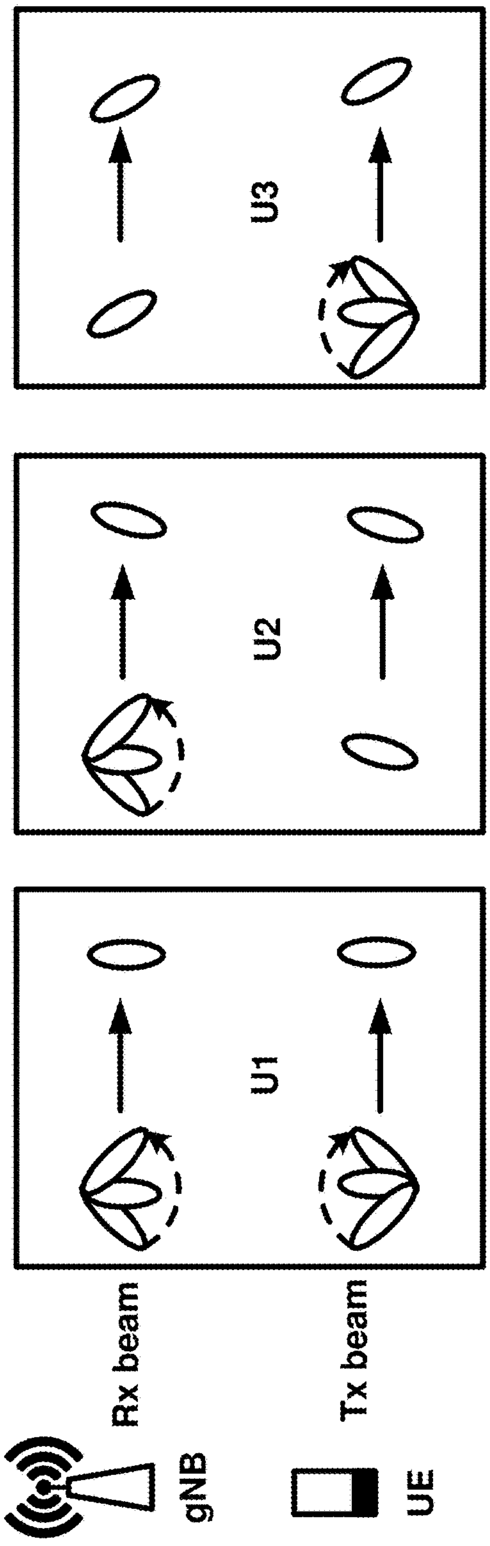

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13A:
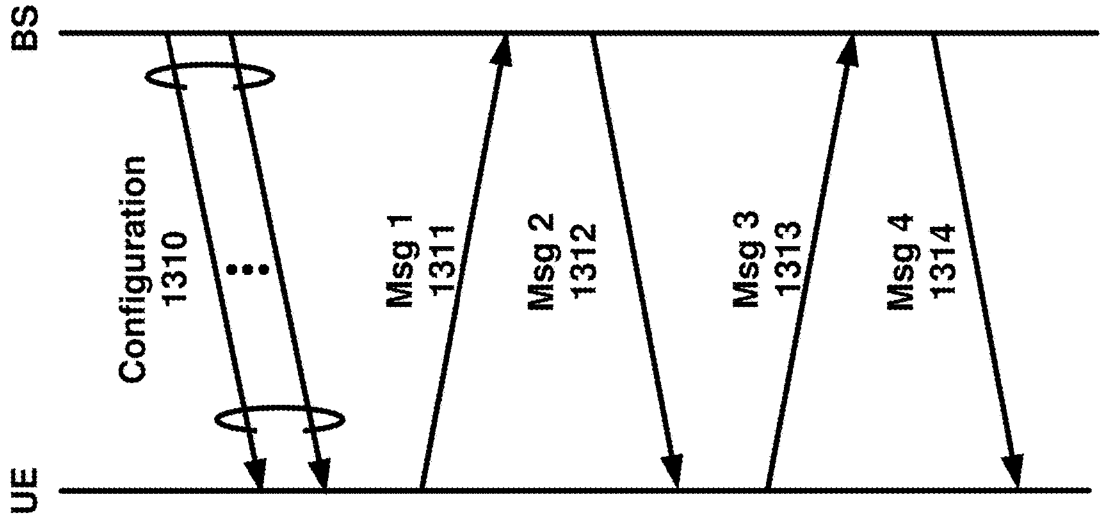
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

Figure 13B:
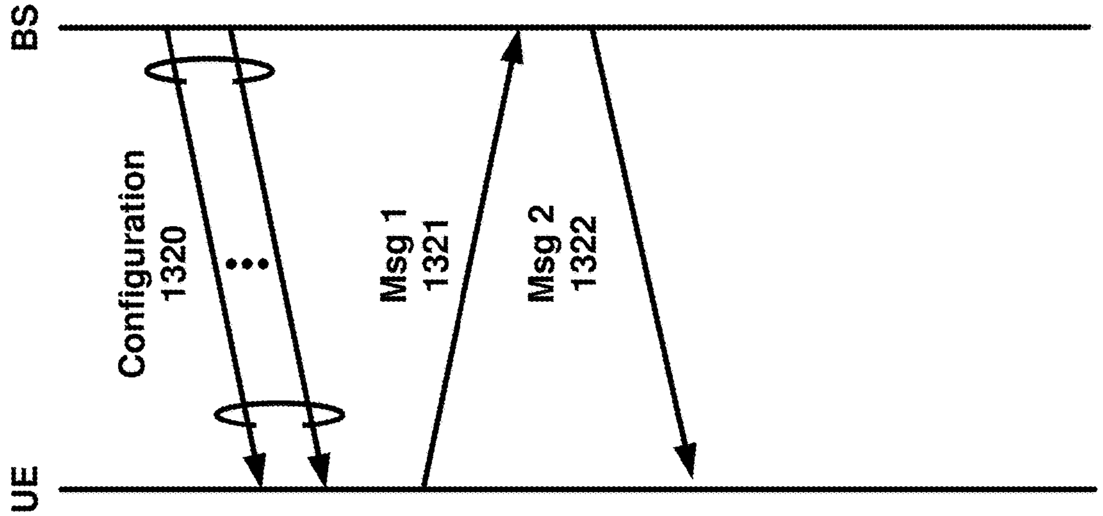

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

Figure 13C:
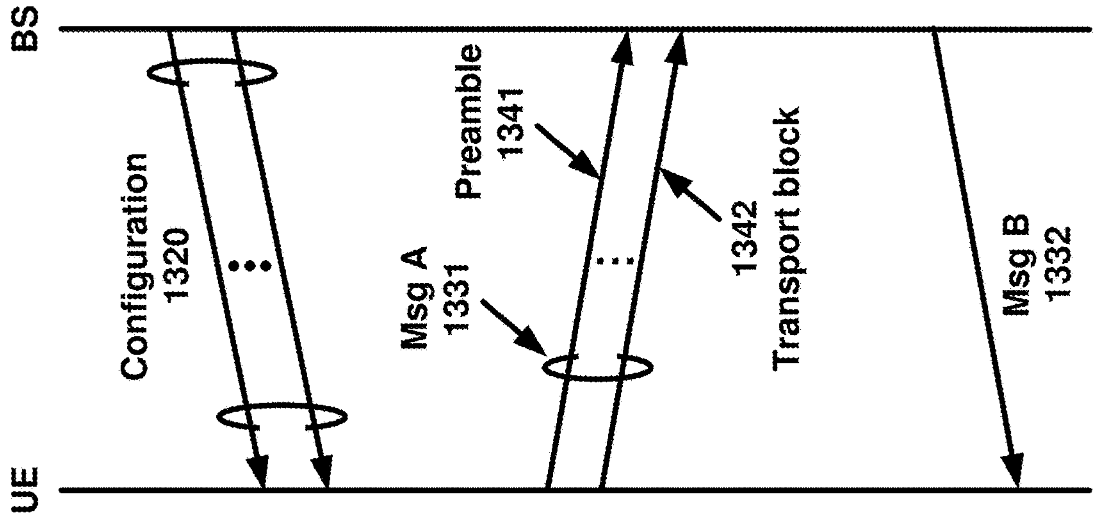

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
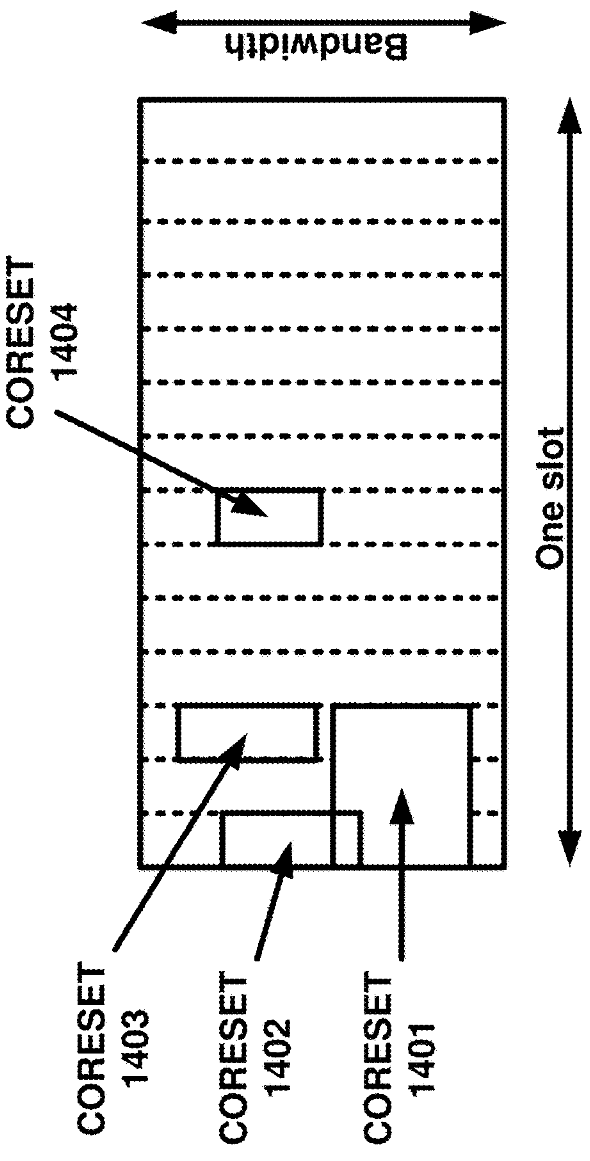
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
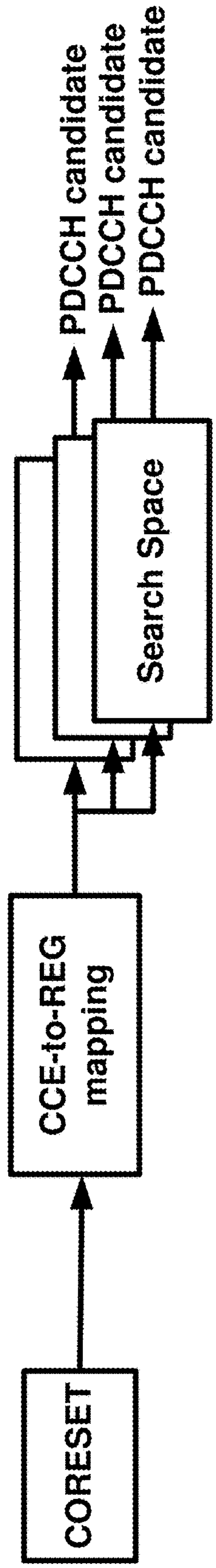
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
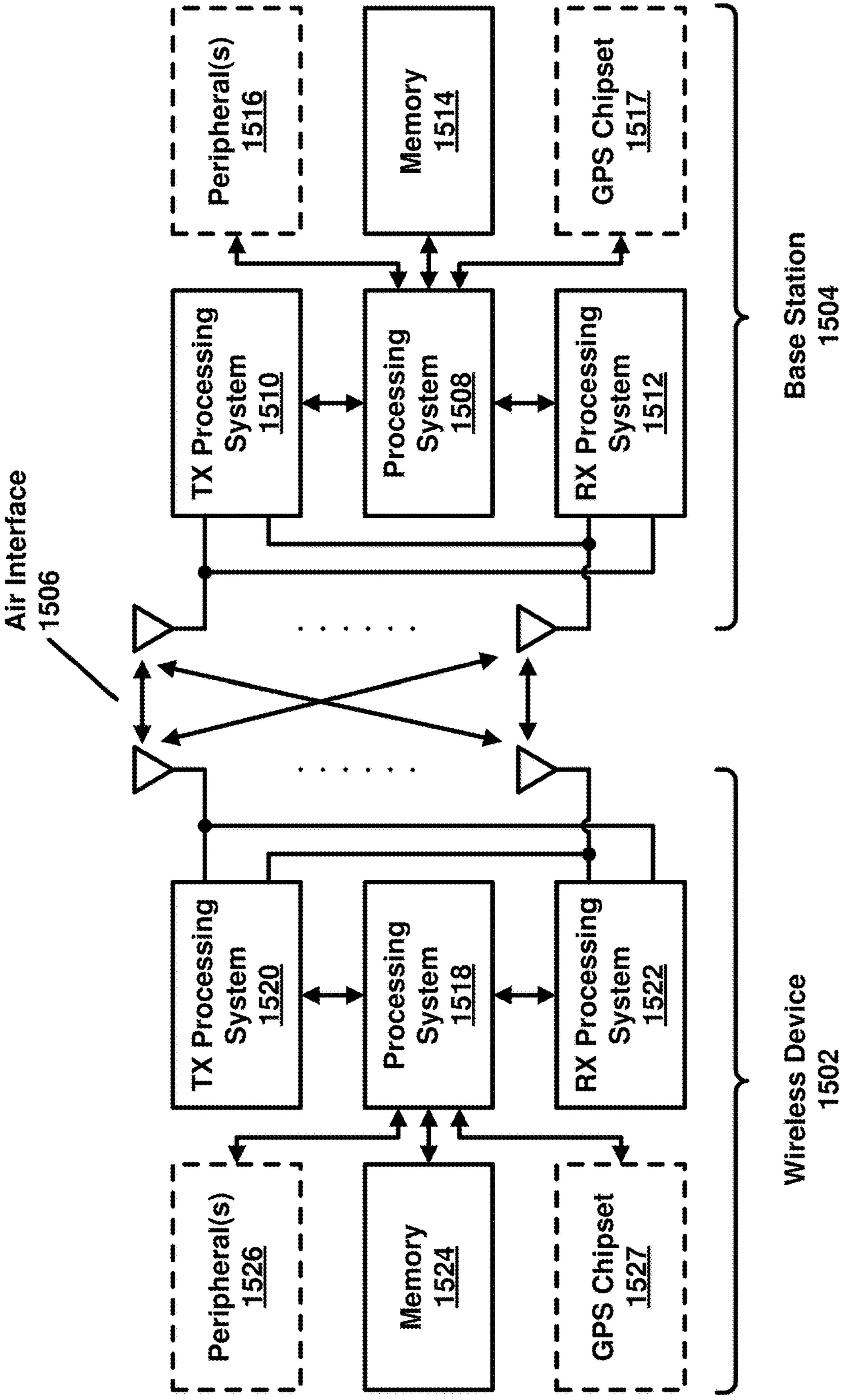
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
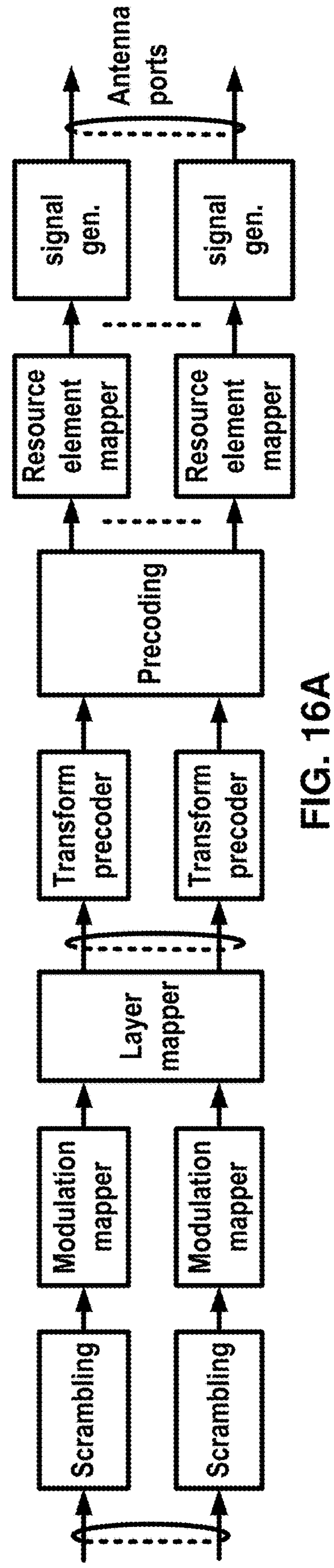
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
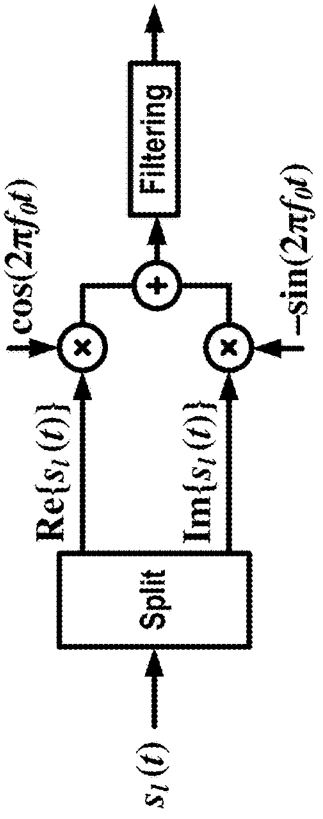

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
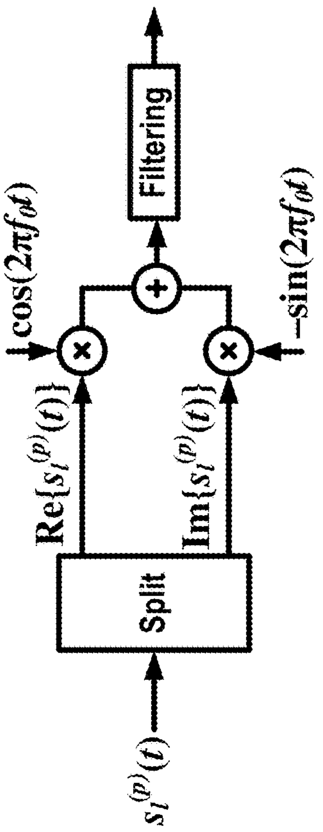
Figure 16C:
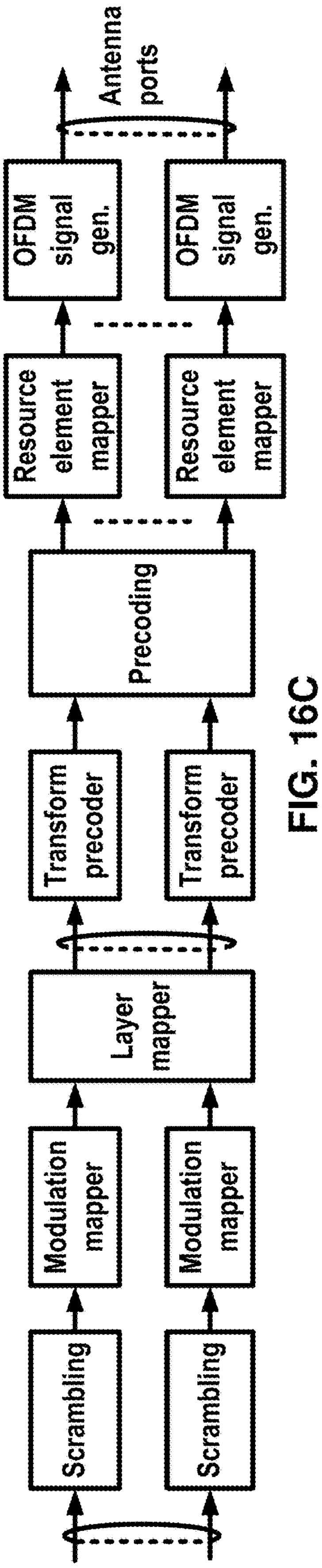

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one-bit length; an LCID field with a multi-bit length; an L field with a multi-bit length, or a combination thereof.

Figure 17A:
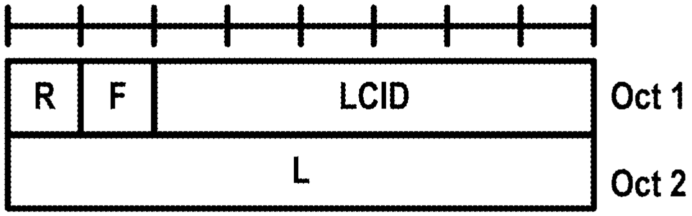
FIG. 17A, FIG. 17B, and FIG. 17C illustrate examples of MAC subheaders.
Figure 17B:
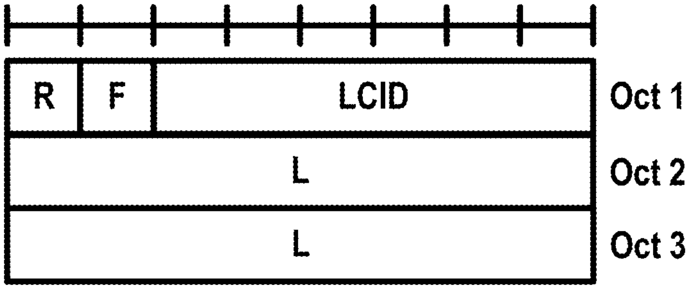
Figure 17C:
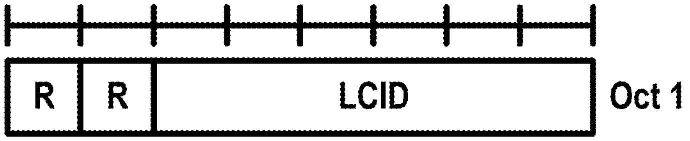

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: a R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figure 18A:
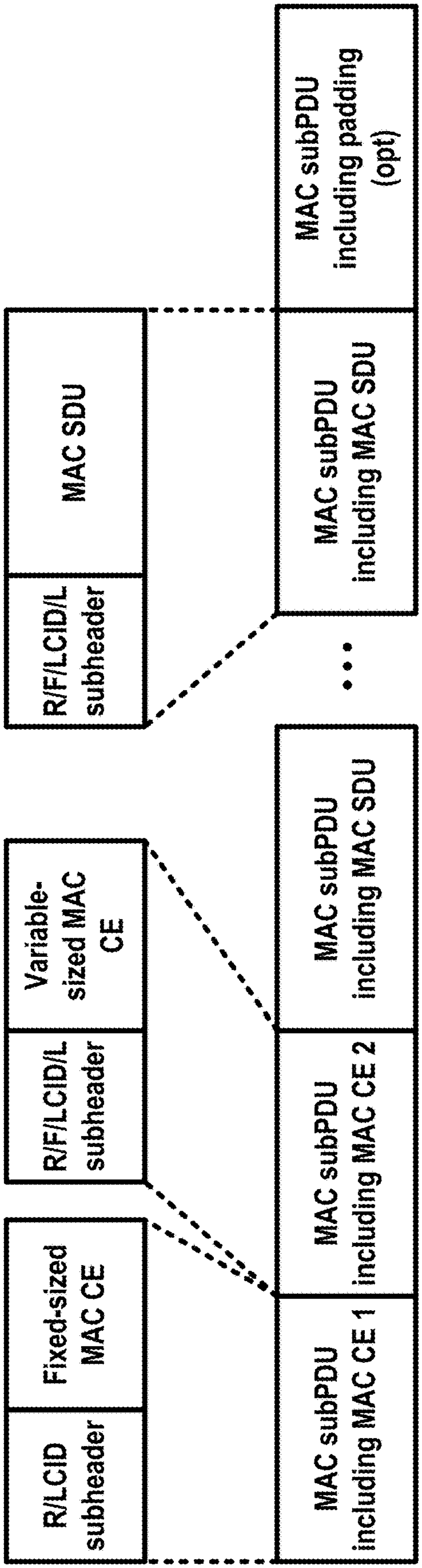
FIG. 18A illustrates an example of a DL MAC PDU.
Figure 18B:
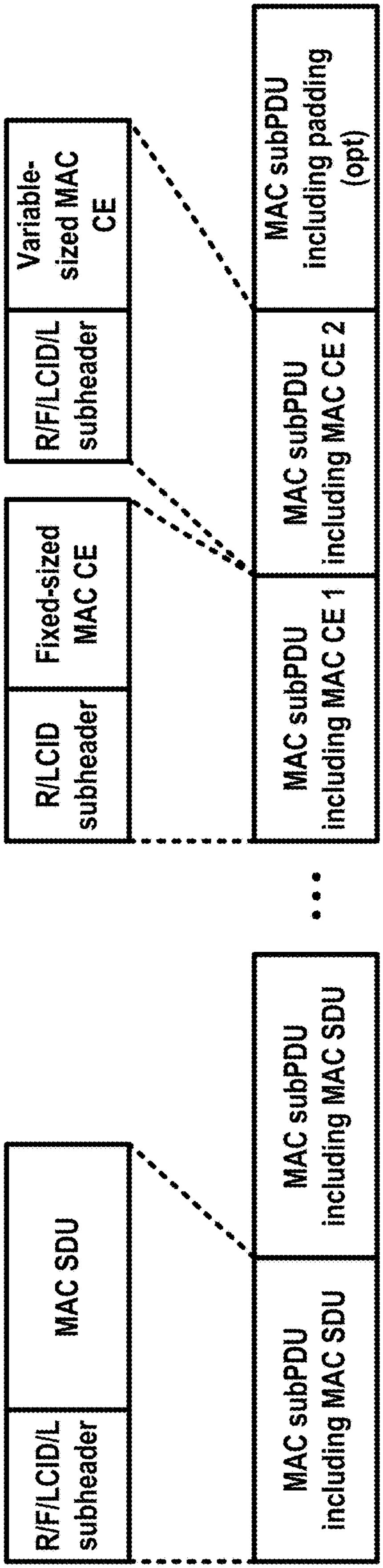
FIG. 18B illustrates an example of an UL MAC PDU.

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an embodiment, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a wireless device contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to “activated” or “dormant”.

A wireless device may activate/deactivate an SCell in response to receiving an SCell Activation/Deactivation MAC CE. In an example, a base station may transmit, to a wireless device, one or more messages comprising an SCell timer (e.g., sCellDeactivation Timer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivation Timer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivation Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivation Timer) associated with the activated SCell. In an example, when at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivation Timer) associated with the activated SCell. In an example, when an SCell is deactivated, if there is an ongoing random access procedure on the SCell, a wireless device may abort the ongoing random access procedure on the SCell.

Figure 21A:
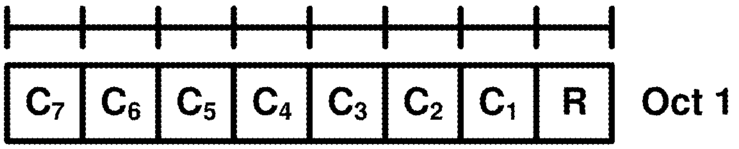
FIG. 21A and FIG. 21B illustrate examples of SCell activation/deactivation MAC CE formats.

FIG. 21A shows an example of an SCell Activation/Deactivation MAC CE of one octet. A first MAC PDU subheader with a first LCID (e.g., '111010' as shown in FIG. 19) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g., seven) and a second number of R-fields (e.g., one).

Figure 21B:
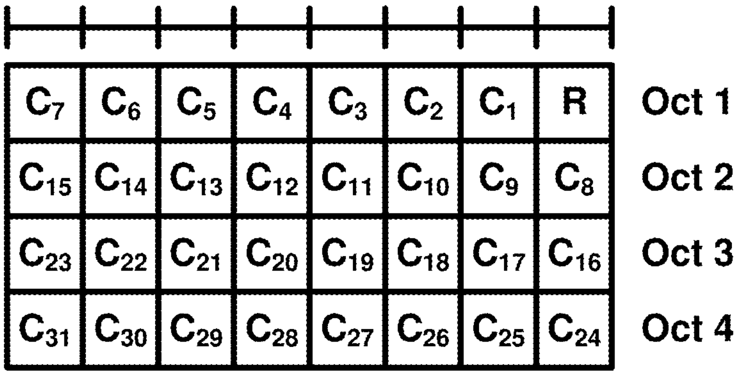

FIG. 21B shows an example of an SCell Activation/Deactivation MAC CE of four octets. A second MAC PDU subheader with a second LCID (e.g., '111001' as shown in FIG. 19) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a C, field may indicate an activation/deactivation status of an SCell with an SCell index i if an SCell with SCell index i is configured. In an example, when the C, field is set to one, an SCell with an SCell index i may be activated. In an example, when the C, field is set to zero, an SCell with an SCell index i may be deactivated. In an example, if there is no SCell configured with SCell index i, the wireless device may ignore the C, field. In FIG. 21A and FIG. 21B, an R field may indicate a reserved bit. The R field may be set to zero.

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP inactivity timer. When the BWP inactivity timer is configured for a serving cell, the base station and/or the wireless device may switch an active BWP to a default BWP in response to an expiry of the BWP inactivity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 22:
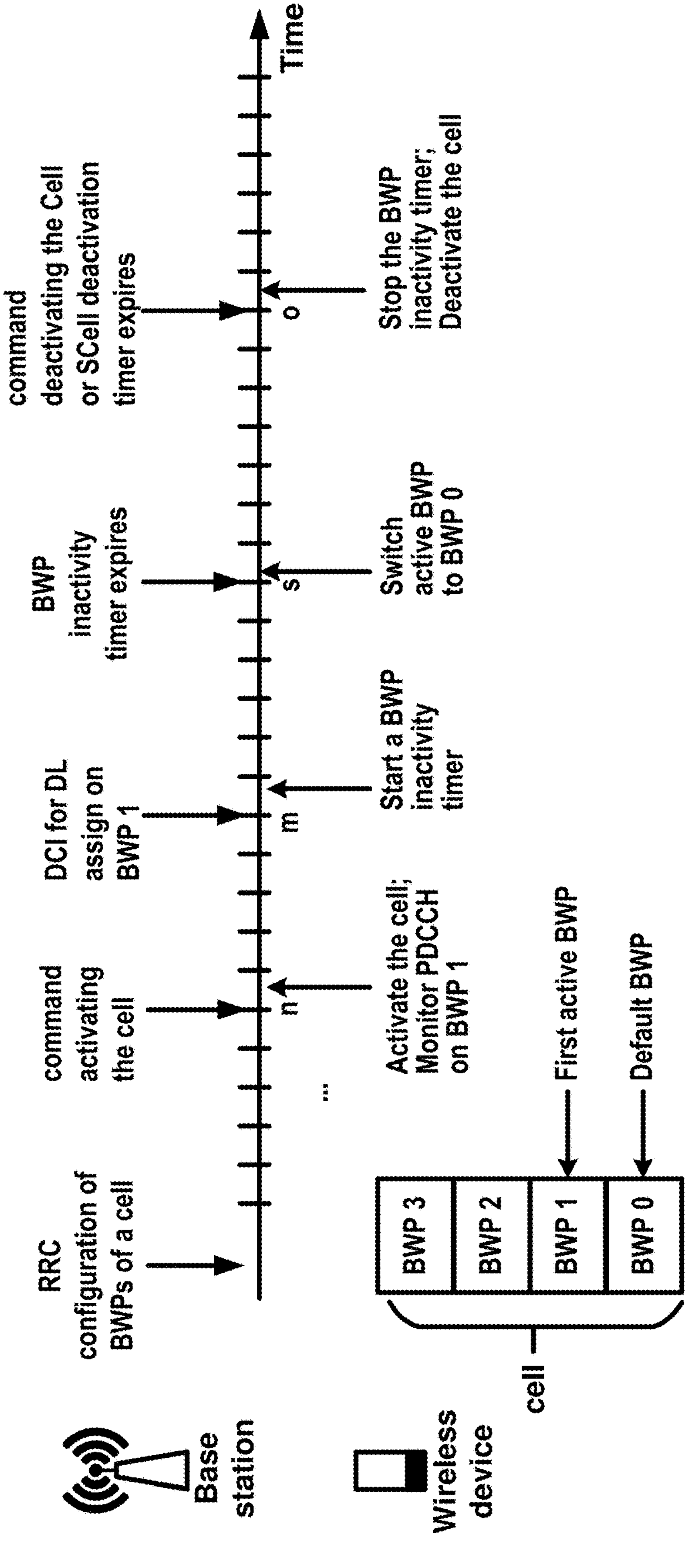
FIG. 22 illustrates an example of BWP activation/deactivation on a cell.

FIG. 22 shows an example of BWP switching on a cell (e.g., PCell or SCell). In an example, a wireless device may receive, from a base station, at least one RRC message comprising parameters of a cell and one or more BWPs associated with the cell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an $n^{th}$ slot. In case the cell is a PCell, the wireless device may not receive the command activating the cell, for example, the wireless device may activate the PCell once the wireless device receives RRC message comprising configuration parameters of the PCell. The wireless device may start monitoring a PDCCH on BWP 1 in response to activating the cell.

In an example, the wireless device may start (or restart) a BWP inactivity timer (e.g., bwp-Inactivity Timer) at an $m^{th}$ slot in response to receiving a DCI indicating DL assignment on BWP 1. The wireless device may switch back to the default BWP (e.g., BWP 0) as an active BWP when the BWP inactivity timer expires, at $s^{th}$ slot. The wireless device may deactivate the cell and/or stop the BWP inactivity timer when the sCellDeactivation Timer expires (e.g., if the cell is a SCell). In response to the cell being a PCell, the wireless device may not deactivate the cell and may not apply the sCellDeactivation Timer on the PCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-InactivityTimer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, if a wireless device is configured for a secondary cell with higher layer parameter Default-DL-BWP indicating a default DL BWP among the configured DL BWPs and the wireless device is configured with higher layer parameter bwp-Inactivity Timer indicating a timer value, the wireless device procedures on the secondary cell may be same as on the primary cell using the timer value for the secondary cell and the default DL BWP for the secondary cell.

In an example, if a wireless device is configured by higher layer parameter Active-BWP-DL-SCell a first active DL BWP and by higher layer parameter Active-BWP-UL-SCell a first active UL BWP on a secondary cell or carrier, the wireless device may use the indicated DL BWP and the indicated UL BWP on the secondary cell as the respective first active DL BWP and first active UL BWP on the secondary cell or carrier.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by search SpaceOtherSystemInformation in PDCCH-ConfigCommon for a DCI format with CRC scrambled by a SI-RNTI on the primary cell of the MCG, a Type1-PDCCH CSS set configured by ra-Search Space in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpace Type=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpace Type=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters (e.g., based on example embodiment of FIG. 27) comprising: a PDCCH monitoring periodicity, a PDCCH monitoring offset, and a PDCCH monitoring pattern within a slot. For a search space set (SS s), the wireless device determines that a PDCCH monitoring occasion(s) exists in a slot with number $$n_{s,f}^{\mu}$$

in a frame with number $n_f$ if $$\left(n_f \cdot N_{slot}^{frame,\mu} \lceil + n_{s,f}^{\mu} - o_s\right) \bmod k_s = 0.\ N_{slot}^{frame,\mu}$$

is a number of slots in a frame when numerology μ is configured. $o_s$ is a slot offset indicated in the PDCCH configuration parameters (e.g., based on example embodiment of FIG. 27). $k_s$ is a PDCCH monitoring periodicity indicated in the PDCCH configuration parameters (e.g., based on example embodiment of FIG. 27). The wireless device monitors PDCCH candidates for the search space set for $T_s$ consecutive slots, starting from slot $$n^{\mu}_{s,f},$$

and does not monitor PDCCH candidates for search space set s for the next $k_s - T_s$ consecutive slots. In an example, a USS at CCE aggregation level L∈{1, 2, 4, 8, 16} is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $$n^{\mu}_{s,f}$$

for an active DL BWP of a serving cell corresponding to carrier indicator field value $n_{CI}$ as $$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\lfloor N_{CCE,p}/L\rfloor\right\}+i,$$

where, $$Y_{p,n^{\mu}_{s,f}}=0$$

for any CSS;

$$Y_{p,n^{\mu}_{s,f}}=\left(A_p\cdot Y_{p,n^{\mu}_{s,f}-1}\right)$$

mod D for a USS, $Y_{p,-1}=N_{RNTI}\neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number of CCEs, numbered from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH is monitored; otherwise, including for any CSS, $$n_{CI}=0;\ m_{s,n_{CI}}=0,\ \ldots,\ M^{(L)}_{s,n_{CI}}-1,\text{ where }M^{(L)}_{s,n_{CI}}$$

is the number of PDCCH candidates the wireless device is configured to monitor for aggregation level L of a search space set s for a serving cell corresponding to $n_{CI}$; for any CSS $$M^{(L)}_{s,max}=M^{(L)}_{s,0};$$

for a USS, $$M^{(L)}_{s,max}$$

is the maximum of $$M^{(L)}_{s,n_{CI}}$$

over all configured $n_{CI}$ values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. A CORESET may be configured based on example embodiment of FIG. 26. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decoding may be referred to as blind decoding. The possible DCI formats may be based on example embodiments of FIG. 23.

FIG. 23 shows examples of DCI formats which may be used by a base station transmit control information to a wireless device or used by the wireless device for PDCCH monitoring. Different DCI formats may comprise different DCI fields and/or have different DCI payload sizes. Different DCI formats may have different signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc. The DCI format(s) which the wireless device may monitor in a SS may be configured.

FIG. 24A shows an example of configuration parameters of a master information block (MIB) of a cell (e.g., PCell). In an example, a wireless device, based on receiving primary synchronization signal (PSS) and/or secondary synchronization signal (SSS), may receive a MIB via a PBCH. The configuration parameters of a MIB may comprise six bits (systemFrameNumber) of system frame number (SFN), subcarrier spacing indication (subCarrierSpacingCommon), a frequency domain offset (ssb-SubcarrierOffset) between SSB and overall resource block grid in number of subcarriers, an indication (cellBarred) indicating whether the cell is bared, a DMRS position indication (dmrs-TypeA-Position) indicating position of DMRS, parameters of CORESET and SS of a PDCCH (pdcch-ConfigSIB1) comprising a common CORESET, a common search space and necessary PDCCH parameters, etc.

In an example, a pdcch-ConfigSIB1 may comprise a first parameter (e.g., controlResourceSetZero) indicating a common ControlResourceSet (CORESET) with ID #0 (e.g., CORESET #0) of an initial BWP of the cell. controlResourceSetZero may be an integer between 0 and 15. Each integer between 0 and 15 may identify a configuration of CORESET #0.

FIG. 24B shows an example of a configuration of CORESET #0. As shown in FIG. 24B, based on a value of the integer of controlResourceSetZero, a wireless device may determine a SSB and CORESET #0 multiplexing pattern, a number of RBs for CORESET #0, a number of symbols for CORESET #0, an RB offset for CORESET #0.

In an example, a pdcch-ConfigSIB1 may comprise a second parameter (e.g., searchSpaceZero) indicating a common search space with ID #0 (e.g., SS #0) of the initial BWP of the cell. search SpaceZero may be an integer between 0 and 15. Each integer between 0 and 15 may identify a configuration of SS #0.

FIG. 24C shows an example of a configuration of SS #0. As shown in FIG. 24C, based on a value of the integer of searchSpaceZero, a wireless device may determine one or more parameters (e.g., O, M) for slot determination of PDCCH monitoring, a first symbol index for PDCCH monitoring and/or a number of search spaces per slot.

In an example, based on receiving a MIB, a wireless device may monitor PDCCH via SS #0 of CORESET #0 for receiving a DCI scheduling a system information block 1 (SIB1). A SIB1 message may be implemented based on example embodiment of FIG. 25. The wireless device may receive the DCI with CRC scrambled with a system information radio network temporary identifier (SI-RNTI) dedicated for receiving the SIB1.

FIG. 25 shows an example of RRC configuration parameters of system information block (SIB). A SIB (e.g., SIB1) may be transmitted to all wireless devices in a broadcast way. The SIB may contain information relevant when evaluating if a wireless device is allowed to access a cell, information of paging configuration and/or scheduling configuration of other system information. A SIB may contain radio resource configuration information that is common for all wireless devices and barring information applied to a unified access control. In an example, a base station may transmit to a wireless device (or a plurality of wireless devices) one or more SIB information. As shown in FIG. 25, parameters of the one or more SIB information may comprise: one or more parameters (e.g., cellSelectionInfo) for cell selection related to a serving cell, one or more configuration parameters of a serving cell (e.g., in ServingCellConfigCommonSIB IE), and one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and other parameters.

In an example, a DownlinkConfigCommonSIB IE may comprise parameters of an initial downlink BWP (intialDownlinkBWP IE) of the serving cell (e.g., SpCell). The parameters of the initial downlink BWP may be comprised in a BWP-DownlinkCommon IE (as shown in FIG. 26). The BWP-DownlinkCommon IE may be used to configure common parameters of a downlink BWP of the serving cell. The base station may configure the locationAndBandwidth so that the initial downlink BWP contains the entire CORESET #0 of this serving cell in the frequency domain. The wireless device may apply the locationAndBandwidth upon reception of this field (e.g., to determine the frequency position of signals described in relation to this locationAndBandwidth) but it keeps CORESET #0 until after reception of RRCSetup/RRCResume/RRCReestablishment.

In an example, the DownlinkConfigCommonSIB IE may comprise parameters of a paging channel configuration. The parameters may comprise a paging cycle value (T, by defaultPagingCycle IE), a parameter (nAndPagingFrameOffset IE) indicating total number N) of paging frames (PFs) and paging frame offset (PF_offset) in a paging DRX cycle, a number (Ns) for total paging occasions (POs) per PF, a first PDCCH monitoring occasion indication parameter (firstPDCCH-MonitoringOccasionofPO IE) indicating a first PDCCH monitoring occasion for paging of each PO of a PF. The wireless device, based on parameters of a PCCH configuration, may monitor PDCCH for receiving paging message, e.g., based on example embodiments of FIG. 28A and/or FIG. 28B.

In an example, the parameter first-PDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

FIG. 26 shows an example of RRC configuration parameters (e.g., BWP-DownlinkCommon IE) in a downlink BWP of a serving cell. A base station may transmit to a wireless device (or a plurality of wireless devices) one or more configuration parameters of a downlink BWP (e.g., initial downlink BWP) of a serving cell. As shown in FIG. 26, the one or more configuration parameters of the downlink BWP may comprise: one or more generic BWP parameters of the downlink BWP, one or more cell specific parameters for PDCCH of the downlink BWP (e.g., in pdcch-ConfigCommon IE), one or more cell specific parameters for the PDSCH of this BWP (e.g., in pdsch-ConfigCommon IE), and one or more other parameters. A pdcch-ConfigCommon IE may comprise parameters of COESET #0 (e.g., controlResourceSetZero) which may be used in any common or UE-specific search spaces. A value of the controlResourceSetZero may be interpreted like the corresponding bits in MIB pdcch-ConfigSIB1. A pdcch-ConfigCommon IE may comprise parameters (e.g., in commonControlResourceSet) of an additional common control resource set which may be configured and used for any common or UE-specific search space. If the network configures this field, it uses a ControlResourceSetld other than 0 for this ControlResourceSet. The network configures the commonControlResourceSet in SIB1 so that it is contained in the bandwidth of CORESET #0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., pagingSearchSpace), a search space for random access procedure (e.g., ra-SearchSpace), a search space for SIB1 message (e.g., searchSpaceSIB1), a common search space #0 (e.g., searchSpaceZero), and one or more other search spaces.

As shown in FIG. 26, a control resource set (CORESET) may be associated with a CORESET index (e.g., ControlResourceSetId). A CORESET may be implemented based on example embodiments described above with respect to FIG. 14A and/or FIG. 14B. The CORESET index with a value of 0 may identify a common CORESET configured in MIB and in ServingCellConfigCommon (controlResourceSetZero) and may not be used in the ControlResourceSet IE. The CORESET index with other values may identify CORESETs configured by dedicated signaling or in SIB1. The controlResourceSetId is unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET in number of symbols. In an example, as shown in FIG. 26, configuration parameters of a CORESET may comprise at least one of: frequency resource indication (e.g., frequencyDomainResources), a CCE-REG mapping type indicator (e.g., cce-REG-MappingType), a plurality of TCI states, an indicator indicating whether a TCI is present in a DCI, and the like. The frequency resource indication, comprising a number of bits (e.g., 45 bits), may indicate frequency domain resources, each bit of the indication corresponding to a group of 6 RBs, with grouping starting from the first RB group in a BWP of a cell (e.g., SpCell, SCell). The first (left-most/most significant) bit may correspond to the first RB group in the BWP, and so on. A bit that is set to 1 may indicate that an RB group, corresponding to the bit, belongs to the frequency domain resource of this CORESET. Bits corresponding to a group of RBs not fully contained in the BWP within which the CORESET is configured may be set to zero.

FIG. 27 shows an example of configuration of a search space (e.g., SearchSpace IE). In an example, one or more search space configuration parameters of a search space may comprise at least one of: a search space ID (searchSpaceId), a control resource set ID (controlResourceSetId), a monitoring slot periodicity and offset parameter (monitoringSlotPeriodicityAndOffset), a search space time duration value (duration), a monitoring symbol indication (monitoringSymbolsWithinSlot), a number of candidates for an aggregation level (nrofCandidates), and/or a SS type indicating a common SS type or a UE-specific SS type (searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate on which symbol(s) of a slot a wireless device may monitor PDCCH on the SS. The control resource set ID may identify a control resource set on which a SS may be located.

In an example, a wireless device, in RRC_IDLE or RRC_INACTIVE state, may periodically monitor paging occasions (POs) for receiving paging message for the wireless device. Before monitoring the POs, the wireless device, in RRC_IDLE or RRC_INACTIVE state, may wake up at a time before each PO for preparation and/or turn all components in preparation of data reception (warm up). The gap between the waking up and the PO may be long enough to accommodate all the processing requirements. The wireless device may perform, after the warming up, timing acquisition from SSB and coarse synchronization, frequency and time tracking, time and frequency offset compensation, and/or calibration of local oscillator. After that, the wireless device may monitor a PDCCH for a paging DCI in one or more PDCCH monitoring occasions based on configuration parameters of the PCCH configuration configured in SIB1. The configuration parameters of the PCCH configuration may be implemented based on example embodiments described above with respect to FIG. 25.

Figure 28:
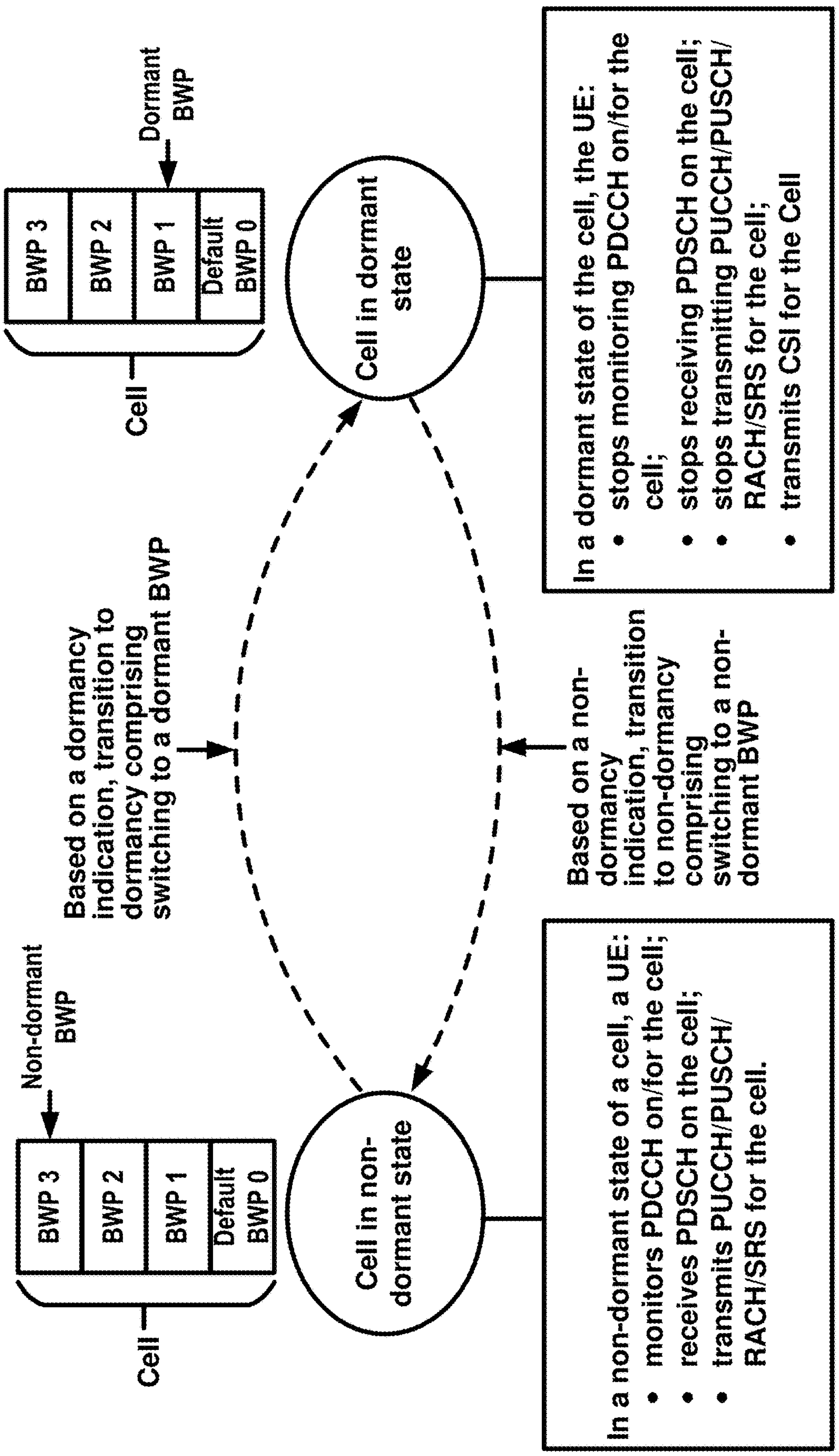
FIG. 28 illustrates an example of SCell dormancy management.

FIG. 28 shows an example embodiment of transitioning between a dormant state and a non-dormant state on a SCell. In an example, a base station may transmit to a wireless device one or more RRC messages comprising configuration parameters of a SCell, wherein the SCell comprises a plurality of BWPs. Among the plurality of BWPs, a first BWP (e.g., BWP 3 in FIG. 28) may be configured as a non-dormant BWP, and/or a second BWP (e.g., BWP 1 in FIG. 28) may be configured as a dormant BWP. In an example, a default BWP (e.g., BWP 0 in FIG. 28) may be configured in the plurality of BWPs. In an example, the non-dormant BWP may be a BWP which the wireless device may activate in response to transitioning the SCell from a dormant state to a non-dormant state. In an example, the dormant BWP may be a BWP which the wireless device may switch to in response to transitioning the SCell from a non-dormant state to a dormant state. In an example, the configuration parameters may indicate one or more search spaces and/or CORESETs configured on the non-dormant BWP. The configuration parameters may indicate no search spaces or no CORESETs configured on the dormant BWP. The configuration parameter may indicate CSI reporting configuration parameters for the dormant BWP.

In an example, a default BWP may be different from a dormant BWP. The configuration parameters may indicate one or more search spaces or one or more CORESETs configured on the default BWP. When a BWP inactivity timer expires or receiving a DCI indicating switching to the default BWP, a wireless device may switch to the default BWP as an active BWP. The wireless device, when the default BWP is in active, may perform at least one of: monitoring PDCCH on the default BWP of the SCell, receiving PDSCH on the default BWP of the SCell, transmitting PUSCH on the default BWP of the SCell, transmitting SRS on the default BWP of the SCell, and/or transmitting CSI report (e.g., periodic, aperiodic, and/or semi-persistent) for the default BWP of the SCell. In an example, when receiving a dormancy/non-dormancy indication indicating a dormant state for a SCell, the wireless device may switch to the dormant BWP as an active BWP of the SCell. In response to switching to the dormant BWP, the wireless device may perform at least one of: refraining from monitoring PDCCH on the dormant BWP of the SCell (or for the SCell if the SCell is cross-carrier scheduled by another cell), refraining from receiving PDSCH on the dormant BWP of the SCell, refraining from transmitting PUSCH on the dormant BWP of the SCell, refraining from transmitting SRS on the dormant BWP of the SCell, and/or transmitting CSI report (e.g., periodic, aperiodic, and/or semi-persistent) for the dormant BWP of the SCell.

As shown in FIG. 28, a base station may transmit to a wireless device a DCI via a PDCCH resource, the DCI comprising a dormancy/non-dormancy indication indicating whether a dormant state or a non-dormant state for the SCell. In response to the dormancy/non-dormancy indication indicating a dormant state for the SCell, the wireless device may: transition the SCell to the dormant state if the SCell is in a non-dormant state before receiving the DCI, or maintain the SCell in the dormant state if the SCell is in the dormant state before receiving the DCI. Transitioning the SCell to the dormant state may comprise switching to the dormant BWP (e.g., configured by the base station) of the SCell. In response to the dormancy/non-dormant indication indicating a non-dormant state for the SCell, the wireless device may: transition the SCell to the non-dormant state if the SCell is in a dormant state before receiving the DCI, or maintain the SCell in the non-dormant state if the SCell is in the non-dormant state before receiving the DCI. Transitioning the SCell to the non-dormant state may comprise switching to a non-dormant BWP (e.g., configured by the base station) of the SCell.

As shown in FIG. 28, in response to transitioning the SCell from a dormant state to a non-dormant state, the wireless device may switch to the non-dormant BWP (e.g., BWP 3 as shown in FIG. 28), configured by the base station, as an active BWP of the SCell. Based on the switching to the non-dormant BWP as the active BWP of the SCell, the wireless device may perform at least one of: monitoring PDCCH on the active BWP of the SCell (or monitoring PDCCH for the SCell when the SCell is configured to be cross-carrier scheduled by another cell), receiving PDSCH on the active BWP of the SCell, and/or transmitting PUCCH/PUSCH/RACH/SRS on the active BWP (e.g., if the active BWP is an uplink BWP).

As shown in FIG. 28, in response to transitioning the SCell from a non-dormant state to a dormant state, the wireless device may switch to the dormant BWP (e.g., BWP 1 of the SCell as shown in FIG. 28), configured by the base station. Based on the switching to the dormant BWP of the SCell, the wireless device may perform at least one of: refraining from monitoring PDCCH on the dormant BWP of the SCell (or refraining from monitoring PDCCH for the SCell when the SCell is configured to be cross-carrier scheduled by another cell), refraining from receiving PDSCH on the dormant BWP of the SCell, refraining from transmitting PUCCH/PUSCH/RACH/SRS on the dormant BWP (e.g., if the dormant BWP is an uplink BWP), and/or transmitting CSI report for the dormant BWP of the SCell based on the CSI reporting configuration parameters configured on the dormant BWP of the SCell.

Figure 29A:
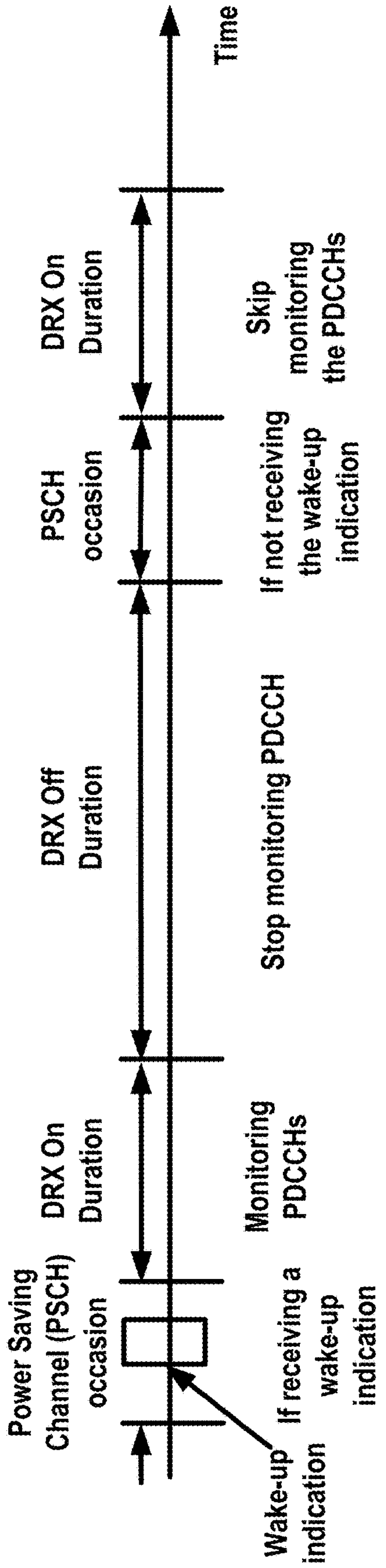
FIG. 29A and FIG. 29B illustrate examples of power saving operations of a wireless device.

FIG. 29A show example of a power saving mechanism based on wake-up indication. A base station may transmit one or more messages comprising parameters of a wake-up duration (e.g., a power saving duration, or a Power Saving Channel (PSCH) occasion), to a wireless device. The wake-up duration may be located at a number of slots (or symbols) before a DRX On duration of a DRX cycle. The number of slots (or symbols), or, referred to as a gap between a wakeup duration and a DRX on duration, may be configured in the one or more RRC messages or predefined as a fixed value. The gap may be used for at least one of: synchronization with the base station; measuring reference signals; and/or retuning RF parameters. The gap may be determined based on a capability of the wireless device and/or the base station. In an example, the parameters of the wake-up duration may be pre-defined without RRC configuration. In an example, the wake-up mechanism may be based on a wake-up indication via a PSCH. The parameters of the wake-up duration may comprise at least one of: a PSCH channel format (e.g., numerology, DCI format, PDCCH format); a periodicity of the PSCH; a control resource set and/or a search space of the PSCH. When configured with the parameters of the wake-up duration, the wireless device may monitor the wake-up signal or the PSCH during the wake-up duration. When configured with the parameters of the PSCH occasion, the wireless device may monitor the PSCH for detecting a wake-up indication during the PSCH occasion. In response to receiving the wake-up signal/channel (or a wake-up indication via the PSCH), the wireless device may wake-up to monitor PDCCHs in a DRX active time of a next DRX cycle according to the DRX configuration. In an example, in response to receiving the wake-up indication via the PSCH, the wireless device may monitor PDCCHs in the DRX active time (e.g., when drx-onDuration Timer is running). The wireless device may go back to sleep if not receiving PDCCHs in the DRX active time. The wireless device may keep in sleep during the DRX off duration of the DRX cycle. In an example, if the wireless device doesn't receive the wake-up signal/channel (or a wake-up indication via the PSCH) during the wake-up duration (or the PSCH occasion), the wireless device may skip monitoring PDCCHs in the DRX active time. In an example, if the wireless device receives an indication indicating skipping PDCCH monitoring during the wake-up duration (or the PSCH occasion), the wireless device may skip monitoring PDCCHs in the DRX active time.

Figure 29B:
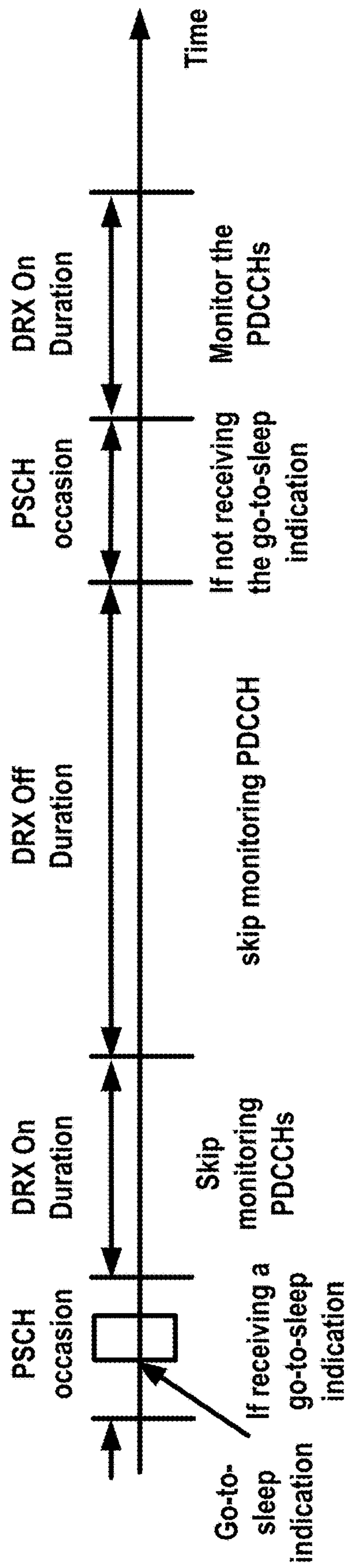

In an example, a power saving mechanism may be based on a go-to-sleep indication via a PSCH. FIG. 29B shows an example of a power saving based on go-to-sleep indication. In response to receiving a go-to-sleep indication via the PSCH, the wireless device may go back to sleep and skip monitoring PDCCHs during the DRX active time (e.g., next DRX on duration of a DRX cycle). In an example, if the wireless device doesn't receive the go-to-sleep indication via the PSCH during the wake-up duration, the wireless device monitors PDCCHs during the DRX active time, according to the configuration parameters of the DRX operation. This mechanism may reduce power consumption for PDCCH monitoring during the DRX active time.

In an example, a power saving mechanism may be implemented by combining FIG. 29A and FIG. 29B. A base station may transmit a power saving indication, in a DCI via a PSCH, indicating whether the wireless device wake up for next DRX on duration or skip next DRX on duration. The wireless device may receive the DCI via the PSCH. In response to the power saving indication indicating the wireless device wake up for next DRX on duration, the wireless device may wake up for next DRX on duration. The wireless device monitors PDCCH in the next DRX on duration in response to the waking up. In response to the power saving indication indicating the wireless device skip (or go to sleep) for next DRX on duration, the wireless device goes to sleep or skip for next DRX on duration. The wireless device skips monitoring PDCCH in the next DRX on duration in response to the power saving indication indicating the wireless device may go to sleep for next DRX on duration.

In an example, one or more embodiments of FIG. 28, FIG. 29A, and/or FIG. 29B may be extended or combined to further improve power consumption of a wireless device, and/or signaling overhead of a base station.

Figure 30A:
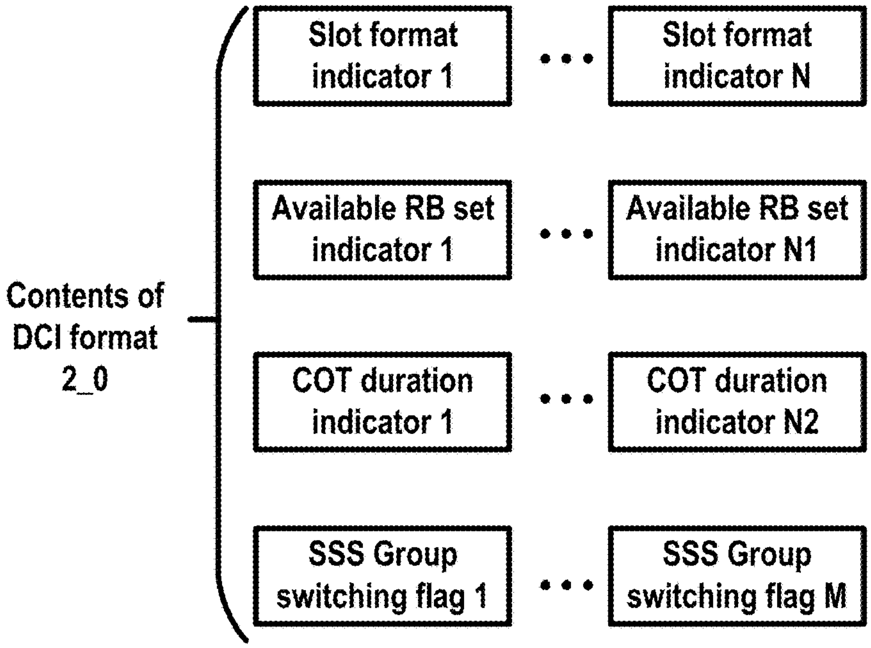
FIG. 30A and FIG. 30B illustrate examples of SSSG switching for power saving of a wireless device.

FIG. 30A shows an example of DCI format 2_0 comprising one or more search space set group (or SSSG) switching indications (or Search space set group switching flags). In an example, a DCI format 2_0 may comprise one or more slot format indicator (e.g., slot format indicator 1, slot format indicator 2, . . . slot format indicator N), one or more available RB set indicators, one or more COT duration indications, one or more SSS group switching flags. In an example, each of the one or more SSS group switching flags may correspond to a respective cell group of a plurality of cell groups. Each cell group of the plurality of cell groups may comprise one or more cells. A SSS group switching flag, of the one or more SSS group switching flags, corresponding to a cell group, may indicate, when setting to a first value, switching from a first SSS group to a second SSS group for each cell of the cell group. The SSS group switching flag may indicate, when setting to a second value, switching from the second SSS group to the first SSS group for each cell of the cell group. The wireless device may perform SSS group switching based on example embodiment of FIG. 30B.

Figure 30B:
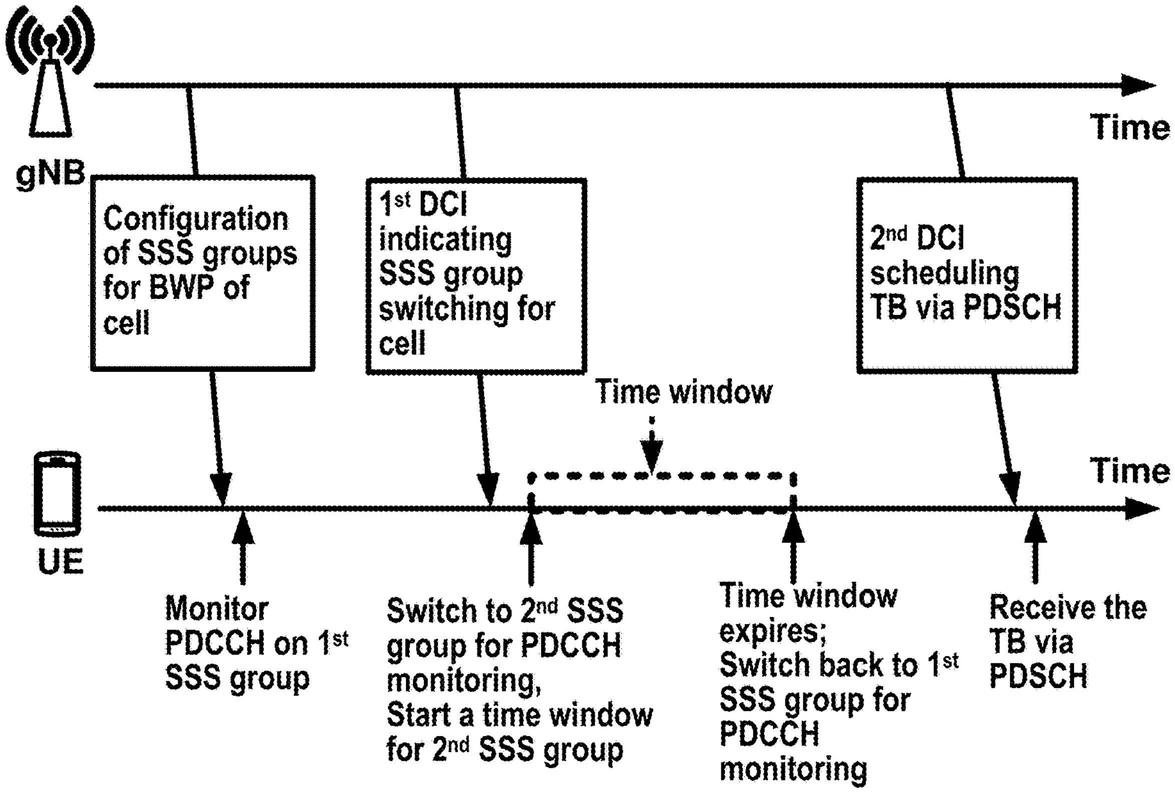

FIG. 30B shows an example of SSS group switching based on a DCI (e.g., DCI format 2_0, or other DCI formats described in FIG. 23). In an example, a wireless device may be provided a group index for a search space set (e.g., a Type3-PDCCH CSS set, a USS set, or any other type of search space set) by searchSpaceGroupIdList (e.g., based on example embodiment of FIG. 27) for PDCCH monitoring on a serving cell.

In an example, the wireless device may not be provided searchSpaceGroupIdList for a search space set. The embodiments of FIG. 30B may not be applicable for PDCCH monitoring on the search space if the search space set is not configured with search SpaceGroupIdList. Based on not applying the embodiments of FIG. 30B, the wireless device may monitor the search space set on a BWP, without switching away from the search space set for PDCCH monitoring.

In an example, if a wireless device is provided cell-GroupsForSwitchList (e.g., based on example embodiments shown in FIG. 26), indicating one or more groups of serving cells, the embodiments of FIG. 30B may apply to all serving cells within each group. If the wireless device is not provided cellGroupsForSwitchList, the embodiments of FIG. 30B may apply only to a serving cell for which the wireless device is provided searchSpaceGroupldList.

In an example, if a wireless device is provided searchSpaceGroupldList, the wireless device may reset PDCCH monitoring according to search space sets with group index 0, if provided by searchSpaceGroupIdList.

In an example, a wireless device may be provided by search SpaceSwitchDelay (e.g., as shown in FIG. 26) with a number of symbols $P_{switch}$ based on wireless device processing capability (e.g., wireless device processing capability 1, wireless device processing capability 2, etc.) and SCS configuration μ. wireless device processing capability 1 for SCS configuration u may apply unless the wireless device indicates support for wireless device processing capability 2. In an example, $P_{switch}$=25 for wireless device capability 1 and p=0, $P_{switch}$=25 for wireless device capability 1 and μ=1, $P_{switch}$=25 for wireless device capability 1 and μ=2, $P_{switch}$=10 for wireless device capability 2 and p=0, $P_{switch}$=12 for wireless device capability 2 and μ=1, and $P_{switch}$=22 for wireless device capability 2 and μ=2, etc.

In an example, a wireless device may be provided, by search SpaceSwitch Timer (in units of slots, e.g., as shown in FIG. 26), with a timer value for a serving cell that the wireless device is provided search SpaceGroupIdList or, if provided, for a set of serving cells provided by cellGroups-ForSwitchList. The wireless device may decrement the timer value by one after each slot based on a reference SCS configuration that is a smallest SCS configuration u among all configured DL BWPs in the serving cell, or in the set of serving cells. The wireless device may maintain the reference SCS configuration during the timer decrement procedure.

In an example, searchSpaceSwitch Timer may be defined as a value in unit of slots for monitoring PDCCH in the active DL BWP of the serving cell before moving to a default search space group (e.g., search space group 0). For 15 kHz SCS, a valid timer value may be one of {1, . . . , 20}. For 30 KHz SCS, a valid timer value may be one of {1, . . . , 40}. For 60 KHz SCS, a valid timer value may be one of {1, . . . , 80}. In an example, the base station may configure a same timer value for all serving cells in the same CellGroupForSwitch.

As shown in FIG. 30B, the wireless device may monitor PDCCH on a first SSS group (e.g., $1^{st}$ SSS group or a SSS with group index 0) based on configuration of SSS groups of a BWP of a cell. The wireless device may be provided by SearchSpaceSwitch Trigger with a location of a search space set group switching flag field for a serving cell in a DCI format 2_0. The SearchSpaceSwitch Trigger may be configured based on example embodiments of FIG. 27. The wireless device may receive a DCI (e.g., $1^{st}$ DCI in FIG. 30B with DCI format 2_0). The DCI may indicate a SSS group switching for the cell, e.g., when a value of the SSS group switching flag field in the DCI format 2_0 is 1. In response to receiving the DCI, the wireless device may start monitoring PDCCH according to a second SSS group (e.g., $2^{nd}$ SSS group or a SSS with group index 1) and stops monitoring PDCCH on the first SSS group (or the SSS with group index 0 for the serving cell. The wireless device may start monitoring PDCCH on the second SSS group (e.g., $2^{nd}$ SSS group or a SSS with group index 1) and stops monitoring PDCCH on the first SSS group at a first slot that is at least $P_{switch}$ symbols after a last symbol of the PDCCH with the DCI format 2_0. Based on receiving the DCI, the wireless device may set a timer value of the search space switching timer to the value provided by searchSpaceSwitch Timer.

In an example, the wireless device may monitor PDCCH on a second SSS group (e.g., $2^{nd}$ SSS group or a SSS with group index 1) based on configuration of SSS groups of a BWP of a cell. The wireless device may be provided by SearchSpaceSwitch Trigger a location of a search space set group switching flag field for a serving cell in a DCI format 2_0. The wireless device may receive a DCI. The DCI may indicate a SSS group switching for the cell, e.g., when a value of the search space set group switching flag field in the DCI format 2_0 is 0, the wireless device may start monitoring PDCCH according to search space sets with group index 0 and stop monitoring PDCCH according to search space sets with group index 1 for the serving cell. The wireless device may start monitoring the PDCCH according to search space set with group index 0 and stop monitoring PDCCH according to search space sets with group 1 at a first slot that is at least $P_{switch}$ symbols after the last symbol of the PDCCH with the DCI format 2_0.

In an example, if the wireless device monitors PDCCH for a serving cell according to a first SSS group (e.g., search space sets with group index 1), the wireless device may start monitoring PDCCH for the serving cell according to a second SSS group (e.g., search space sets with group index 0), and stop monitoring PDCCH according to the first SSS group, for the serving cell at the beginning of the first slot that is at least $P_{switch}$ symbols after a slot where the timer expires or after a last symbol of a remaining channel occupancy duration for the serving cell that is indicated by DCI format 2_0.

In an example, a wireless device may not be provided Search SpaceSwitch Trigger for a serving cell, e.g., Search SpaceSwitch Trigger being absent in configuration parameters of SlotFormatIndicator, wherein the SlotFormatIndicator is configured for monitoring a Group-Common-PDCCH for Slot-Format-Indicators (SFI). In response to the SearchSpaceSwitch Trigger not being provided, the DCI format 2_0 may not comprise a SSS group switching flag field. When the SearchSpaceSwitchTrigger is not provided, if the wireless device detects a DCI format by monitoring PDCCH according to a first SSS group (e.g., a search space set with group index 0), the wireless device may start monitoring PDCCH according to a second SSS group (e.g., a search space sets with group index 1) and stop monitoring PDCCH according to the first SSS group, for the serving cell. The wireless device may start monitoring PDCCH according to the second SSS group and stop monitoring PDCCH according to the first SSS group at a first slot that is at least $P_{switch}$ symbols after the last symbol of the PDCCH with the DCI format. The wireless device may set (or restart) the timer value to the value provided by searchSpaceSwitch Timer if the wireless device detects a DCI format by monitoring PDCCH in any search space set.

In an example, a wireless device may not be provided SearchSpaceSwitch Trigger for a serving cell. When the SearchSpaceSwitch Trigger is not provided, if the wireless device monitors PDCCH for a serving cell according to a first SSS group (e.g., a search space sets with group index 1), the wireless device may start monitoring PDCCH for the serving cell according to a second SSS group (e.g., a search space sets with group index 0), and stop monitoring PDCCH according to the first SSS group, for the serving cell at the beginning of the first slot that is at least $P_{switch}$ symbols after a slot where the timer expires or, if the wireless device is provided a search space set to monitor PDCCH for detecting a DCI format 2_0, after a last symbol of a remaining channel occupancy duration for the serving cell that is indicated by DCI format 2_0.

In an example, a wireless device may determine a slot and a symbol in a slot to start or stop PDCCH monitoring according to search space sets for a serving cell that the wireless device is provided searchSpaceGroupIdList or, if cellGroupsForSwitchList is provided, for a set of serving cells, based on the smallest SCS configuration u among all configured DL BWPs in the serving cell or in the set of serving cells and, if any, in the serving cell where the wireless device receives a PDCCH and detects a corresponding DCI format 2_0 triggering the start or stop of PDCCH monitoring according to search space sets.

Figure 31:
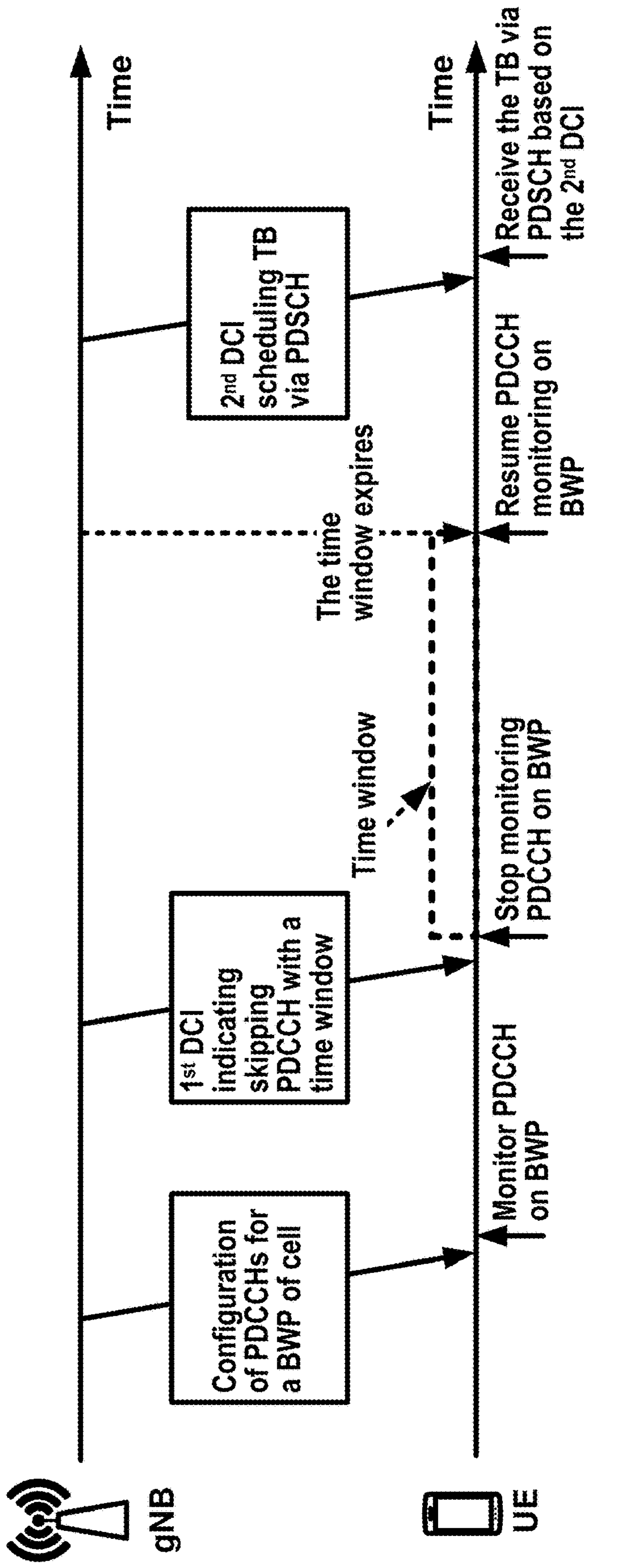
FIG. 31 illustrates an example of PDCCH skipping for power saving of a wireless device.

In an example, a wireless device may perform PDCCH skipping mechanism for power saving operation. FIG. 31 shows an example of PDCCH skipping based power saving operation.

In an example, a base station may transmit to a wireless device one or more RRC messages comprising configuration parameters of PDCCH for a BWP of a cell (e.g., based on example embodiments described above with respect to FIG. 26 and/or FIG. 27). Based on the configuration parameters of PDCCH, the wireless device may monitor PDCCH on the BWP. The BWP may a downlink BWP which is in active state. The wireless device may activate the BWP based on example embodiments described above with respect to FIG. 22.

As shown in FIG. 31, the wireless device may receive a first DCI (e.g., $1^{st}$ DCI) indicating skipping PDCCH with a time window. A time value for the time window may be indicated by the first DCI or configured by the one or more RRC messages. In response to receiving the first DCI, the wireless device may stop monitoring PDCCH on the BWP. Stopping monitoring PDCCH on the BWP may comprise stopping monitoring PDCCH on one or more SSS groups configured on the BWP. The wireless device maintain an active state of the BWP. The first DCI may not indicate an active BWP switching. In an example, during the time window (or when a timer associated with the time window is running), the base station may not transmit PDCCH to the wireless device.

As shown in FIG. 31, when the time window expires, the wireless device may resume PDCCH monitoring on the BWP. Based on resuming PDCCH monitoring the wireless device may receive a second DCI (e.g., $2^{nd}$ DCI) scheduling TB via s PDSCH. The wireless device may receive the TB via the PDSCH scheduled by the second DCI. In an example, in response to the time window expiring, the base station may transmit the second DCI to the wireless device.

In an example, a base station may transmit one or more SSBs periodically to a wireless device, or a plurality of wireless devices. The wireless device (in RRC_idle state, RRC_inactive state, or RRC_connected state) may use the one or more SSBs for time and frequency synchronization with a cell of the base station. An SSB, comprising a primary synchronization signal (PSS), a secondary synchronization signal (SSS), a physical broadcast channel (PBCH), a PBCH DM-RS, may be transmitted based on example embodiments described above with respect to FIG. 11A. An SSB may occupy a number (e.g., 4) of OFDM symbols as shown in FIG. 11A. The base station may transmit one or more SSBs in a SSB burst, e.g., to enable beam-sweeping for PSS/SSS and PBCH. An SSB burst comprise a set of SSBs, each SSB potentially be transmitted on a different beam. SSBs in the SSB burst may be transmitted in time-division multiplexing fashion. In an example, an SSB burst may be always confined to a 5 ms window and is either located in first-half or in the second-half of a 10 ms radio frame. In this specification, an SSB burst may be equivalently referred to as a transmission window (e.g., 5 ms) in which the set of SSBs are transmitted.

In an example, the base station may indicate a transmission periodicity of SSB via RRC message (e.g., ssb-PeriodicityServingCell in ServingCellConfigCommonSIB of SIB1 message, as shown in FIG. 25). A candidate value of the transmission periodicity may be in a range of {5 ms, 10 ms, 20 ms, 40 ms, 80 ms, 160 ms}. The maximum number of candidate SSBs ($L_{max}$) within an SSB burst depends upon a carrier frequency/band of the cell. In an example, $L_{max}$=4 if $f_c$<=3 GHz, wherein $f_c$ is the carrier frequency of the cell. $L_{max}$=8 if 3 GHz<$f_c$<=6 GHz. $L_{max}$=64 if $f_c$>=6 GHz, etc.

In an example, a starting OFDM symbol index of a candidate SSB (occupying 4 OFDM symbols) within a SSB burst (5 ms) may depend on a subcarrier spacing (SCS) and a carrier frequency band of the cell.

FIG. 32 shows an example embodiment of starting OFDM symbol index determination.

As shown in FIG. 32, starting OFDM symbol indexes of SSBs in a SSB burst, for a cell configured with 15 KHz and carrier frequency fc<3 GHz ($L_{max}$=4), are 2, 8, 16, and 22. OFDM symbols in a half-frame are indexed with the first symbol of the first slot being indexed as 0. Starting OFDM symbol indexes of SSBs in a SSB burst, for a cell configured with 15 kHz and carrier frequency 3 GHz<$f_c$<6 GHz ($L_{max}$=8), are 2, 8, 16, 22, 30, 36, 44 and 50, etc. In an example, when the base station is not transmitting the SSBs with beam forming, the base station may transmit only one SSB by using the first SSB starting position.

Figure 33:
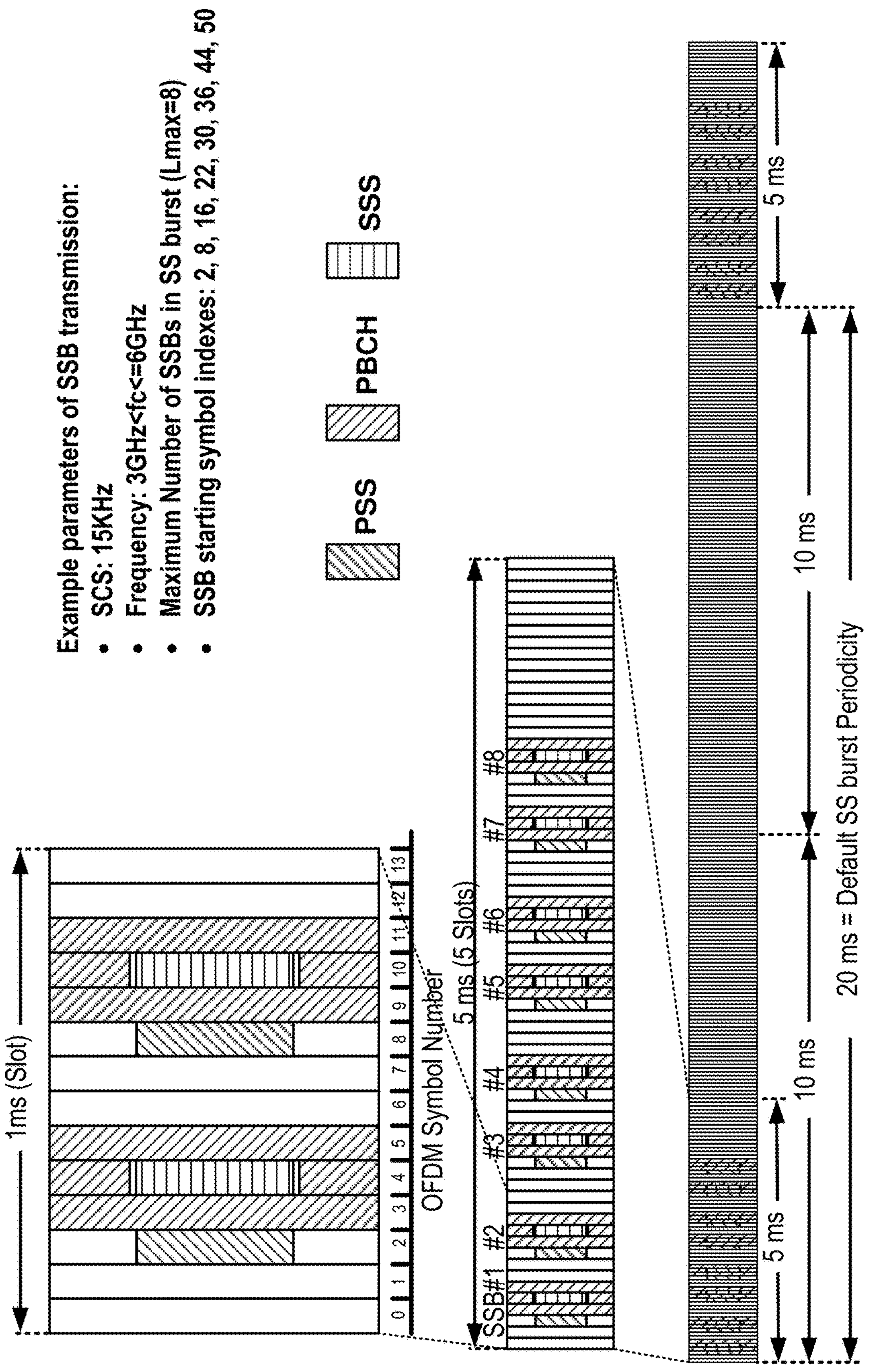
FIG. 33 illustrates an example of SSB transmissions of a base station.

FIG. 33 shows an example embodiment of SSB transmission of a cell by a base station. In the example of FIG. 33, a SCS of the cell is 15 kHz, and the cell is configured with 3 GHz<$f_c$<=6 GHz. Based on example embodiment of FIG. 32, maximum number of candidate SSBs in a SSB burst is 8 (Lmax=8). As shown in FIG. 33, SSB #1 starts at symbol #2 of 70 symbols in 5 ms, SSB #2 starts at symbol #8, SSB #3 starts at symbol #16, SSB #4 starts at symbol #22, SSB #5 starts at symbol #30, SSB #6 starts at symbol #36, SSB #7 starts at symbol #44, and SSB #8 starts at symbol 50. The SSB burst is transmitted in the first half (not the second half as shown in FIG. 33) of a radio frame with 10 ms.

In an example, the SSB bust (also for each SSB of the SSB burst) may be transmitted in a periodicity. In the example of FIG. 33, a default periodicity of a SSB burst is 20 ms, e.g., before a wireless device receives a SIB1 message for initial access of the cell. The base station, with 20 ms transmission periodicity of SSB (or SSB burst), may transmit the SSB burst in the first 5 ms of each 20 ms. The base station does not transmit the SSB burst in the rest 15 ms of the each 20 ms.

In an example embodiment, a base station may transmit a RRC messages (e.g., SIB1) indicating cell specific configuration parameters of SSB transmission. The cell specific configuration parameters may comprise a value for a transmission periodicity (ssb-PeriodicityServingCell) of a SSB burst, locations of a number of SSBs (e.g., active SSBs), of a plurality of candidate SSBs, comprised in the SSB burst. The plurality of candidate SSBs may be implemented based on example embodiments described above with respect to FIG. 32. The cell specific configuration parameters may comprise position indication of a SSB in a SSB burst (e.g., ssb-PositionsInBurst). The position indication may comprise a first bitmap (e.g., groupPresence) and a second bitmap (e.g., inOneGroup) indicating locations of a number of SSBs comprised in a SSB burst.

Figure 34:
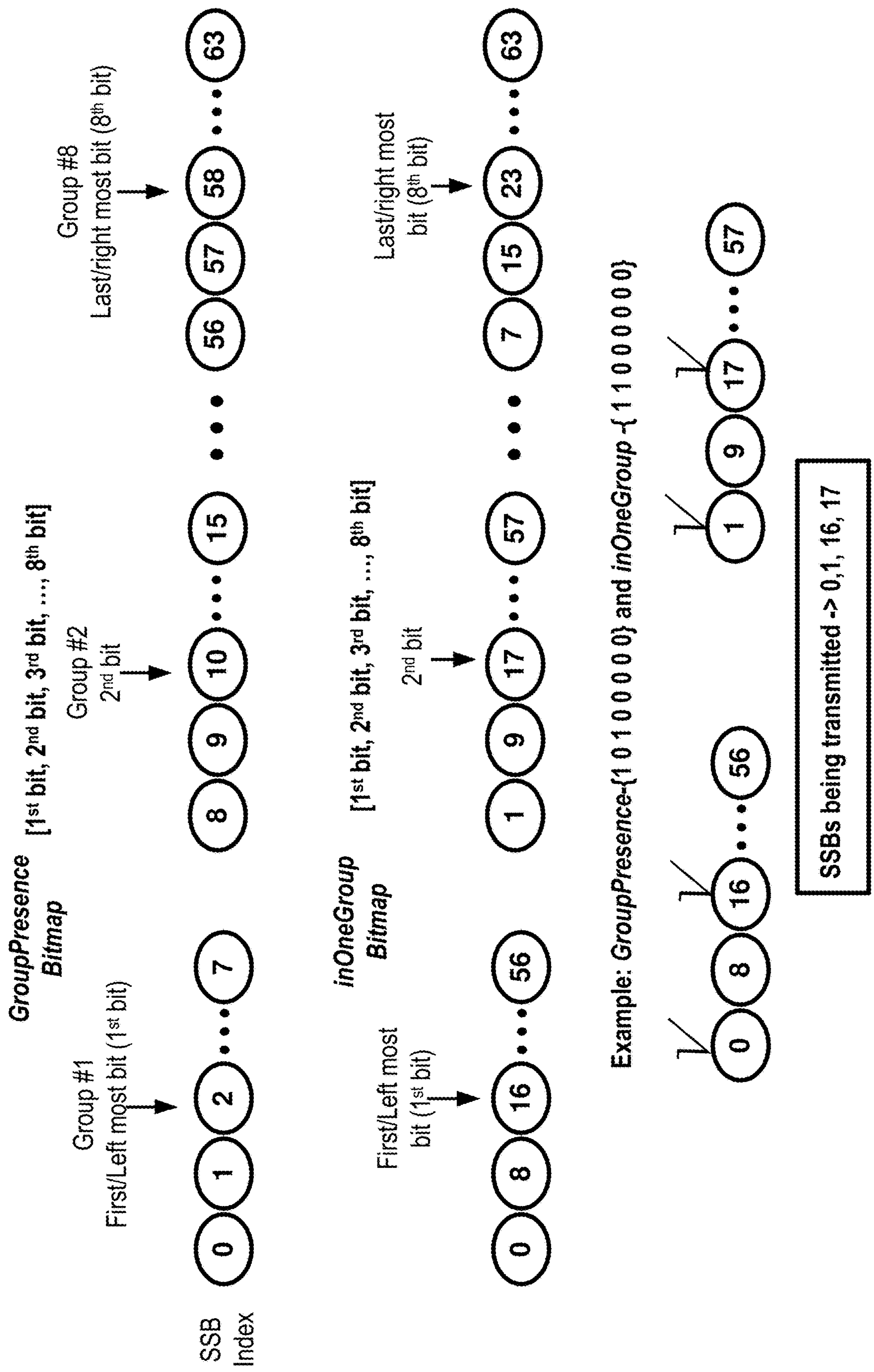
FIG. 34 illustrates an example of SSB transmissions of a base station.

FIG. 34 shows an example embodiment of SSB location indication in a SSB burst.

In the example of FIG. 34, a maximum number of candidate SSBs in an SSB burst is 64. The candidate SSBs may comprise SSBs with indexes from 0 to 63. A first bitmap (groupPresence) (configured by SIB1 message) may comprise a number of bits (e.g., 8), each bit corresponding to a respective group of SSB groups of a plurality of SSBs (which may be the maximum number of candidate SSBs) in a SSB burst. In the example of FIG. 34, a first bit (e.g., left most bit of the first bitmap) may correspond to a first SSB group comprising $1^{st}$ SSB (with SSB index 0), $2^{nd}$ SSB (with SSB index 1), . . . and $8^{th}$ SSB (with SSB index 7). A second bit (e.g., the second bit of the first bitmap) may correspond to a second SSB group comprising $9^{th}$ SSB (with SSB index 8), $10^{th}$ SSB (with SSB index 9), . . . and $16^{th}$ SSB (with SSB index 15). A last bit (e.g., right most bit of the first bitmap) may correspond to an $8^{th}$ SSB group comprising $57^{th}$ SSB (with SSB index 56), $58^{th}$ SSB (with SSB index 57, . . . and $64^{th}$ SSB (with SSB index 63), etc. In an example embodiment, a SSB may belong to at most one SSB group of the first SSB groups. A bit, of the first bitmap, may indicate whether the base station transmit a SSB group, corresponding to the bit, in a SSB burst. In an example, the bit setting to a first value (e.g., 1) may indicate that the corresponding SSB group is transmitted in the SSB burst by the base station. In an example, the bit setting to a second value (e.g., 0) may indicate that the corresponding SSB group is not transmitted in the SSB burst by the base station, or vice versa.

As shown in FIG. 34, a second bitmap (inOneGroup) (configured by SIB1 message) may comprise a number of bits (e.g., 8), each bit corresponding to a respective group of SSB groups of the plurality of SSBs in a SSB burst. In the example of FIG. 34, a first bit (e.g., left most bit of the second bitmap) may correspond to a first SSB group comprising $1^{st}$ SSB (with SSB index 0), $2^{nd}$ SSB (with SSB index 8), . . . and $8^{th}$ SSB (with SSB index 56). A second bit (e.g., the second bit of the second bitmap) may correspond to a second SSB group comprising $1^{st}$ SSB (with SSB index 1), $2^{nd}$ SSB (with SSB index 9), . . . and $8^{th}$ SSB (with SSB index 57). A last bit (e.g., right most bit of the second bitmap) may correspond to an $8^{th}$ SSB group comprising $1^{st}$ SSB (with SSB index 7), $2^{nd}$ SSB (with SSB index 15, . . . and $8^{th}$ SSB (with SSB index 63), etc. In an example, a SSB may belong to at most one SSB group of the second SSB groups. A bit, of the second bitmap, may indicate whether the base station transmit a SSB group, corresponding to the bit, in a SSB burst. In an example, the bit setting to a first value (e.g., 1) may indicate that the corresponding SSB group is transmitted in the SSB burst by the base station. In an example, the bit setting to a second value (e.g., 0) may indicate that the corresponding SSB group is not transmitted in the SSB burst by the base station, or vice versa.

In the example of FIG. 34, the plurality of SSBs (e.g., with SSB index from 0 to 63) may be grouped, for the first bitmap, into first SSB groups, each SSB comprising SSBs with continuous SSB indexes. A first SSB group of the first SSB groups comprises SSBs with SSB indexes from 0 to 7, a second SSB group comprises SSB indexes from 8 to 15, etc. The plurality of SSBs may be also grouped, for the second bitmap, into second SSB groups, each SSB comprising SSBs with discontinuous SSB indexes. A first SSB group of the second SSB groups comprises SSBs with SSB indexes {0, 8, 16, . . . 56}, SSB index gap between two neighbor SSB indexes being 8. A second SSB group of the second SSB groups comprises SSBs with SSB indexes {1, 9, 17, . . . 57}, etc.

In an example embodiment, when $f_c \leq 3$ GHz, maximum number of SSBs within SS burst equals to four and a wireless device may determine that the four leftmost bits of a bitmap (e.g., the first bitmap and/or the second bitmap) are valid. The wireless device may ignore the 4 rightmost bits of the first bitmap and/or the second bitmap.

In the example of FIG. 34, the first bitmap may be indicated, by the base station, as {1 0 1 0 0 0 0 0} and the second bitmap may be indicated as {1 1 0 0 0 0 0 0}. Based on the grouping configuration of the first SSB groups and the second SSB groups, the base station may transmit SSBs with indexes {0 1 16 17} in a SSB burst.

In an example, a base station may transmit a Master Information Block (MIB) on PBCH, to indicate configuration parameters (for CORESET #0) for a wireless device monitoring PDCCH for scheduling a SIB1 message. The base station may transmit a MIB message with a transmission periodicity of 80 ms. The same MIB message may be repeated (according to SSB periodicity) within the 80 ms. Contents of a MIB message are same over 80 ms period. The same MIB is transmitted over all SSBs within a SS burst. In an example, PBCH may indicate that there is no associated SIB1, in which case a wireless device may be pointed to another frequency from where to search for an SSB that is associated with a SIB1 as well as a frequency range where the wireless device may assume no SSB associated with SIB1 is present. The indicated frequency range may be confined within a contiguous spectrum allocation of the same operator in which SSB is detected.

In an example, a base station may transmit a SIB1 message with a periodicity of 160 ms. The base station may transmit the same SIB1 message with variable transmission repetition periodicity within 160 ms. A default transmission repetition periodicity of SIB1 is 20 ms. The base station may determine an actual transmission repetition periodicity based on network implementation. In an example, for SSB and CORESET multiplexing pattern 1, SIB1 repetition transmission period is 20 ms. For SSB and CORESET multiplexing pattern 2/3, SIB1 transmission repetition period is the same as the SSB period. SIB1 may comprise information regarding the availability and scheduling (e.g., mapping of SIBs to SI message, periodicity, SI-window size) of other SIBs, an indication whether one or more SIBs are only provided on-demand and in which case, configuration parameters needed by a wireless device to perform an SI request.

FIG. 35 shows an example of a table of CSI-RS resource configuration parameters. A CSI-RS resource may be transmitted with a number of antenna ports, a CDM type, a density (in terms of REs/port/PRB for a CSI-RS resource). In an example, a base station may transmit one or more CSI-RSs to a wireless device (or a group of wireless devices). The one or more CSI-RSs may be implemented based on example embodiments described above with respect to FIG. 11. A CSI-RS may be based on a reference signal sequence. The wireless device may determine the reference signal sequence r(m) as $$r(m) = \frac{1}{\sqrt{2}}(1 - 2 \cdot c(2m)) + j\frac{1}{\sqrt{2}}(1 - 2 \cdot c(2m + 1)),$$

where c(i) is a pseudo-random sequence with a pseudo-random sequence generator being initialized with $c_{init}$=

$$\left(2^{10}\left(N_{symb}^{slot} n_{s,f}^{\mu} + l + 1\right)(2n_{ID} + 1) + n_{ID}\right) \bmod 2^{31}$$

at the start of each OFDM symbol where $$n_{s,f}^{\mu}$$

is the slot number within a radio frame, l is the OFDM symbol number within a slot, and $n_{ID}$ equals the higher-layer parameter scramblingID or sequenceGenerationConfig. The scramblingID or sequenceGenerationConfig may be implemented based on example embodiments of FIG. 36 which will be explained later.

In an example, for each CSI-RS configured, the wireless device may determine the sequence r(m) being mapped to resources elements $(k,l)_{p,\mu}$ according to $$a_{k,l}^{(p,\mu)} = \beta_{CSIRS} w_f(k') \cdot w_t(l') \cdot r_{l,n_{s,f}}(m')$$

$$m' = \lfloor n\alpha \rfloor + k' + \left\lfloor \frac{\bar{k}\rho}{N_{sc}^{RB}} \right\rfloor$$

$$k = nN_{sc}^{RB} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0, 1, \ldots$$

when the following conditions are fulfilled: the resource element (k,l)_(p,μ) is within the resource blocks occupied by the CSI-RS resource for which the wireless device is configured.

In an example, the reference point for k=0 is subcarrier 0 in common resource block 0. The value of ρ is given by the higher-layer parameter density in CSI-RS-ResourceMapping IE or CSI-RS-CellMobility IE and the number of ports X is given by the higher-layer parameter nrofPorts.

In an example, the wireless device is not expected to receive CSI-RS and DM-RS on the same resource elements.

In an example, a wireless device may assume (or determine) $\beta_{CSIRS}>0$ for a non-zero-power CSI-RS where $\beta_{CSIRS}$ is selected such that the power offset specified by the higher-layer parameter powerControlOffsetSS in the NZP-CSI-RS-Resource IE, if provided, is fulfilled. An NZP-CSI-RS is a CSI-RS with non-zero power transmission, which is contrast to ZP-CSI-RS which is a CSI-RS with zero power transmission.

In an example, the quantities k', l', $w_f$(k'), and $w_t$(l') are given by one or more tables (e.g., as shown in FIG. 35). The one or more tables may be also implemented based on Tables 7.4.1.5.3-1 to 7.4.1.5.3-5 of TS 38.211, where each ($\bar{k},\bar{l}$) in a given row of Table 7.4.1.5.3-1 corresponds to a CDM group of size 1 (no CDM) or size 2, 4, or 8. The CDM type is provided by the higher layer parameter cdm-Type in the CSI-RS-ResourceMapping IE. The indices k' and l' index resource elements within a CDM group.

In an example, time-domain locations $l_0 \in \{0, 1, \ldots, 13\}$ and $l_1 \in \{2, 3, \ldots, 12\}$ are provided by the higher-layer parameters firstOFDMSymbolInTimeDomain and firstOFDMSymbolInTimeDomain2, respectively, in the CSI-RS-ResourceMapping IE or the CSI-RS-ResourceConfigMobility IE and defined relative to the start of a slot.

In an example, frequency-domain location is given by a bitmap provided by the higher-layer parameter frequency DomainAllocation in the CSI-RS-ResourceMapping IE or the CSI-RS-ResourceConfigMobility IE with the bitmap and value of k; in the table (as shown in FIG. 35) given by $$[b_3 \ldots b_0],\ k_{i-1} = f(i) \text{ for row 1 of the table in FIG. 35}$$

$$[b_{11} \ldots b_0],\ k_{i-1} = f(i) \text{ for row 2 of the table in FIG. 35}$$

$$[b_2 \ldots b_0],\ k_{i-1} = 4f(i) \text{ for row 4 of the table in FIG. 35}$$

$[b_5 \ldots b_0]$, $k_{i-1}$=2f(i) for all other cases, where f(i) is the bit number of the $i^{th}$ bit in the bitmap set to one, repeated across every [1/ρ] of the resource blocks configured for CSI-RS reception by the wireless device. The starting position and number of the resource blocks in which the wireless device may assume that CSI-RS is transmitted are given by the higher-layer parameters freqBand and density in the CSI-RS-ResourceMapping IE for the bandwidth part given by the higher-layer parameter BWP-Id in the CSI-ResourceConfig IE or given by the higher-layer parameters nrofPRBs in the CSI-RS-CellMobility IE where the startPRB given by csi-rs-MeasurementBW is relative to common resource block 0.

In an example, a wireless device may determine that a CSI-RS is transmitted using antenna ports p numbered according to $$p = 3000 + s + jL;$$
$$j = 0, 1, \ldots, N/L - 1;$$
$$s = 0, 1, \ldots, L - 1$$

where s is the sequence index provided by Tables 7.4.1.5.3-2 to 7.4.1.5.3-5 of TS 38.211, L∈{1, 2, 4, 8} is the CDM group size, and N is the number of CSI-RS ports. The CDM group index j given in Table 7.4.1.5.3-1 (as shown in FIG. 35) corresponds to the time/frequency locations ($\bar{k}$, $\bar{l}$) for a given row of the table. The CDM groups are numbered in order of increasing frequency domain allocation first and then increasing time domain allocation. For a CSI-RS resource configured as periodic or semi-persistent by the higher-layer parameter resource Type or configured by the higher-layer parameter CSI-RS-CellMobility, the wireless device may assume that the CSI-RS is transmitted in slots satisfying $$\left(N_{slot}^{frame,\mu} n_f + n_{s,f}^{\mu} - T_{offset}\right) \bmod T_{CSI-RS} = 0$$

where the periodicity $T_{CSI-RS}$ (in slots) and slot offset $T_{offset}$ are obtained from the higher-layer parameter CSI-ResourcePeriodicityAndOffset or slotConfig. The wireless device may assume that CSI-RS is transmitted in a candidate slot as described in clause 11.1 of TS 38.213.

In an example, a wireless device may assume that antenna ports within a CSI-RS resource are quasi co-located with QCL Type A, Type D (when applicable), and average gain.

FIG. 36 shows an example of RRC configuration parameters of CSI-RS resource. In an example, a base station may transmit to a wireless device (or a group of wireless devices), one or more RRC messages comprising configuration parameters of CSI-RS resources. The one or more RRC messages may be cell specific RRC messages (which may be applied for all wireless devices), or wireless device specific RRC messages (which may be applied dedicatedly for the wireless device receiving the messages). The one or more RRC messages may comprise CSI-RS-resourceMapping IE to configure resource element mapping of a CSI-RS resource in time domain and frequency domain.

As shown in FIG. 36, a CSI-RS-ResourceMapping IE may comprise, for each CSI-RS resource, a frequency domain allocation indication (by frequencyDomainAllocation), a number of antenna ports (by nrofPorts), a first time domain parameter (firstOFDMSymbolInTimeDomain), a second time domain parameter (firstOFDMSymbolInTimeDomain2), a CDM type indicator, a density indication, a frequency band indication. for a CSI-RS resource, the density indication may indicate 0.5, 1 or 3 RE/port/PRB for X=1, 0.5 or 1 for X=2, 16, 24 or 32, 1 for X=4, 8, 12.

As shown in FIG. 36, a CSI-RS resource, e.g., a none-zero CSI-RS (NZP-CSI-RS), may be configured by the base station with RRC messages, e.g., NZP-CSI-RS-Resource IE. The NZP-CSI-RS-Resource IE may configure, for a CSI-RS resource, an NZP-CSI-RS resource ID (or index), a resource mapping indication (CSI-RS-ResourceMapping), one or more power control parameters (e.g., powerControlOffset, powerControlOffsetSS), a scrambling ID, a periodicity and offset indication, a QCL indication, and etc.

In an example, the base station may configure a plurality of CSI-RS resource sets, each CSI-RS resource set comprising a plurality of CSI-RS resources. As shown in FIG. 36, a CSI-RS resource set may be configured by NZP-CSI-RS-ResourceSet IE. A CSI-RS resource set may be configured with parameters comprising a CSI-RS resource set ID (or index), a number of CSI-RS resource IDs, a repetition indication (indicating on or off), etc.

In an example, the base station may configure a plurality of CSI resource configurations. As shown in FIG. 36, a CSI resource configuration may be configured by the base station with RRC messages, e.g., CSI-ResourceConfig IE. A CSI-ResourceConfig IE may indicate, for a CSI resource configuration, a CSI resource configuration ID, a number of NZP-CSI-RS-Resource sets, a number of SSB resource sets, a BWP ID and a resource type indication (indicating whether the resource is aperiodic, semi-persistence, or periodic resource) and etc.

Figure 37A:
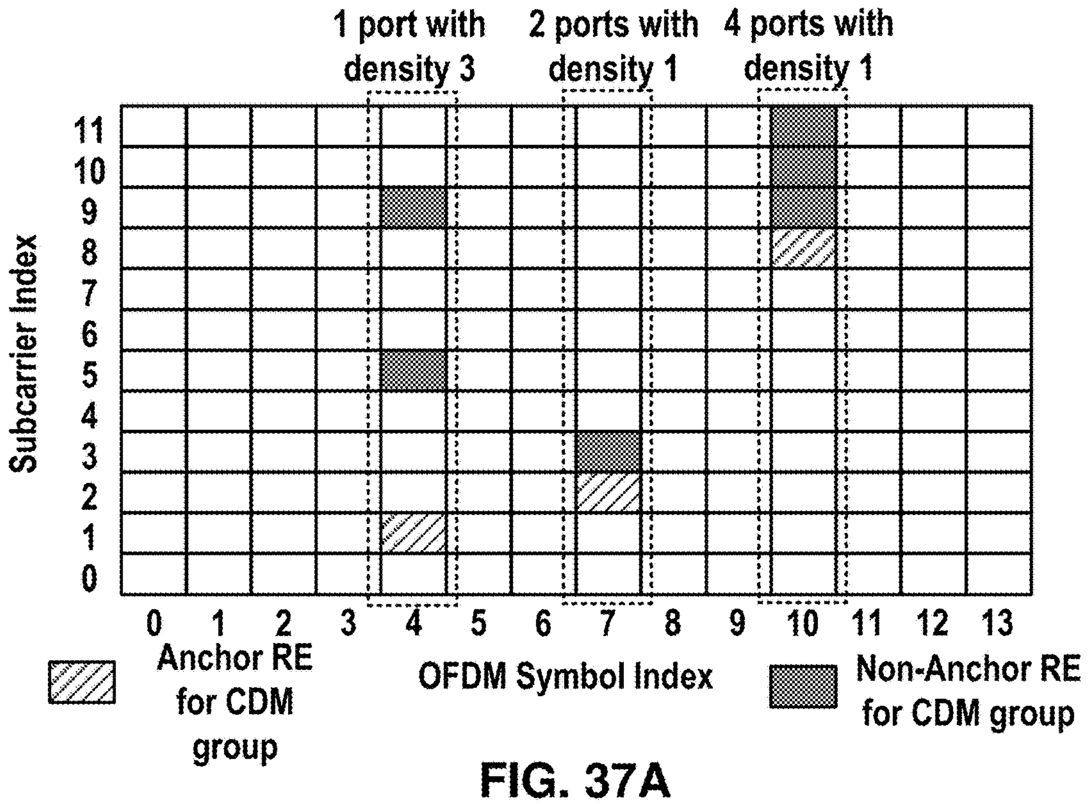
FIG. 37A and FIG. 37B illustrate examples of CSI-RS resource configurations.
Figure 37B:
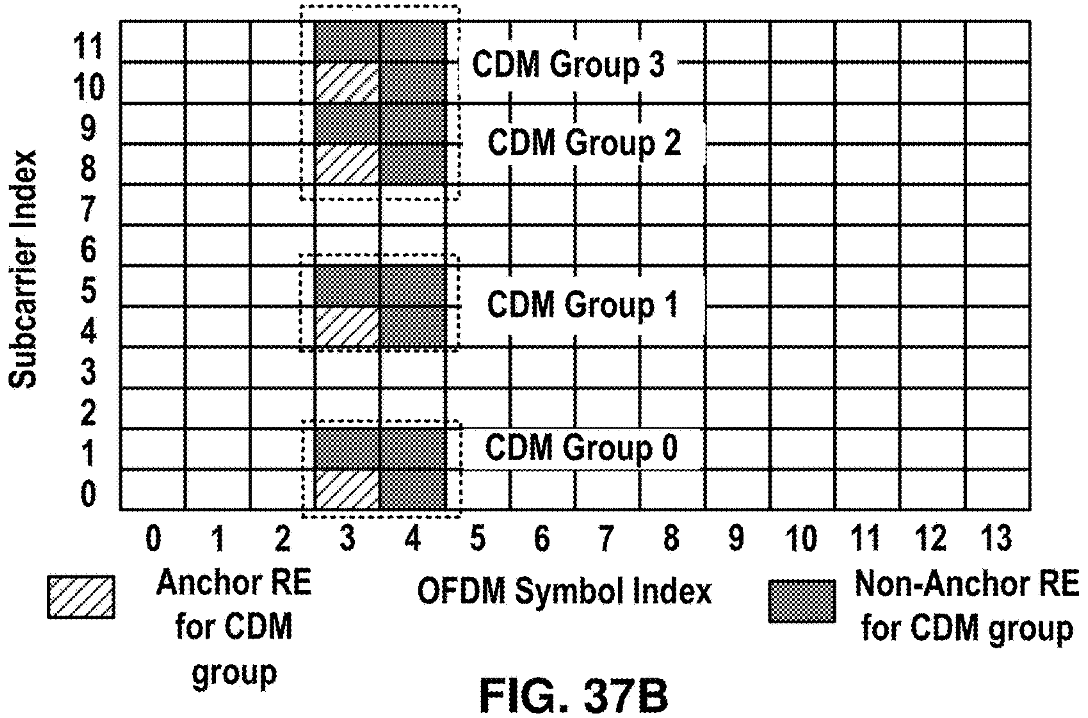

FIG. 37A and FIG. 37B show examples of CSI-RS resources based on configuration parameters described above with respect to FIG. 35 and/or FIG. 36.

In an example, as shown in FIG. 37A, a CSI-RS resource with 1 port and density 3 (e.g., 3 REs/port/RB) may be mapped to RE #1, 5, 9 in a resource block (RB), in OFDM symbol #4 in 14 symbols of a slot. An anchor RE of RE #1, 5 and 9 may be RE #1, which may be indicated in CSI-RS resource Configuration parameters (e.g., via NZP-CSI-RS-Resource (I.E., CSI-RS-ResourceMapping IE and/or FIG. 35). A CSI-RS resource with 2 ports and with density 1 (e.g., 1 RE/port/RB) may be mapped to RE #2 and RE #3 in OFDM symbol #7 in 14 symbols of a slot. A CSI-RS resource with 4 ports and with density 1 (e.g., 1 RE/port/RB) may be mapped to RE #8, RE #9, RE #10 and RE #11 in OFDM symbol #10 of 14 symbols of a slot.

In an example, as shown in FIG. 37B, a CSI-RS resource with 16 ports and density 1 (e.g., 1 RE/port/RB) may be mapped to 4 CDM groups (e.g., CDM group 0, CDM group 1, CDM group 2, CDM group 3). Each CDM group occupies different 4 REs (two pairs of REs in two consecutive OFDM symbols). In an example, CDM group 0 occupies RE #0 and RE #1 of OFDM symbols #3 and #4. CDM group 1 occupies RE #4 and RE #5 of OFDM symbols #3 and #4. CDM group 2 occupies RE #8 and RE #9 of OFDM symbols #3 and #4. CDM group 3 occupies RE #10 and RE #11 of OFDM symbols #3 and #4. Within a CDM group, 4 ports are code-division multiplexed on the 4 REs with an 2×2 orthogonal code (e.g., based on Table 7.4.1.5.3-4 of TS 38.211).

Figure 38:
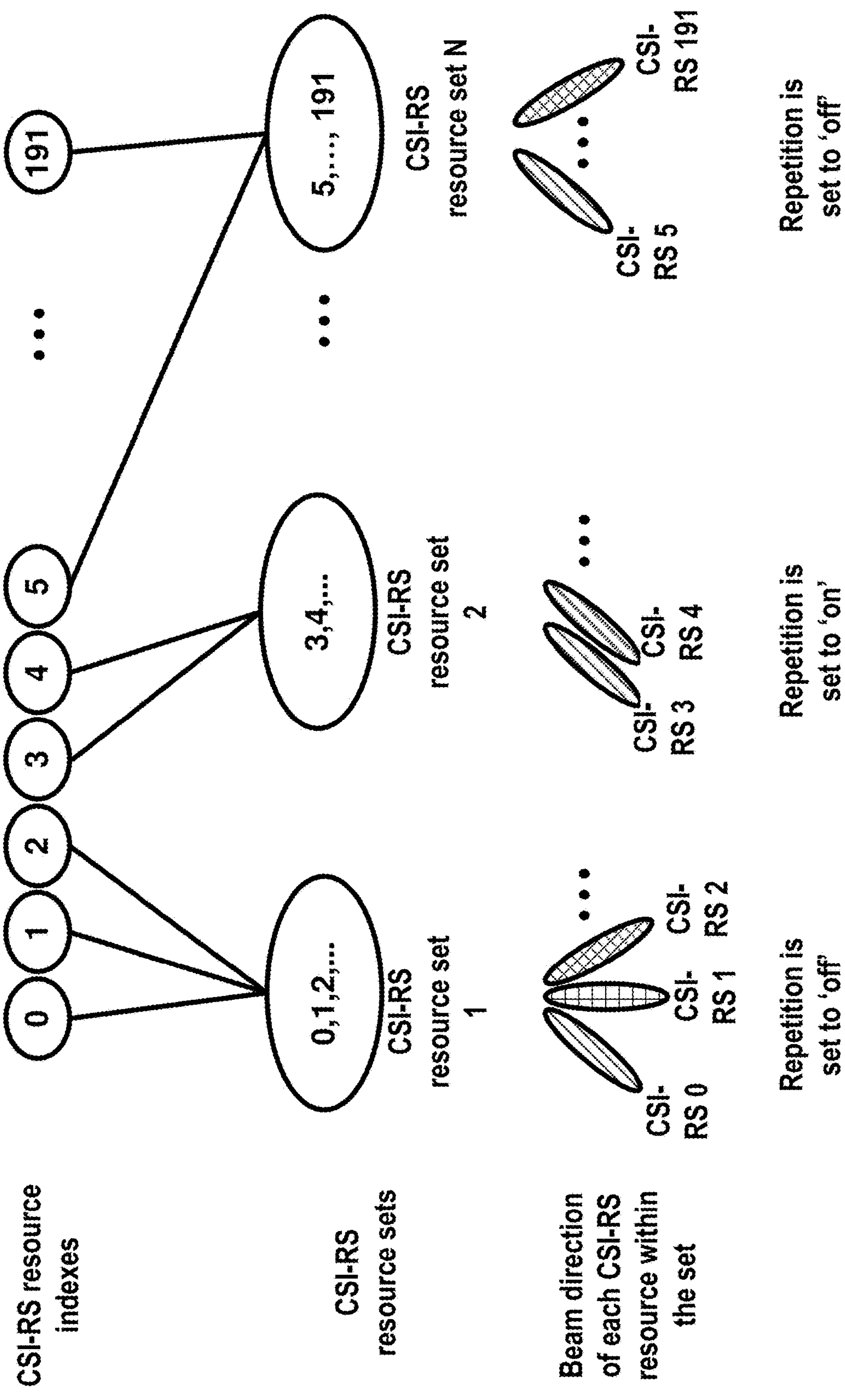
FIG. 38 illustrates examples of CSI-RS resource sets.

FIG. 38 shows an example of CS-RS resource set. A base station may transmit RRC messages comprising configuration parameters of a plurality of CSI-RS resource sets, each CSI-RS resource set comprising a plurality of CSI-RS resources (e.g., based on configuration parameters of FIG. 35, FIG. 36, FIG. 37A and/or FIG. 37B). Configuration of CSI-RS resource set may enable the base station to transmit per CSI-RS resource set indication for saving signaling overhead. A CSI-RS resource of the plurality of CSI-RS resources may be implemented based on example embodiments described above with respect to FIG. 35, FIG. 36, FIG. 37A and/or FIG. 37B.

As shown in FIG. 38, a base station may configure a plurality of CSI-RS resource sets (e.g., CSI-RS resource set 1, CSI-RS resource set 2, . . . , CSI-RS resource set N). each CSI-RS resource set may comprise overlapping CSI-RS resources, or non-overlapping CSI-RS resources. In an example, CSI-RS resource set 1 may comprise CSI-RS resource 0, CSI-RS resource 1, CSI-RS resource 2, etc. CSI-RS resource set 2 may comprise CSI-RS resource 3, CSI-RS resource 4, etc. CSI-RS resource set N may comprise CSI-RS resource 5 . . . , and CSI-RS resource 191, etc.

In an example, each CSI-RS resource set may be configured with a repetition indicator.

In an example, a base station may transmit, each CSI-RS resource, of the CSI-RS resource set, with different spatial domain filter (or transmission beam), in response to the repetition indicator, of the CSI-RS resource set, being set to 'off'. Based on transmitting each CSI-RS resource in different beam, a wireless device may perform downlink beam management (e.g., P2 in FIG. 12A, to identify a best transmission beam among the multiple beams of the multiple CSI-RS resources of the CSI-RS resource set). Downlink beam management may be implemented based on example embodiments described above with respect to FIG. 12A and/or FIG. 12B.

In an example, a base station may transmit, each CSI-RS resource, of the CSI-RS resource set, with the same spatial domain filter (or transmission beam), in response to the repetition indicator, of the CSI-RS resource set, being set to 'on'. Based on transmitting each CSI-RS resource in the same beam, a wireless device may perform downlink beam management (e.g., P3 in FIG. 12A, to identify a best receiving beam at the wireless device for receiving the CSI-RS resource set).

In the example of FIG. 38, CSI-RS resource set 1 is associated with a repetition indicator being set to 'off', wherein the base station may transmit CSI-RS #0, CSI-RS #1 and CSI-RS #2 with different transmission beams. CSI- RS resource set 2 is associated with a repetition indicator being set to 'on', wherein the base station may transmit CSI-RS #3 and CSI-RS #4 with the same transmission beam. CSI-RS resource set N is associated with a repetition indicator being set to 'off', wherein the base station may transmit CSI-RS #5 and CSI-RS #191 with different transmission beams.

Based on example embodiments of FIG. 37A, FIG. 37B and/or FIG. 38, a base station may flexibly configure CSI-RS resources and CSI-RS resource sets. With the configured CSI-RS resources and CSI-RS resource sets, a wireless device may perform beam management procedure and/or measure the channel quality and/or transmit a CSI report to the base station.

In an example, a wireless device may transmit periodic CSI report, aperiodic CSI report and/or semi-persistent CSI report to a base station. The time and frequency resources that may be used by the wireless device to report CSI are controlled by the base station. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP or L1-SINR.

FIG. 39 shows an example of RRC configuration of CSI report configuration. In an example, for CQI, PMI, CRI, SSBRI, LI, RI, L1-RSRP, L1-SINR a wireless device is configured by higher layers with N≥1 CSI-ReportConfig Reporting Settings (e.g., as shown in FIG. 39), M≥1 CSI-ResourceConfig Resource Settings (e.g., based on example embodiments described above with respect to FIG. 36), and one or two list(s) of trigger states (given by the higher layer parameters CSI-AperiodicTriggerStateList and CSI-SemiPersistentOnPUSCH-TriggerStateList). Each trigger state in CSI-Aperiodic TriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

Based on FIG. 39, each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the wireless device such as the layer indicator (LI), L1-RSRP, L1-SINR, CRI, and SSBRI (SSB Resource Indicator).

Based on FIG. 39, time domain behavior of the CSI-ReportConfig is indicated by the higher layer parameter reportConfigType and may be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related or L1-SINR-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig may be configured to enable time domain restriction for channel measurements and timeRestrictionForInterferenceMeasurements may be configured to enable time domain restriction for interference measurements. The CSI-ReportConfig may also contain CodebookConfig, which contains configuration parameters for Type-I, Type II, Enhanced Type II CSI, or Further Enhanced Type II Port Selection including codebook subset restriction when applicable, and configurations of group-based reporting.

In an example, each CSI Resource Setting CSI-ResourceConfig (e.g., as shown in FIG. 36) contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

In an example, time domain behavior of the CSI-RS resources within a CSI Resource Setting are indicated by the higher layer parameter resource Type and may be set to aperiodic, periodic, or semi-persistent (e.g., based on example of FIG. 36). For periodic and semi-persistent CSI Resource Settings, when the wireless device is configured with group based beam report, the number of CSI Resource Sets configured is S=2, otherwise the number of CSI-RS Resource Sets configured is limited to S=1.

For periodic and semi-persistent CSI Resource Settings, the configured periodicity and slot offset is given in the numerology of its associated DL BWP, as given by BWP-id. When a wireless device is configured with multiple CSI-ResourceConfigs including the same NZP CSI-RS resource ID, the same time domain behavior may be configured for the CSI-ResourceConfigs. When a wireless device is configured with multiple CSI-ResourceConfigs including the same CSI-IM resource ID, the same time-domain behavior may be configured for the CSI-ResourceConfigs. All CSI Resource Settings linked to a CSI Report Setting may have the same time domain behavior.

In an example, for L1-SINR measurement, when one Resource Setting is configured, the Resource Setting (given by higher layer parameter resourcesForChannelMeasurement) is for channel and interference measurement on NZP CSI-RS for L1-SINR computation. A wireless device may assume that same 1 port NZP CSI-RS resource(s) with density 3 REs/RB is used for both channel and interference measurements.

In an example, for L1-SINR measurement, when two Resource Settings are configured, the first one Resource Setting (given by higher layer parameter resourcesForChannelMeasurement) is for channel measurement on SSB or NZP CSI-RS and the second one (given by either higher layer parameter csi-IM-ResourcesForInterference or higher layer parameter nzp-CSI-RS-ResourcesForInterference) is for interference measurement performed on CSI-IM or on 1 port NZP CSI-RS with density 3 REs/RB, where each SSB or NZP CSI-RS resource for channel measurement is associated with one CSI-IM resource or one NZP CSI-RS resource for interference measurement by the ordering of the SSB or NZP CSI-RS resource for channel measurement and CSI-IM resource or NZP CSI-RS resource for interference measurement in the corresponding resource sets. The number of SSB(s) or CSI-RS resources for channel measurement equals to the number of CSI-IM resources or the number of NZP CSI-RS resource for interference measurement. In this case, a wireless device may apply the SSB, or 'typeD' RS configured with qcl-Type set to 'typeD' to the NZP CSI-RS resource for channel measurement, as the reference RS for determining 'typeD' assumption for the corresponding CSI-IM resource or the corresponding NZP CSI-RS resource for interference measurement configured for one CSI reporting. A wireless device may expect that the NZP CSI-RS resource set for channel measurement and the NZP-CSI-RS resource set for interference measurement, if any, are configured with the higher layer parameter repetition.

In an example, for semi-persistent or periodic CSI, each CSI-ReportConfig is linked to periodic or semi-persistent Resource Setting(s). When one Resource Setting (given by higher layer parameter resourcesForChannelMeasurement) is configured, the Resource Setting is for channel measurement for L1-RSRP or for channel and interference measurement for L1-SINR computation. When two Resource Settings are configured, the first Resource Setting (given by higher layer parameter resourcesForChannelMeasurement) is for channel measurement and the second Resource Setting (e.g., by csi-IM-ResourcesForInterference) is used for interference measurement performed on CSI-IM. For L1-SINR computation, the second Resource Setting (given by higher layer parameter csi-IM-ResourcesForInterference or higher layer parameter nzp-CSI-RS-ResourceForInterference) is used for interference measurement performed on CSI-IM or on NZP CSI-RS.

In an example, for L1-RSRP computation, a wireless device may be configured with CSI-RS resources, SS/PBCH Block resources or both CSI-RS and SS/PBCH block resources, when resource-wise quasi co-located with 'type C' and 'typeD' when applicable. The wireless device may be configured with CSI-RS resource setting up to 16 CSI-RS resource sets having up to 64 resources within each set. The total number of different CSI-RS resources over all resource sets is no more than 128.

In an example, for L1-RSRP reporting, if the higher layer parameter nrofReportedRS in CSI-ReportConfig is configured to be one, the reported L1-RSRP value is defined by a 7-bit value in the range [−140,−44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the wireless device may use differential L1-RSRP based reporting, where the largest measured value of L1-RSRP is quantized to a 7-bit value in the range [−140,−44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in TS 38.133.

In an example, when the higher layer parameter groupBasedBeamReporting-r17 in CSI-ReportConfig is configured, the wireless device may indicate the CSI Resource Set associated with the largest measured value of L1-RSRP, and for each group, CRI or SSBRI of the indicated CSI Resource Set is present first.

In an example, if the higher layer parameter timeRestrictionForChannelMeasurements in CSI-ReportConfig is set to "notConfigured", the wireless device may derive the channel measurements for computing L1-RSRP value reported in uplink slot n based on only the SS/PBCH or NZP CSI-RS, no later than the CSI reference resource, (defined in TS 38.211) associated with the CSI resource setting.

In an example, if the higher layer parameter timeRestrictionForChannelMeasurements in CSI-ReportConfig is set to "Configured", the wireless device may derive the channel measurements for computing L1-RSRP reported in uplink slot n based on only the most recent, no later than the CSI reference resource, occasion of SS/PBCH or NZP CSI-RS (defined in TS 38.211) associated with the CSI resource setting.

In an example, for L1-SINR computation, for channel measurement the wireless device may be configured with NZP CSI-RS resources and/or SS/PBCH Block resources, for interference measurement the wireless device may be configured with NZP CSI-RS or CSI-IM resources. for channel measurement, the wireless device may be configured with CSI-RS resource setting with up to 16 resource sets, with a total of up to 64 CSI-RS resources or up to 64 SS/PBCH Block resources.

In an example, for L1-SINR reporting, if the higher layer parameter nrofReportedRS in CSI-ReportConfig is configured to be one, the reported L1-SINR value is defined by a 7-bit value in the range [−23, 40] dB with 0.5 dB step size, and if the higher layer parameter nrofReportedRS is configured to be larger than one, or if the higher layer parameter groupBasedBeamReporting is configured as 'enabled', the wireless device may use differential L1-SINR based reporting, where the largest measured value of L1-SINR is quantized to a 7-bit value in the range [−23, 40] dB with 0.5 dB step size, and the differential L1-SINR is quantized to a 4-bit value. The differential L1-SINR is computed with 1 dB step size with a reference to the largest measured L1-SINR value which is part of the same L1-SINR reporting instance. When NZP CSI-RS is configured for channel measurement and/or interference measurement, the reported L1-SINR values should not be compensated by the power offset(s) given by higher layer parameter powerControOffsetSS or powerControlOffset.

In an example, when one or two resource settings are configured for L1-SINR measurement, if the higher layer parameter timeRestrictionForChannelMeasurements in CSI-ReportConfig is set to 'notConfigured', the wireless device may derive the channel measurements for computing L1-SINR reported in uplink slot n based on only the SSB or NZP CSI-RS, no later than the CSI reference resource, (defined in TS 38.211) associated with the CSI resource setting. If the higher layer parameter timeRestrictionForChannelMeasurements in CSI-ReportConfig is set to 'configured', the wireless device may derive the channel measurements for computing L1-SINR reported in uplink slot n based on only the most recent, no later than the CSI reference resource, occasion of SSB or NZP CSI-RS (defined in TS 38.211) associated with the CSI resource setting. If the higher layer parameter timeRestrictionForInterferenceMeasurements in CSI-ReportConfig is set to 'notConfigured', the wireless device may derive the interference measurements for computing L1-SINR reported in uplink slot n based on only the CSI-IM or NZP CSI-RS for interference measurement (defined in TS 38.211) or NZP CSI-RS for channel and interference measurement no later than the CSI reference resource associated with the CSI resource setting. If the higher layer parameter timeRestrictionForInterferenceMeasurements in CSI-ReportConfig is set to 'configured', the wireless device may derive the interference measurements for computing the L1-SINR reported in uplink slot n based on the most recent, no later than the CSI reference resource, occasion of CSI-IM or NZP CSI-RS for interference measurement (TS 38.211) or NZP CSI-RS for channel and interference measurement associated with the CSI resource setting.

FIG. 40 shows an example of CSI measurement and reporting configuration on a cell. In an example, a base station may transmit to a wireless device one or more RRC messages (e.g., ServingCellConfig IE) comprising configuration parameters of a cell. ServingCellConfig IE may be used to configure (add or modify) the wireless device with a serving cell, which may be a SpCell or an SCell of an MCG or SCG. The configuration parameters may be mostly wireless device specific but partly also cell specific (e.g., in additionally configured bandwidth parts). Reconfiguration between a PUCCH and PUCCHless SCell may be supported using an SCell release and add. The configuration parameters may indicate a plurality of BWPs configured on the cell, PDCCH configuration, PDSCH configuration, CSI measurement configuration (e.g., CSI-MeasConfig IE) and etc. CSI measurement configuration, as shown in FIG. 40, may be associated with parameters indicating a plurality of NZP-CSI-RS resources, a plurality of NZP-CSI-RS resource sets, a plurality of CSI-IM resources, a plurality of CSI-IM resource sets, a plurality of CSI-SSB resource sets, a plurality of CSI resource configurations, a plurality of CSI report configurations, and etc. An NZP-CSI-RS resource (and set) may be implemented based on example embodiments described above with respect to FIG. 35, FIG. 36, FIG. 37A, FIG. 37B and/or FIG. 38. A CSI resource configuration (by CSI-ResourceConfig IE) may be implemented based on example embodiments described above with respect to FIG. 36. A CSI report configuration (by CSI-ReportConfig IE) may be implemented based on example embodiments described above with respect to FIG. 39.

In an example, a wireless device may derive CSI report based on SS/PBCH block and/or CSI-RSs. The wireless device may measure SS-RSRP (L1-RSRP) (also described in specification of TS 38.215) within a SMTC occasion based on the SS-RSRP being defined as the linear average over the power contributions (in [W]) of the REs that carry SSSs. For SS-RSRP determination based on DM-RS for PBCH and, if indicated by higher layers, the wireless device may use CSI-RSs in addition to SSSs for SS-RSRP measurement. The wireless device may measure SS-RSRP using DM-RS for PBCH or CSI-RSs by linear averaging over the power contributions of the REs that carry corresponding RSs taking into account power scaling for the RSs. If SS-RSRP is not used for L1-RSRP, the additional use of CSI-RS for SS-RSRP determination is not applicable. The wireless device may measure SS-RSRP only among the reference signals corresponding to SS/PBCH blocks with the same SS/PBCH block index and the same physical-layer cell identity. The wireless device may measure SS-RSRP only from an indicated set of SS/PBCH block(s) if SS-RSRP is not used for L1-RSRP and higher-layers indicate the set of SS/PBCH blocks for performing SS-RSRP measurements. The wireless device may determine, for frequency range 1, a reference point for the SS-RSRP measurement as an antenna connector of the wireless device. The wireless device may, for frequency range 2, measure SS-RSRP based on a combined signal from antenna elements corresponding to a given receiver branch. For frequency range 1 and 2, if receiver diversity is in use by the wireless device, the wireless device may report SS-RSRP with a value not lower than the corresponding SS-RSRP of any of the individual receiver branches.

In an example, the wireless device may measure CSI-RSRP (L1-RSRP) (also described in specification of TS 38.215) based on the CSI-RSRP being defined as the linear average over the power contributions (in [W]) of the resource elements of the antenna port(s) that carry CSI reference signals configured for RSRP measurements within the considered measurement frequency bandwidth in the configured CSI-RS occasions. For CSI-RSRP determination CSI reference signals transmitted on antenna port 3000 may be used. If CSI-RSRP is used for L1-RSRP, CSI reference signals transmitted on antenna ports 3000, 3001 may be used for CSI-RSRP determination. For intra-frequency CSI-RSRP measurements, if the measurement gap is not configured, wireless device is not expected to measure the CSI-RS resource(s) outside of the active downlink bandwidth part. For frequency range 1, the reference point for the CSI-RSRP may be the antenna connector of the UE. For frequency range 2, CSI-RSRP may be measured based on the combined signal from antenna elements corresponding to a given receiver branch. For frequency range 1 and 2, if receiver diversity is in use by the UE, the reported CSI-RSRP value may not be lower than the corresponding CSI-RSRP of any of the individual receiver branches.

In an example, the wireless device may measure SS-RSRQ (L1-RSRQ) (also described in specification of TS 38.215) based on SS-RSRQ being defined as the ratio of N×SS-RSRP/NR carrier RSSI, where N is the number of resource blocks in the NR carrier RSSI measurement bandwidth. The measurements in the numerator and denominator may be made over the same set of resource blocks. NR carrier Received Signal Strength Indicator (NR carrier RSSI), comprises the linear average of the total received power (in [W]) observed only in certain OFDM symbols of measurement time resource(s), in the measurement bandwidth, over N number of resource blocks from all sources, including co-channel serving and non-serving cells, adjacent channel interference, thermal noise etc. For cell selection, the measurement time resources(s) for NR Carrier RSSI are not constrained. Otherwise, the measurement time resource (s) for NR Carrier RSSI are confined within SMTC window duration. If indicated by higher-layers, if measurement gap is not used, the NR Carrier RSSI is measured in slots within the SMTC window duration that are indicated by the higher layer parameter measurementSlots and in predefined OFDM symbols and, if measurement gap is used, the NR Carrier RSSI is measured in slots within the SMTC window duration that are indicated by the higher layer parameter measurementSlots and in the predefined OFDM symbols that are overlapped with the measurement gap. For intra-frequency measurements, NR Carrier RSSI is measured with timing reference corresponding to the serving cell in the frequency layer. For inter-frequency measurements, NR Carrier RSSI is measured with timing reference corresponding to any cell in the target frequency layer. Otherwise not indicated by higher-layers, if measurement gap is not used, NR Carrier RSSI is measured from OFDM symbols within SMTC window duration and, if measurement gap is used, NR Carrier RSSI is measured from OFDM symbols corresponding to overlapped time span between SMTC window duration and the measurement gap. If higher-layers indicate certain SS/PBCH blocks for performing SS-RSRQ measurements, then SS-RSRP is measured only from the indicated set of SS/PBCH block(s). For frequency range 1, the reference point for the SS-RSRQ may be the antenna connector of the UE. For frequency range 2, NR Carrier RSSI may be measured based on the combined signal from antenna elements corresponding to a given receiver branch, where the combining for NR Carrier RSSI may be the same as the one used for SS-RSRP measurements. For frequency range 1 and 2, if receiver diversity is in use by the UE, the reported SS-RSRQ value may not be lower than the corresponding SS-RSRQ of any of the individual receiver branches.

In an example, the wireless device may measure CSI-RSRQ (L1-RSRQ) (also described in specification of TS 38.215) based on CSI-RSRQ being defined as the ratio of N×CSI-RSRP to CSI-RSSI, where N is the number of resource blocks in the CSI-RSSI measurement bandwidth. The measurements in the numerator and denominator may be made over the same set of resource blocks. CSI Received Signal Strength Indicator (CSI-RSSI), comprises the linear average of the total received power (in [W]) observed only in OFDM symbols of measurement time resource(s), in the measurement bandwidth, over N number of resource blocks from all sources, including co-channel serving and non-serving cells, adjacent channel interference, thermal noise etc. The measurement time resource(s) for CSI-RSSI corresponds to OFDM symbols containing configured CSI-RS occasions. For CSI-RSRQ determination CSI reference signals transmitted on antenna port 3000 may be used. For intra-frequency CSI-RSRQ measurements, if the measurement gap is not configured, wireless device is not expected to measure the CSI-RS resource(s) outside of the active downlink bandwidth part. For frequency range 1, the reference point for the CSI-RSRQ may be the antenna connector of the UE. For frequency range 2, CSI-RSSI may be measured based on the combined signal from antenna elements corresponding to a given receiver branch, where the combining for CSI-RSSI may be the same as the one used for CSI-RSRP measurements. For frequency range 1 and 2, if receiver diversity is in use by the UE, the reported CSI-RSRQ value may not be lower than the corresponding CSI-RSRQ of any of the individual receiver branches.

In an example, the wireless device may measure SS-SINR (L1-SINR) (also described in specification of TS 38.215) based on SS-SINR being defined as the linear average over the power contribution (in [W]) of the resource elements carrying SS signals divided by the linear average of the noise and interference power contribution (in [W]). If SS-SINR is used for L1-SINR reporting with dedicated interference measurement resources, the interference and noise is measured over resource(s) indicated by higher layers. Otherwise, the interference and noise are measured over the resource elements carrying SS signals within the same frequency bandwidth. The measurement time resource(s) for SS-SINR are confined within SMTC window duration. If SS-SINR is used for L1-SINR as configured by reporting configurations, the measurement time resources(s) restriction by SMTC window duration is not applicable. For SS-SINR determination demodulation reference signals for physical broadcast channel (PBCH) in addition to secondary synchronization signals may be used. If SS-SINR is not used for L1-SINR and higher-layers indicate certain SS/PBCH blocks for performing SS-SINR measurements, then SS-SINR is measured only from the indicated set of SS/PBCH block(s). For frequency range 1, the reference point for the SS-SINR may be the antenna connector of the UE. For frequency range 2, SS-SINR may be measured based on the combined signal from antenna elements corresponding to a given receiver branch. For frequency range 1 and 2, if receiver diversity is in use by the UE, the reported SS-SINR value may not be lower than the corresponding SS-SINR of any of the individual receiver branches.

In an example, the wireless device may measure CSI-SINR (L1-SINR) (also described in specification of TS 38.215) based on CSI-SINR being defined as the linear average over the power contribution (in [W]) of the resource elements carrying CSI reference signals divided by the linear average of the noise and interference power contribution (in [W]). If CSI-SINR is used for L1-SINR reporting with dedicated interference measurement resources, the interference and noise is measured over resource(s) indicated by higher layers. Otherwise, the interference and noise are measured over the resource elements carrying CSI reference signals within the same frequency bandwidth. For CSI-SINR determination CSI reference signals transmitted on antenna port 3000 may be used. If CSI-SINR is used for L1-SINR, CSI reference signals transmitted on antenna ports 3000, 3001 may be used for CSI-SINR determination. For intra-frequency CSI-SINR measurements not used for L1-SINR reporting, if the measurement gap is not configured, wireless device is not expected to measure the CSI-RS resource(s) outside of the active downlink bandwidth part. For frequency range 1, the reference point for the CSI-SINR may be the antenna connector of the UE. For frequency range 2, CSI-SINR may be measured based on the combined signal from antenna elements corresponding to a given receiver branch. For frequency range 1 and 2, if receiver diversity is in use by the UE, the reported CSI-SINR value may not be lower than the corresponding CSI-SINR of any of the individual receiver branches.

Based on FIG. 35, FIG. 36, FIG. 37A, FIG. 37B, FIG. 38, FIG. 39 and/or FIG. 40, a wireless device may obtain CSI-RS configuration parameters and measure CSI (and/or beam). The wireless device may transmit CSI report to a base station. The base station, based on receiving the CSI report, may determine a scheduling strategy (e.g., determining a transmission beam, bandwidth, MCS, antenna ports, layers, ranks, etc.) for the wireless device.

In an example, network energy saving may be of great importance for environmental sustainability, to reduce environmental impact (greenhouse gas emissions), and for operational cost savings. As 5G is becoming pervasive across industries and geographical areas, handling more advanced services and applications requiring very high data rates (e.g., XR), networks may become denser, use more antennas, larger bandwidths and more frequency bands. The environmental impact of 5G may need to stay under control, and novel solutions to improve network energy savings need to be developed.

In existing technologies, a base station, when a wireless device does not have data traffic to transmit/receive, may indicate the wireless device to perform power saving operations, e.g., based on examples described above with respect to FIG. 28, FIG. 29A, FIG. 29B, FIG. 30A, FIG. 30B and/or FIG. 31. However, when the wireless device performs the power saving operation, the base station may still need to transmit always-on and/or periodic signals for other wireless devices (e.g., for purpose of time and frequency synchronization, phase tracking, positioning, beam management, etc.). The power saving operations implemented by a wireless device may not be applicable to the base station and therefore the base station cannot take advantage of these power savings.

In existing technologies, a base station, when there is no active wireless devices in the coverage of the base station, may still transmit some always-on signals (e.g., MIB, SIB1, SSBs, periodical CSI-RSs, discovery RS, etc.). If the base station needs to reduce transmission power of the always-on downlink signal transmission and/or reduce beams/antenna port of transmission of the always-on downlink signal, the base station may transmit a RRC message (e.g., SIB1, cell-specific RRC message, UE-specific RRC message, etc.) indicating a reduced transmission power for the always-on downlink signal transmission and/or a reduced number of beams (e.g., by ssb-PositionsInBurst) for the always-on downlink signal transmission, e.g., based on example embodiments described above with respect to FIG. 25 and/or FIG. 34.

In existing implementations of wireless systems, SIB1 may be transmitted with a fixed transmission periodicity of 160 ms (with repetition transmissions within 160 ms). The contents of SIB transmission may be same among the repetition transmissions within 160 ms. The base station may transmit, at least 160 ms after transmitting a first SIB1, a second SIB1 indicating a change of SSB transmission power, SSB transmission periodicity and/or SSB locations in a SSB burst.

In existing technologies, a base station may configure (by RRC messages) a plurality of NZP-CSI-RS resource sets for a wireless device. In an example, for aperiodic resource type, at most maxNrofNZP-CSI-RS-ResourceSetsPerConfig (which may be 16) NZP-CSI-RS resource sets may be configured. For the periodic resource type, at most 1 resource set may be configured. For each CSI-RS resource set, at most maxNrofNZP-CSI-RS-ResourcesPerSet (which may be 64) NZP-CSI-RS resources may be configured.

In existing technologies, for CSI report, a number (e.g., at most 8) of NZP-CSI-RS resources may be configured for an NZP-CSI-RS resource set. For periodic CSI-RS type, an NZP-CSI-RS resource may be configured with a transmission periodicity (e.g., a value of 4 slots, 5 slots, 8 slots, 10 slots, 16 slots, 20 slots, 32 slots, 40 slots, 64 slots, 80 slots, 160 slots, 320 slots, 640 slots and etc.). In an example, when a CSI-RS resource is 1 port, the density may be at most 3 REs/RB. A CSI-RS resource may be mapped to a plurality of RBs (e.g., multiples of 4) comprised in a cell. The smallest configurable number is the minimum of 24 and the width of the associated BWP. If the configured value is larger than the width of the corresponding BWP, the wireless device may assume that the actual CSI-RS bandwidth is equal to the width of the BWP.

In existing technologies, when configured with periodic NZP-CSI-RS resources (and resource set(s), the base station may keep transmitting the periodic NZP-CSI-RS resources according to the configuration parameters of the periodic NZP-CSI-RS resources, e.g., with a transmission density, a transmission periodicity, a number of CSI-RS resources, a transmission bandwidth, a number of antenna ports, etc. Different from aperiodic NZP-CSI-RS resources (which is triggered by DCI and is transmitted one-shot by the base station) or semi-persistent CSI-RS resources (which is activated by a first SP-CSI-RS resource set Activation/Deactivation MAC CE and is transmitted by the base station until deactivated by second SP-CSI-RS resource set Activation/Deactivation MAC CE), the base station may keep transmitting the periodic NZP-CSI-RS resources, even when there are few wireless devices in the cell, or no (active) wireless device in the cell. The periodic NZP-CSI-RSs may be transmitted based on example embodiments described above with respect to FIG. 35, FIG. 36, FIG. 37A, FIG. 37B, FIG. 38, FIG. 39 and/or FIG. 40. Different NZP-CSI-RSs may be transmitted with different transmission beams. In order to reduce power consumption for the base station with regard to periodic NZP-CSI-RS transmission when there is a light load of traffic in the cell or with no active wireless device in the cell, the base station, by implementing existing technologies, may transmit a new RRC message (e.g., SIB1, cell-specific RRC message, UE-specific RRC message, etc.) indicating a reconfiguration of the periodic NZP-CSI-RS resources, e.g., to release the NZP-CSI resources, reduce transmission density, number of antenna ports, reduce number of resources, reduce transmission bandwidth, reduce transmission periodicity, etc. However, transmitting RRC message to adjust/change CSI-RS transmission parameters may not be efficient, e.g., considering a dynamic and fast-changing traffic pattern (e.g., in scale of symbols/slots) of different wireless devices in 5G system and/or future system. In general, by implementing existing technologies, a wireless device may require 10 ms~20 ms to process a RRC message depending on the contents of the RRC message; this time is too long compared to the scale of symbols/slots of wireless device data traffic and so power savings provided by such change to CSI-RS transmission parameters are reduced.

There is a need to dynamically reduce power consumption of a base station for transmission of periodic CSI-RSs, especially when there is no load or light load in coverage of a cell of the base station.

Example embodiments may comprise a base station dynamically adjusting P-CSI-RS transmission parameters, by transmitting a MAC CE and/or a DCI, when the base station transitions from a non-energy-saving state to an energy saving state. A search space, a DCI format, and/or a control resource set, associated with the DCI for the energy saving indication, may be configured by the base station in one or more RRC messages. The adjusted parameters, of the P-CSI-RS transmissions, may comprise at least one of: a number of beams, a number of antenna ports, a transmission density, a transmission periodicity, a transmission bandwidth, etc. The MAC CE/DCI may comprise a bitfield with a codepoint indicating which P-CSI-RS resource (or set) of a plurality of P-CSI-RSs (or sets) will be switched on (or switched off) in the energy saving state. The MAC CE/DCI may comprise a bitmap wherein each bit of the bitmap corresponds to a respective P-CSI-RS resource (or set) of the plurality of P-CSI-RS resource (or sets) and indicates whether to switch off the transmission of the corresponding P-CSI-RS resource (or set). The bitfield and/or the bitmap may be configured by the base station for a DCI format to indicate the P-CSI-RS switch on/off. Based on receiving the MAC CE/DCI indicating the adjusted parameters, the wireless device may adjust channel quality monitoring or beam management procedure according to the adjusted CSI-RS parameters. The wireless device may obtain correct CSI report and/or beam report for the base station in the energy saving state. Example embodiments may improve power consumption of the base station for transmitting P-CSI-RS resources because, for example, the base station may be enabled to dynamically switch off transmission of some P-CSI-RS resources. Example embodiments may allow the base station to obtain accurate CSI/beam report, in the energy saving state, which may be used for maintaining connection with the wireless device and/or may be used as initial CSI/beam report later when the base station switches to the non-energy-saving state from the energy saving state.

Example embodiments may comprise a base station switching off periodical transmissions of P-CSI-RSs (or P-CSI-RS resource set(s)), in response to transmitting a DCI indicating an energy saving. The base station may keep transmitting the SSBs (or one or more of the SSBs) based on a periodicity, in response to transmitting the DCI indicating the energy saving. In response to receiving the DCI, a wireless device may determine that the P-CSI-RSs (configured in RRC messages) are switched off by the base station. In response to receiving the DCI, the wireless device may determine that the SSBs are still being periodically transmitted by the base station (with or without parameter changes based on configuration or indication of the RRC message, a MAC CE and/or the DCI). Also, the DCI indicating the energy saving may indicate to the wireless device of a portion of the P-CSI-RSs that are switched off and that will no longer be transmitted by the base station.

The wireless device may obtain (or measure) periodic CSI quantities based on SSBs for a cell (e.g., when the cell is transitioned into an energy saving state by the base station, or when the base station is in the energy saving state). Also, based on the DCI, the wireless device will not receive the P-CSI-RSs that are switched off and may stop obtaining periodic CSI quantities of those switched off P-CSI-RSs.

Figure 41:
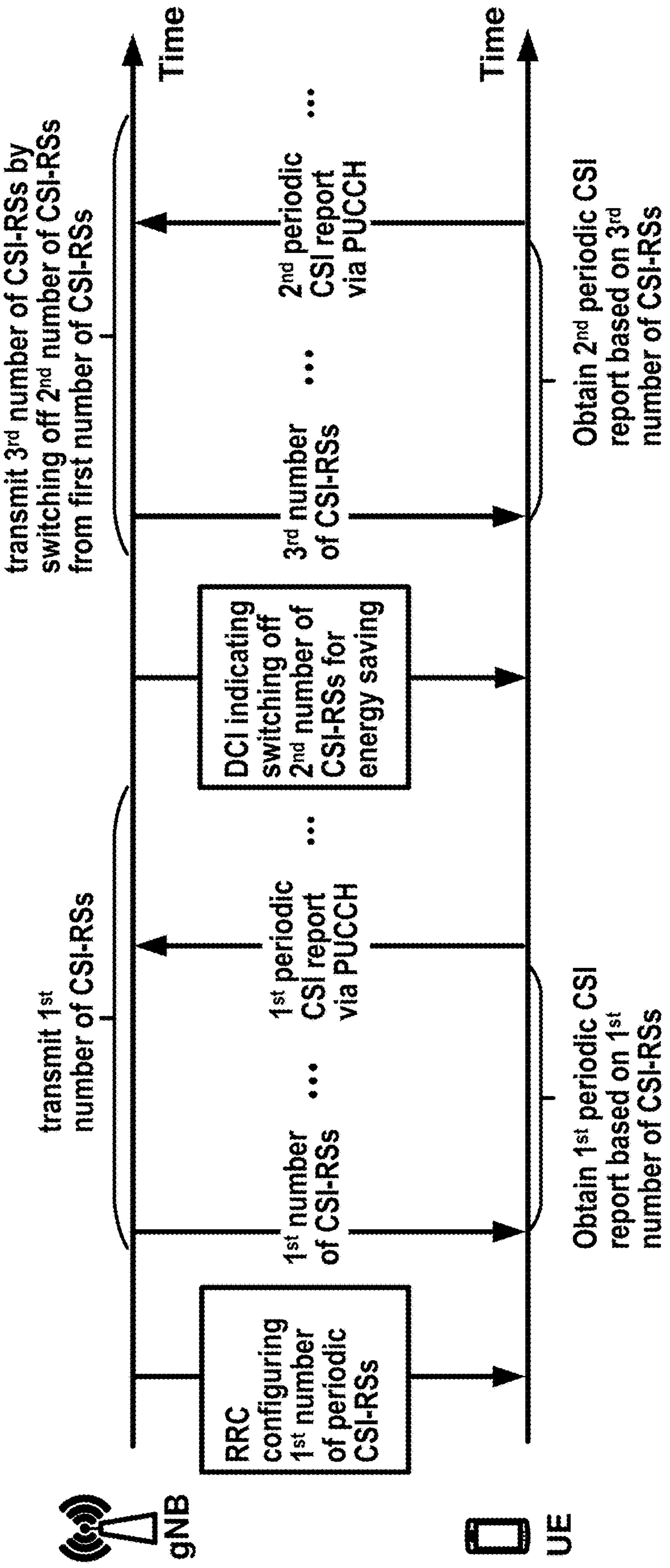
FIG. 41 illustrates an example embodiment of periodic CSI-RS transmissions and CSI reporting in energy saving.

FIG. 41 shows an example embodiment of CSI-RS configuration and CSI reporting for network energy saving. In an example, a base station (gNB) may transmit, and/or a wireless device may receive (UE), one or more RRC messages indicating first configuration parameter of a plurality of periodic CSI-RS (P-CSI-RS) resources (e.g., $1^{st}$ number of periodic CSI-RSs in FIG. 41). A P-CSI-RS may be an NZP-CSI-RS which is a periodic CSI-RS transmitted with a non-zero power. The one or more RRC messages may be a cell specific RRC message, or a wireless device specific RRC message, based on example embodiments described above with respect to FIG. 35, FIG. 36, FIG. 37A, FIG. 37B, FIG. 38, FIG. 39 and/or FIG. 40. The configuration parameters may indicate a first number of P-CSI-RS resources in a CSI-RS resource set. The CSI-RS resource set may comprise the first number of P-CSI-RS resources, e.g., based on example embodiments of FIG. 38. The configuration parameters may indicate $1^{st}$ transmission density, $1^{st}$ transmission bandwidth, $1^{st}$ transmission periodicity for each P-CSI-RS resource of the $1^{st}$ number of P-CSI-RS resources in the CSI-RS resource set. The configuration parameters may indicate a number of CSI-RS resource sets. Different CSI-RS resource sets may be used for the wireless device for measuring different CSI quantities (e.g., CQI, PMI, CRI, SSBRI, LI, RI, L1-RSRP, L1-SINR, and etc.).

In an example, based on the one or more RRC messages, the base station may transmit the P-CSI-RSs in the configured resources.

As shown in FIG. 41, the wireless device, based on periodically transmitted P-CSI-RSs ($1^{st}$ number of CSI-RSs) configured in the one or more RRC messages, may determine that the P-CSI-RSs are transmitted in configured locations (time domain and frequency domain) with a configured periodicity, with a configured number of beams, and/or with a configured transmission power. Based on the determining, the wireless device may obtain $1^{st}$ periodic CSI/beam measurements (e.g., CSI/L1-RSRP/L1-SINR, etc.). The wireless device may measure the CSI/beam quantities, based on example embodiments described above with respect to FIG. 40.

In an example, the wireless device may further measure CSI quantities based on periodic transmitted SSBs. A SSB may be implemented based on example embodiments described above with respect to FIG. 32, FIG. 33 and/or FIG. 34. The wireless device may transmit CSI report based on measurements on SSBs and P-CSI-RSs according to configuration parameters of the CSI report (e.g., based on example embodiments described above with respect to FIG. 36 and/or FIG. 39). The CSI report, measured based on SSBs and P-CSI-RSs, may comprise a SSB index of a SSB (e.g., with the best RSRP value among RSRP values of SSBs), a CSI-R resource index of a P-CSI-RS (e.g., with the best RSRP value among RSRP values of the P-CSI-RSs), a RSRP value and/or a differential RSRP value.

In an example (e.g., in high frequency deployment), the base station may transmit SSBs with wider beams than the P-CSI-RSs. The base station transmits SSBs with wider beams to achieve sufficient coverage for multiple wireless devices in a cell. The base station transmits P-CSI-RSs with narrower beams to facilitate a specific wireless device to identify a good beam pair between the wireless device and the base station, e.g., for actual data/control information transmissions.

In an example, the wireless device, based on the measured CSI report, may transmit $1^{st}$ periodic CSI report via uplink channel (e.g., PUCCH/PUSCH). The $1^{st}$ periodic CSI report may comprise a plurality of CSI quantities (e.g., CQI, PMI, CRI, SSBRI, LI, RI, L1-RSRP, L1-SINR, and etc.), based on configuration parameters of the CSI report, as shown in FIG. 39. In an example, the wireless device may transmit the $1^{st}$ periodic CSI report via a PUCCH resource configured for the periodic CSI report.

In an example, the $1^{st}$ periodic CSI report measured via $1^{st}$ P-CSI-RSs and/or SSBs may be referred to CSI report in normal power state (or non-energy-saving state). The $1^{st}$ P-CSI-RSs transmitted by the base station may be referred to as CSI-RSs in normal power state.

In an example embodiment, the base station may determine to transition from a normal power state (or a non-energy-saving state) to an energy saving state, for one or more cells. The base station may transmit $1^{st}$ number of P-CSI-RSs with $1^{st}$ configuration parameters when the base station is in the normal power state. The base station may transmit $1^{st}$ number of P-CSI-RSs (via a cell) with $1^{st}$ transmission periodicity, with $1^{st}$ transmission density, with $1^{st}$ transmission bandwidth, with a first number of P-CSI-RSs (in a CSI-RS resource set), and/or with a first number of CSI-RS resource sets, in transmission occasions when the base station is in the normal power state. The base station may determine the transitioning based on wireless device assistance information, received from the wireless device, regarding traffic pattern, data volume, latency requirement, etc. In the example (not shown in FIG. 41), the wireless device may transmit the wireless device assistance information to the base station in a RRC message, a MAC CE and/or an UCI. The wireless device assistance information may comprise a data volume of (expected/predicted) data packets of the wireless device, a power state of the wireless device, a service type of the wireless device, etc. In an example, the base station may determine the transitioning based on uplink signal (e.g., SRS, PRACH, DM-RS, UCI, etc.) measurement/assessment/detection at the base station. The base station may determine the transitioning based on information exchange from a neighbor base station via X2 interface, wherein the information exchange may comprise indication of the transitioning, traffic load information, etc.

As shown in FIG. 41, the base station may transmit, and/or the wireless device may receive, a DCI (or a MAC CE) comprising an energy saving indication indicating a switching-off of $2^{nd}$ number of P-CSI-RSs from the $1^{st}$ number of P-CSI-RSs and/or a transition from the non-energy-saving state to the energy saving state (for one or more cells). The DCI (or a MAC CE) may indicate $2^{nd}$ transmission periodicity, $2^{nd}$ transmission density, $2^{nd}$ transmission bandwidth for transmission of $1^{st}$ number of P-CSI-RS resources for the energy saving state. In an example embodiment, the base station may transit, via a search space (and a control resource set) of the cell, the DCI comprising an energy saving indication. The energy saving indication may indicate a transition from the non-energy-saving state (or mode/configuration) to the energy saving state (or mode/configuration). In an example embodiment, the one or more RRC messages may comprise configuration parameters of the search space and/or the control resource set. A search space may be implemented based on example embodiments described above with respect to FIG. 14A, FIG. 14B and/or FIG. 27. A control resource set may be implemented based on example embodiments described above with respect to FIG. 14A, FIG. 14B and/or FIG. 26.

In an example embodiment, the energy saving indication may be indicated by a MAC CE. The base station may transmit, and/or the wireless device may receive, a MAC CE comprising an energy saving indication. A MAC CE associated with a LCID identifying a specific usage of the MAC CE may be implemented based on example embodiments described above with respect to FIG. 17A, FIG. 17B, FIG. 17C, FIG. 18A, FIG. 18B, FIG. 19 and FIG. 20. The MAC CE comprising the energy saving indication may be associated with a LCID value different from anyone of FIG. 19 and/or FIG. 20. The MAC CE comprising the energy saving indication may have a flexible payload size with a MAC subheader, e.g., based on example embodiments described above with respect to FIG. 17A and/or FIG. 17B. The MAC CE comprising the energy saving indication may have a fixed payload size with a MAC subheader, e.g., based on example embodiments described above with respect to FIG. 17C.

In an example, a MAC CE comprising the energy saving indication may reuse an existing MAC CE. In an example, a R bit of SCell activation/deactivation MAC CE (based on example of FIG. 21A and/or FIG. 21B) may be used for energy saving indication. The R bit may indicate a power offset value for SSB transmission (e.g., of a PCell, or of PCell and all active SCells) in energy saving state.

In an example embodiment, the search space, for transmission of the DCI indicating the energy saving, may be a type 0 common search space. The DCI comprising the energy saving indication may share a same type 0 common search space with other DCIs (e.g., scheduling SIBx message). The base station may transmit configuration parameter of the type 0 common search space in a MIB message or a SIB1 message. The base station transmits the MIB message via a PBCH and indicating system information of the base station. The base station transmits the SIB1 message, scheduled by a group common PDCCH with CRC scrambled by SI-RNTI, indicating at least one of: information for evaluating if a wireless device is allowed to access a cell of the base station, information for scheduling of other system information, radio resource configuration information that is common for all wireless devices, and barring information applied to access control.

In an example embodiment, the search space, for transmission of the DCI indicating the energy saving, may be a type 2 common search space. The DCI comprising the energy saving indication may share a same type 2 common search space with other DCIs (e.g., scheduling paging message) with CRC scrambled by P-RNTI.

In an example embodiment, the search space, for transmission of the DCI indicating the energy saving, may be a type 3 common search space. The DCI comprising the energy saving indication may share the same type 3 common search space with a plurality of group common DCIs. The plurality of group common DCIs may comprise: a DCI format 2_0 indicating slot format based on CRC bits scrambled by SFI-RNTI, a DCI format 2_1 indicating a downlink pre-emption based on CRC being scrambled by an INT-RNTI, a DCI format 2_4 indicating an uplink cancellation based on CRC being scrambled by a CI-RNTI, a DCI format 2_2/2_3 indicating uplink power control based on CRC bits being scrambled with TPC-PUSCH-RNTI, TPC-PUCCH-RNTI, or TPC-SRS-RNTI, a DCI format 2_6 indicating a power saving operation (wake-up/go-to-sleep and/or SCell dormancy) based on CRC bits being scrambled by PS-RNTI, etc.

In an example embodiment, the search space, for transmission of the DCI indicating the energy saving, may be a wireless device specific search space, different from common search spaces (type 0/0A/1/2/3).

In an example embodiment, the DCI indicating the energy saving may be a legacy DCI format (e.g., DCI format 1_0/1_1/1_2/0_0/0_1/0_2/2_0/2_1/2_2/2_3/2_4/2_5/2_6). The DCI may be a new DCI format, with a same DCI size as DCI format 2_0/2_1/2_2/2_3/2_4/2_5/2_6. The DCI may be a new DCI format with a same DCI size as DCI format 1_0/0_0. The DCI may be a new DCI format with a same DCI size as DCI format 1_1/0_1.

In an example embodiment, the configuration parameters of the one or more RRC messages may indicate that a control resource set of a plurality of control resource sets is associated with the search space for the DCI indicating the energy saving for the base station. The configuration parameters may indicate, for the control resource set, frequency radio resources, time domain resources, CCE-to-REG mapping type, etc.

In an example embodiment, the wireless device may monitor the search space (of the control resource set) for receiving the DCI indicating the energy saving for the base station. The base station may transmit the DCI, in one or radio resources associated with the search space (in the control resource set), comprising the energy saving indication for the base station.

In an example, a DCI (or the MAC CE), indicating the energy saving operation for the base station, may indicate second configuration parameters (density, bandwidth, antenna ports, number of resources of the resource set, etc.) of the P-CSI-RS resources. The DCI may have a DCI format (e.g., based on example embodiments of FIG. 23) comprising a field indicating to switch off $2^{nd}$ number of CSI-RSs from the $1^{st}$ number of CSI-RSs. The field of the DCI with a DCI format may be configured by the base station to indicate the P-CSI-RS switch on/off. In an example, the base station may transmit RRC messages comprising configuration parameters indicating that the DCI format comprises the field indicating the P-CSI-RS switch on/off.

In an example, the field may be a bitmap, wherein each bit of the bitmap may correspond to a respective CSI-RS of the $1^{st}$ number of CSI-RSs and may indicate whether to switch off the corresponding CSI-RS. The bitmap may be implemented based on example embodiments of FIG. 42.

In an example, the field may indicate a CSI-RS switching on/off pattern of a plurality of CSI-RS switching on/off patterns. The plurality of CSI-RS switching on/off patterns may be implemented based on example embodiments of FIG. 43A and/or FIG. 43B.

In an example, the field may indicate a second transmission periodicity of the P-CSI-RS resources. The second transmission periodicity may be longer than the first transmission periodicity for normal state (or non-energy-saving state). In an example, the second transmission periodicity of the P-CSI-RS resources for the energy saving operation may be configured by the base station or preconfigured without indication by the MAC CE and/or DCI.

In an example, the field may indicate a second transmission density of the P-CSI-RS resources. The second transmission density may be smaller than the first transmission density for the normal power state. In an example, the second transmission density of the P-CSI-RS resources for the energy saving operation may be configured by the base station or preconfigured without indication by the MAC CE and/or DCI.

In an example, the field may indicate a second transmission bandwidth of the P-CSI-RS resources. The second transmission bandwidth may be smaller than the first transmission bandwidth for the normal power state. In an example, the second transmission bandwidth of the P-CSI-RS resources for the energy saving operation may be configured by the base station or preconfigured without indication by the MAC CE and/or DCI.

In an example, the field may indicate a second transmission power of the P-CSI-RS resources. The second transmission power may be smaller than the first transmission power for the normal power state. In an example, the second transmission power of the P-CSI-RS resources for the energy saving operation may be configured by the base station or preconfigured without indication by the MAC CE and/or DCI.

Based on the transmitting the DCI, the base station may transition from the non-energy-saving state to an energy saving state. In an example, the base station, when in an energy saving state, may reduce transmission power, reduce transmission beams/ports, and/or increase transmission periodicity value of P-CSI-RSs (e.g., from 4 ms to 20 ms, from 20 ms to 40 ms, etc.), compared with a non-energy-saving state. A transmission periodicity of P-CSI-RSs may be implemented based on example embodiments described above with respect to FIG. 36. In an example, the base station, when in an energy saving state, may transmit P-CSI-RS resources with a smaller number of resources (or with a smaller number of beams) than in a non-energy-saving state.

In an example, the base station, when in an energy saving state, may keep receiving uplink transmissions from wireless device(s).

In an example, the base station, when in the energy saving state, may maintain RRC connections (or may not break RRC connections) with one or more wireless devices which have set up RRC connections with one or more cells of the base station. The base station, in the energy saving state, may maintain existing interface(s) with other network entities (e.g., another base station, an AMF, a UPF, etc., as shown in FIG. 1B).

In an example, a transition from the non-energy-saving state to the energy saving state may comprise maintaining an active state of a BWP unchanged in the cell. Maintaining the active state of the BWP for the energy saving state transition may allow a quick switching (without BWP switching) between non-energy-saving state and energy saving state. A BWP switching may be implemented based on example embodiments described above with respect to FIG. 22.

In an example, a transition from the non-energy-saving state to the energy saving state may comprising switching an active BWP from a first active BWP to a second BWP of the cell comprising a plurality of BWPs. Switching active BWPs for the energy saving state transition may simplify implementation of the wireless device and the base station, e.g., by maintaining backward compatibility. A BWP may be implemented based on example embodiments described above with respect to FIG. 9, FIG. 22 and/or FIG. 26. In an example, the first active BWP is a BWP, of the plurality of BWPs, on which the base station is transmitting downlink signals and/or the wireless device is receiving the downlink signals. The second BWP may be a default BWP, a dormant BWP, or a BWP configured different from the default BWP and/or the dormant BWP, dedicated for energy saving for the base station. A default BWP or dormant BWP may be configured by the base station for power saving of the wireless device, e.g., based on example embodiments of FIG. 22 and/or FIG. 28. In an example, the second BWP may be a downlink-only BWP on which downlink transmission by a base station is allowed only and uplink transmission by a wireless device is not allowed. In an example, the second BWP may be an uplink-only BWP on which uplink transmission by a wireless device is allowed only and downlink transmission by a base station is not allowed. The one or more RRC messages may indicate the second BWP, from the plurality of BWPs of the cell, as a BWP to use in the energy saving state. The second BWP may have smaller bandwidth than the first active BWP. The second BWP may not be configured with PDCCH, PDSCH and/or CSI-RS, compared with the first active BWP. In response to transitioning to the energy saving state, the base station (and/or the wireless device) may switch from the first active BWP to the second BWP.

As shown in FIG. 41, based on transmitting the DCI indicating to switch off $2^{nd}$ number of CSI-RSs (or CSI-RS resources) from the $1^{st}$ number of CSI-RSs for energy saving, the base station may stop transmitting the $2^{nd}$ number of CSI-RSs and may transmit $3^{rd}$ number of CSI-RSs of the $1^{st}$ number of CSI-RS. The $3^{rd}$ number of CSI-RSs do not comprise any RS resource of the $2^{nd}$ number of CSI-RSs.

In an example, the base station may transmit the $3^{rd}$ number of CSI-RSs with a second transmission periodicity, a second transmission density, a second transmission bandwidth and/or with a second number of antenna ports.

In an example, based on receiving the DCI indicating to switch off $2^{nd}$ number of CSI-RSs from the $1^{st}$ number of CSI-RSs, the wireless device may stop monitoring (or measuring) beam/CSI quantities for the $2^{nd}$ number of CSI-RSs and/or may monitor $3^{rd}$ number of CSI-RSs from the $1^{st}$ number of CSI-RSs for beam/CSI measurements.

In an example, based on monitoring $3^{rd}$ number of CSI-RSs (and/or stopping monitoring $2^{nd}$ number of CSI-RSs, the wireless device may obtain $2^{nd}$ periodic CSI report.

In an example, in the energy saving state, the wireless device may transmit $2^{nd}$ periodic CSI report, obtained based on the $3^{rd}$ number of CSI-RSs, to the base station.

In an example, in the energy saving state, the wireless device may skip transmitting $2^{nd}$ periodic CSI report to the base station.

In an example, the base station may transmit a command (e.g., RRC/MAC CE/DCI) indicating whether the wireless device may transmit the $2^{nd}$ periodic CSI report to the base station in the energy saving state. In response to the command indicating that the wireless device may transmit the $2^{nd}$ periodic CSI report in the energy saving state, the wireless device may transmit the $2^{nd}$ periodic CSI report to the base station in the energy saving state. In response to the command indicating that the wireless device may skip the transmission of the $2^{nd}$ periodic CSI report in the energy saving state, the wireless device may skip the transmitting the $2^{nd}$ periodic CSI report to the base station in the energy saving state. Example embodiments may allow the base station to flexibly control periodic CSI report transmission of a wireless device when the base station is in energy saving state.

Based on example embodiments of FIG. 41, the base station may dynamically adjust P-CSI-RS transmission parameters when the base station is in energy saving state. The adjusted parameters may be transmitted in a MAC CE and/or a DCI. The adjusted parameters, of the P-CSI-RS transmissions, may comprise at least one of: a number of beams, a number of antenna ports, a transmission density, a transmission periodicity, a transmission bandwidth, etc. Based on receiving the MAC CE and/or the DCI indicating the adjusted parameters, the wireless device may adjust channel quality monitoring or beam management procedure according to the adjusted CSI-RS parameters. The wireless device may obtain correct CSI report and/or beam report for the base station in the energy saving state. Example embodiments may improve power consumption of the base station for transmitting P-CSI-RS resources. Example embodiments may allow the base station to obtain accurate CSI/beam report, in the energy saving state, which may be used for maintaining connection with the wireless device and/or may be used as initial CSI/beam report later when the base station switches to the non-energy-saving state from the energy saving state.

In an example, one or more embodiments of FIG. 41 may be extended to indicate CSI-RS resource set switching on/off for the energy saving operation. In an example, the base station may configure a plurality of P-CSI-RS resource sets (e.g., based on examples of FIG. 36 and/or FIG. 40), wherein each P-CSI-RS resource set may comprise a plurality of P-CSI-RS resources, based on examples of FIG. 37. Different P-CSI-RS resource sets may be transmitted by the base station and used by the wireless device for measuring different CSI quantities (e.g., CQI, PMI, CRI, SSBRI, LI, RI, L1-RSRP, L1-SINR, and etc.). Different P-CSI-RS resource sets may be transmitted by the base station from different TRPs to the wireless device for CSI measurements (e.g., CQI, PMI, CRI, SSBRI, LI, RI, L1-RSRP, L1-SINR, and etc.), wherein each CSI measurement corresponds to a respective TRP of multiple TRPs of the base station. The base station may transmit the MAC CE/DCI indicating to switch off one or more P-CSI-RS resource sets of the plurality of P-CSI-RS resource sets for the energy saving state. The MAC CE/DCI may comprise a bitmap wherein each bit of the bitmap corresponds to a respective P-CSI-RS resource set of the plurality of P-CSI-RS resource sets and may indicate whether to switch off the transmission of the corresponding P-CSI-RS resource set. In response to switching off the transmission of a P-CSI-RS resource set, the base station may stop transmission of all P-CSI-RS resources belonging to the P-CSI-RS resource set.

In an example, one or more embodiments of FIG. 41 may be further extended to indicate to switch off one or more P-CSI-RS resources of one or more P-CSI-RS resource sets. In an example, the MAC CE/DCI, for indicating energy saving operation for the base station, may comprise a plurality of information blocks, each information block corresponding to a respective P-CSI-RS resource set of a plurality of P-CSI-RS resource sets. An information block of the MAC CE/DCI may comprise a bitmap, wherein each bit of the bitmap corresponds to a respective P-CSI-RS resource of a plurality of P-CSI-RS resources belonging to a P-CSI-RS resource set corresponding to the information block. A bit of the bitmap may indicate whether to switch off a transmission of a corresponding P-CSI-RS resource of the plurality of P-CSI-RS resources belonging to the P-CSI-RS resource set corresponding to the information block.

In an example, one or more embodiments of FIG. 41 may be further extended to indicate to switch off one or more P-CSI-RS resources of one or more P-CSI-RS resource sets. In an example, the MAC CE/DCI, for indicating energy saving operation for the base station, may comprise a first bitmap and a plurality of second bitmaps. Each bit of the first bitmap may correspond to a respective P-CSI-RS resource set of a plurality of P-CSI-RS resource sets. A bit, of the first bitmap, being set to a first value (e.g., 0), may indicate to switch off a transmission of a corresponding P-CSI-RS resource set of the plurality of P-CSI-RS resource sets. A bit, of the first bitmap, being set to a second value (e.g., 1), may indicate to switch on (or keep) a transmission of a corresponding P-CSI-RS resource set of the plurality of P-CSI-RS resource sets. A bitmap of the plurality of second bitmaps may correspond to a respective P-CSI-RS resource set associated with a bit, of the first bitmap, being set to 1, in ascending order of P-CSI-RS resource set index. A bit of a bitmap of the plurality of second bitmaps may correspond to a respective P-CSI-RS resource of a plurality of P-CSI-RS resources belonging to the P-CSI-RS resource set (associated with the bit, of the first bitmap, being set 1). A bit of the bitmap of the second plurality of second bitmaps may indicate whether to switch off a corresponding P-CSI-RS resource of the plurality of P-CSI-RS resources of the P-CSI-RS resource set. In an example, there may be 16 P-CSI-RS resource sets (Set #1, Set #2, . . . , Set #16) configured by the base station. Set #1 may comprise 8 P-CSI-RS resources. Set #2 may comprise 5 P-CSI-RS resources. Set #3 may comprise 4 P-CSI-RS resources. Set #16 may comprise 8 P-CSI-RS resources. The first bitmap may comprise 16 bits, wherein 1$^{st}$ bit corresponds to Set #1, 2$^{nd}$ bit corresponds to Set #2, etc. The first bitmap may be set to '1010000000000001', which may indicate to keep transmitting Set #1, Set #3 and Set #16. In this example, the base station may switch off Set #2, Set #4, Set #5~Set #15. In this case, there may be 3 second bitmaps, wherein 1$^{st}$ bitmap, of the 3 second bitmaps, corresponds to Set #1, 2$^{nd}$ bitmap, of the 3 second bitmaps, corresponds to Set #3, and 3$^{rd}$ bitmap corresponds to Set #16. Each bit of the 1$^{st}$ bitmap, of the 3 second bitmaps, may correspond to a respective RS of the 8 P-CSI-RSs of Set #1 and may indicate whether to switch off the RS. Each bit of the 2$^{nd}$ bitmap, of the 3 second bitmaps, may correspond to a respective RS of the 4 P-CSI-RSs of Set #3 and may indicate whether to switch off the RS. Each bit of the 3$^{rd}$ bitmap, of the 3 second bitmaps, may correspond to a respective RS of the 8 P-CSI-RSs of Set #16 and may indicate whether to switch off the RS.

In an example, one or more embodiments of FIG. 41 may be further extended to indicate to switch off one or more P-CSI-RS resources of one or more P-CSI-RS resource sets of a plurality of P-CSI-RS resource sets. In an example, the MAC CE/DCI, for indicating energy saving operation for the base station, may comprise a bitmap, wherein each bit of the bitmap corresponds to a respective P-CSI-RS resource of a plurality of P-CSI-RS resources belonging to a first P-CSI-RS resource set of the plurality of P-CSI-RS resource sets. The first P-CSI-RS resource set may have the lowest P-CSI-RS resource set index among P-CSI-RS resource set indexes of the plurality of P-CSI-RS resource sets. The first P-CSI-RS resource set may be configured, by the base station in RRC messages, among the plurality of P-CSI-RS resource sets, for the energy saving operation of the base station. The first P-CSI-RS resource set may be a P-CSI-RS resource set, of the plurality of P-CSI-RS resource sets configured for a plurality of TRPs of the base station, associated with a primary TRP (e.g., identified by a CORESET pool index 0) of the plurality of TRPs, for the energy saving operation of the base station. A CORESET pool (which may be associated with a TRP) may be implemented based on example embodiments described above with respect to FIG. 26. A bit of the bitmap may indicate whether to switch off a transmission of a corresponding P-CSI-RS resource of the plurality of P-CSI-RS resources belonging to the first P-CSI-RS resource set. In response to receiving the MAC CE/DCI comprising the energy saving indication, the base station may stop transmission of all P-CSI-RS resource sets of the plurality of P-CSI-RS resource sets except the first P-CSI-RS resource set. In response to a bit, of the bitmap comprised in the energy saving indication, being set to a first value (e.g., 0), the base station may (further) stop transmitting of a P-CSI-RS resource corresponding to the bit, among the plurality of P-CSI-RS resources of the first P-CSI-RS resource set. In response to a bit, of the bitmap comprised in the energy saving indication, being set to a second value (e.g., 1), the base station may keep transmitting of a P-CSI-RS resource corresponding to the bit, among the plurality of P-CSI-RS resources of the first P-CSI-RS resource set.

In an example, a bitmap (in the MAC CE and/or the DCI for energy saving indication) described above may be 8 bits, e.g., when there are 8 P-CSI-RS resources in a P-CSI-RS resource set, or 16 bits when there are 16 P-CSI-RS resources in a P-CSI-RS resource set.

In an example embodiment, the bitmap described above may be replaced with a bit field, e.g., when the base station transmits few P-CSI-RS resources among a plurality of P-CSI-RS resources and/or switches off most of the plurality of P-CSI-RS resources in energy saving state. In an example, the base station may transmit RRC messages comprising configuration parameters indicating that the DCI format of the DCI comprises the bit field indicating the P-CSI-RS switch on/off. The base station may transmit a MAC CE/DCI, for indicating energy saving operation for the base station, comprising a bit field indicating to switch off one or more P-CSI-RS resources of a P-CSI-RS resource set. The bit field, being set to a codepoint, may indicate to transmit one or more P-CSI-RS resources of a plurality of P-CSI-RS resources of a P-CSI-RS resource set and to switch off the rest resources of the plurality of P-CSI-RS resources. In an example, the base station may transmit a single P-CSI-RS resource of a plurality of P-CSI-RS resources of a P-CSI-RS resource set in the energy saving state. Where there are 8 P-CSI-RS resources in the P-CSI-RS resource set, the bit field of the MAC CE/DCI may be 3 bits. The bit field set to a first codepoint (e.g., '000') may indicate to transmit $1^{st}$ P. CSI-RS resource, e.g., with the lowest CSI-RS resource index among CSI-RS resource indexes of the 8 P-CSI-RS resources and stop transmitting the rest 7 P-CSI-RS resources of the 8 P-CSI-RS resources of the P-CSI-RS resource set. The bit field set to a second codepoint (e.g., '001') may indicate to transmit $2^{nd}$ P-CSI-RS resource, e.g., with the second lowest CSI-RS resource index among CSI-RS resource indexes of the 8 P-CSI-RS resources and stop transmitting the rest 7 P-CSI-RS resources of the 8 P-CSI-RS resources of the P-CSI-RS resource set, etc. Example embodiments may further improve power consumption of the base station and reduce signaling overhead for energy saving indication with regard to dynamic switching off P-CSI-RS resources.

Figure 42:
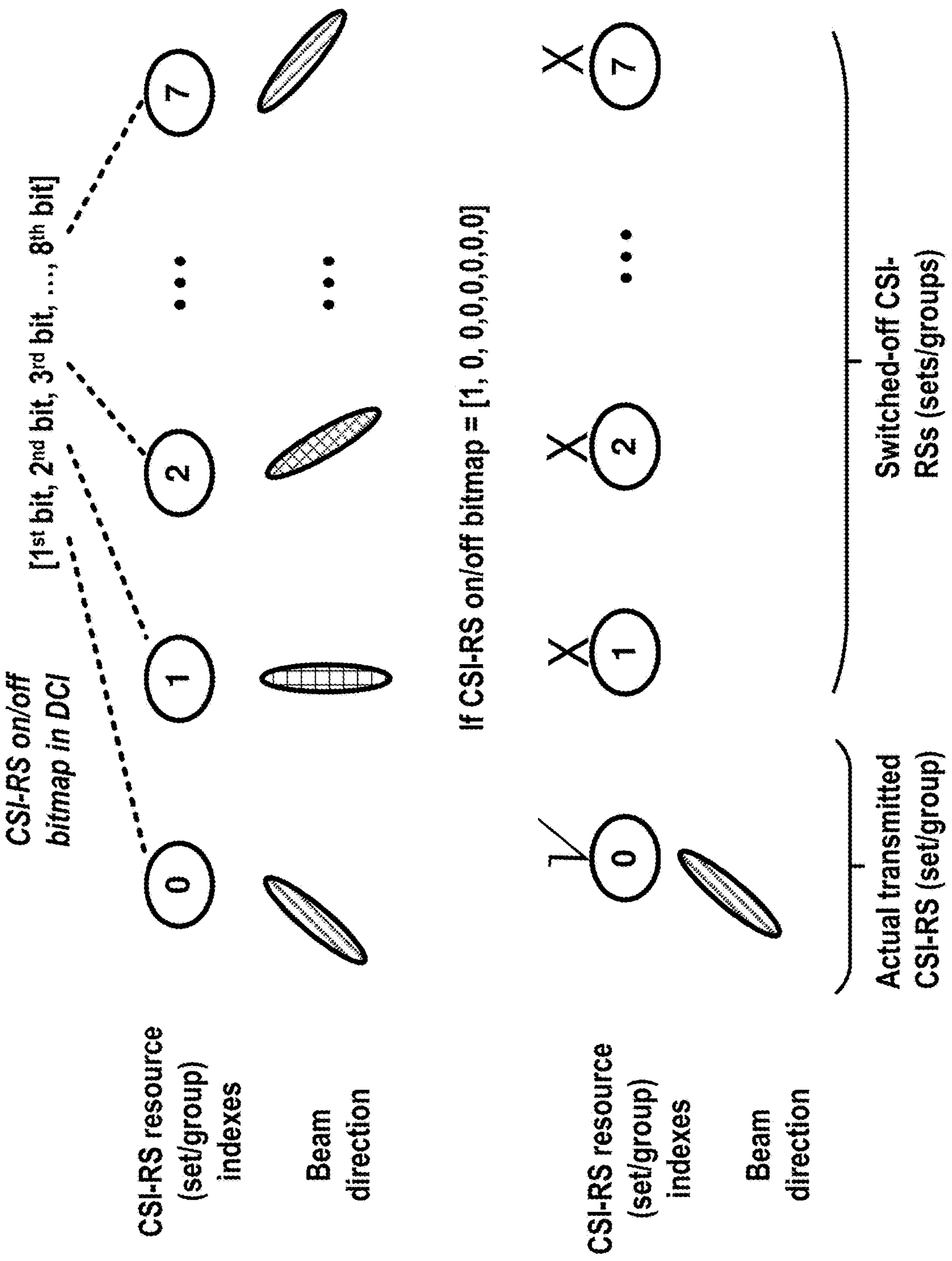
FIG. 42 illustrates an example embodiment of periodic CSI-RS transmissions in energy saving.

FIG. 42 shows an example embodiment of P-CSI-RS resource switching on/off indication for network energy saving, based on example embodiments of FIG. 41. In an example, a MAC CE or a DCI, for indicating an energy saving operation for a base station, as described above with respect to FIG. 41, may comprise a bitmap (e.g., 8 bits when a P-CSI-RS resource set comprises 8 P-CSI-RS resources), each bit of the bitmap corresponding to a respective P-CSI-RS resource of a plurality of P-CSI-RS resources in the P-CSI-RS resource set. In an example, the base station may transmit RRC messages comprising configuration parameters indicating that a DCI format of the DCI comprises the bitmap indicating the P-CSI-RS switch on/off. In the example of FIG. 42, the P-CSI-RS resource set may comprise 8 CSI-RS resources with indexes 0, 1, 2 . . . and 7. The 8 CSI-RS resources may be configured by the base station in RRC messages, based on example embodiments described above with respect to FIG. 36.

In the example of FIG. 42, each CSI-RS of the 8 CSI-RSs in the P-CSI-RS resource set may be transmitted by the base station with a transmission beam (or a spatial domain filter). The base station may transmit the 8 CSI-RSs with different beams, e.g., for facilitating the wireless device to perform downlink beam management (e.g., P2 based on examples of FIG. 12A). The base station may transmit the 8 CSI-RSs with the same beam, e.g., for facilitating the wireless device to perform a second downlink beam management (e.g., P3 based on examples of FIG. 12A).

In the example of FIG. 42, the base station may transmit the MAC CE or DCI comprising an energy saving indication with a bitmap set to '10000000'. Based on the bitmap being set '10000000', the base station may keep transmitting CSI-RS with index 0 and with a first transmission beam and stop transmitting CSI-RSs with indexes 1~7.

In an example, the first transmission beam may be same as the transmission beam used for CSI-RS with index 0 before the base station transmits the MAC CE or the DCI.

In an example, the first transmission beam may be different from the transmission beam used for CSI-RS with index 0 before the base station transmits the MAC CE or the DCI. The base station may determine the first transmission beam for the CSI-RS with index 0 based on a transmission beam of a SSB transmission.

Example embodiments of FIG. 42 may be further extended for per CSI-RS resource set (or group) indication. In an example, the bitmap may comprise a plurality of bits, each bit corresponding to (or being associated with) a respective CSI-RS resource set (or group) of a plurality of CSI-RS resource sets (or groups).

In an example, a CSI-RS resource group may be CSI-RS resources within a CSI-RS resource set. The base station may transmit RRC messages comprising configuration parameters indicating that a CSI-RS resource set comprises a plurality of CSI-RS resource groups, for the energy saving operation, each CSI-RS resource group comprising CSI-RS resources. Based on example embodiment, the base station may switch off a subset (or a group) of CSI-RS resources from the plurality of CSI-RS resources comprised in a CSI-RS resource set, e.g., by transmitting the MAC CE and/or DCI comprising a per-group CSI-RS switching on/off indication.

In an example, the association between a bit and a set/group may be configured by the base station in RRC messages. The RRC messages may comprise configuration parameters, for the plurality of CSI-RS resource sets (or groups), wherein each set/group is associated with a location parameter indication a location of a bit in the bitmap for the set/group.

In an example, the association between a bit and a set/group may be predefined based on CSI-RS resource set/group indexes (e.g., in ascending or descending order of the set/group indexes). The first bit (or the rightmost bit) of the bitmap may correspond to the first CSI-RS resource set/group, with the lowest set/group index among set/group indexes of the plurality of CSI-RS resource sets/groups. The second bit (or the second rightmost bit) of the bitmap may correspond to the second CSI-RS resource set/group, with the second lowest set/group index among set/group indexes of the plurality of CSI-RS resource sets/groups. The last bit (or the leftmost bit) of the bitmap may correspond to the last CSI-RS resource set/group, with a highest set/group index among set/group indexes of the plurality of CSI-RS resource sets/groups, or verse visa.

In an example, the base station may switch off first CSI-RSs, of a plurality of CSI-RSs (in one or more CSI-RS resource sets) in a first time and switch off second CSI-RSs, of the plurality of CSI-RSs, in a second time. The base station may switch on/off different CSI-RS resources in different time when the base station is in energy saving state.

Figure 43A:
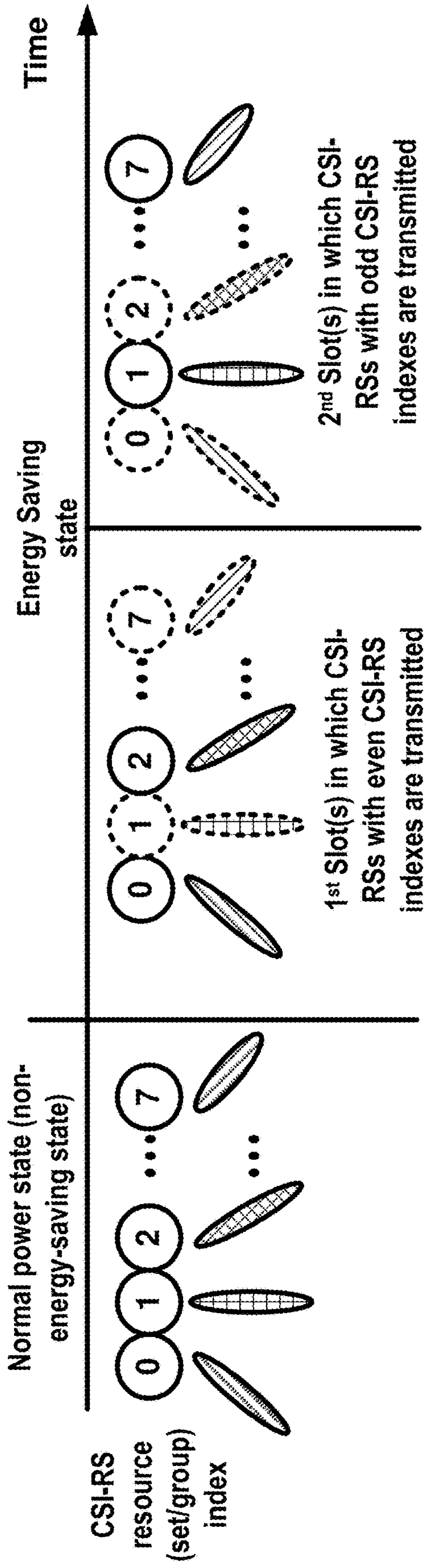
FIG. 43A and FIG. 43B illustrate example embodiments of periodic CSI-RS transmissions in energy saving.
Figure 43B:
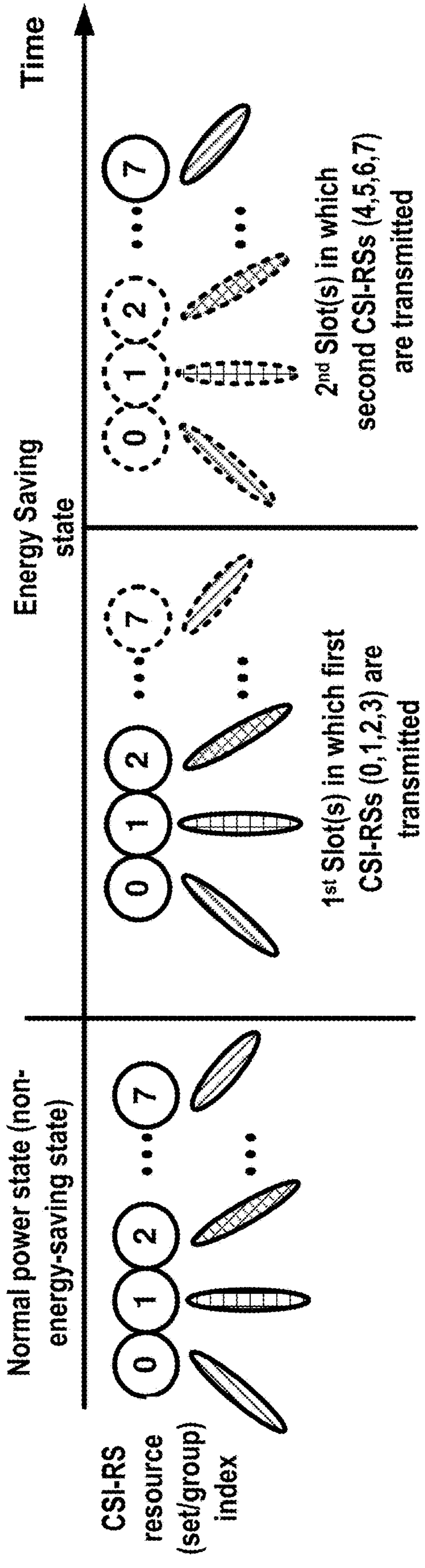

In an example, the base station may transmit a MAC CE and/or a DCI comprising an energy saving indication (e.g., based on examples of FIG. 41). The energy saving indication may indicate a switching on/off pattern of a plurality of switching on/off patterns for P-CSI-RS transmissions. FIG. 43A and FIG. 43B show example embodiments of P-CSI-RS switching on/off patterns for P-CSI-RS transmissions for energy saving.

In an example, as shown in FIG. 43A, the plurality of switching on/off patterns may comprise a first switching on/off pattern wherein the base station may switch off first CSI-RSs, of a plurality of CSI-RSs, with even CSI-RS indexes in first slots and switch off second CSI-RSs, of the plurality of CSI-RSs, with odd CSI-RS indexes. In the example of FIG. 43A, CSI-RS #0, CSI-RS #1 . . . , CSI-RS #7, of a CSI-RS resource set, may be transmitted (e.g., in a slot with transmission periodicity) by the base station with different beams (or a same beam) in a full power state (or a non-energy-saving state). In energy saving state (e.g., indicated by the MAC CE and/or DCI as shown in FIG. 41) and when indicated (or configured/preconfigured) as the first switching on/off pattern, in $1^{st}$ slot(s) (based on configuration parameters of the P-CSI-RS resources as shown in FIG. 36) of CSI-RS transmission occasions, the base station may transmit CSI-RS #0, CSI-RS #2, CSI-RS #4 and CSI-RS #6 and may stop transmit CSI-RS #1, CSI-RS #3, CSI-RS #5 and CSI-RS #7. In $2^{nd}$ slots of CSI-RS transmission occasions, the base station may transmit CSI-RS #1, CSI-RS #3, CSI-RS #5 and CSI-RS #7 and may stop transmit CSI-RS #0, CSI-RS #2, CSI-RS #4 and CSI-RS #6, etc., or verse vice.

In an example, the $1^{st}$ slots may be slots with even slot numbers and the $2^{nd}$ slots may be slots with odd slot numbers, or verse vice.

In an example, the $1^{st}$ slot(s) may be first occasion(s) of periodic transmission occasions of the P-CSI-RSs based on configuration parameters. The $2^{nd}$ slot(s) may be second occasion(s) of the periodic transmission occasions of the P-CSI-RSs.

In an example, as shown in FIG. 43B, the plurality of switching on/off patterns may comprise a second switching on/off pattern wherein the base station may switch off first half of CSI-RSs in ascending order of CSI-RS resource indexes, of a plurality of CSI-RSs, in first slots and switch off second half of CSI-RSs, of the plurality of CSI-RSs in second slots. In the example of FIG. 43B, CSI-RS #0, CSI-RS #1 . . . , CSI-RS #7, of a CSI-RS resource set, may be transmitted (e.g., in a slot with transmission periodicity) by the base station with different beams (or a same beam) in a full power state (or a non-energy-saving state). In energy saving state (e.g., indicated by the MAC CE and/or DCI as shown in FIG. 41) and when indicated (or configured/preconfigured) as the second switching on/off pattern, in $1^{st}$ slot(s) (based on configuration parameters of the P-CSI-RS resources as shown in FIG. 36) of CSI-RS transmission occasions, the base station may transmit CSI-RS #0, CSI-RS #1, CSI-RS #2 and CSI-RS #3 and may stop transmit CSI-RS #4, CSI-RS #5, CSI-RS #6 and CSI-RS #7. In $2^{nd}$ slots of CSI-RS transmission occasions, the base station may transmit CSI-RS #4, CSI-RS #5, CSI-RS #6 and CSI-RS #7 and may stop transmit CSI-RS #0, CSI-RS #1, CSI-RS #2 and CSI-RS #3, etc. or verse vice. The $1^{st}$ slot(s) may be first occasion(s) of periodic transmission occasions of the P-CSI-RSs based on configuration parameters. The $2^{nd}$ slot(s) may be second occasion(s) of the periodic transmission occasions of the P-CSI-RSs.

In an example, the MAC CE and/or the DCI may comprise a field (with one or more bits) indicating one of the plurality of switching on/off patterns for P-CSI-RS transmissions.

In an example, the base station may indicate, from the plurality of switching on/off patterns, a (default) switching on/off pattern for P-CSI-RS transmissions in energy saving state. in response to transitioning from a non-energy-saving state to an energy saving state, the base station may use the (default) switching on/off pattern to determine to switch on/off P-CSI-RSs in different slots.

In an example, the (default) switching on/off pattern may be preconfigured as the first switching on/off pattern as shown in FIG. 43A. The (default) switching on/off pattern may be preconfigured as the second switching on/off pattern as shown in FIG. 43B.

Based on examples of FIG. 43A and/or FIG. 43B, a base station may determine a P-CSI-RS switching on/off pattern for energy saving state. By implementing example embodiments, a wireless device may align with the base station regarding which P-CSI-RS(s) will be transmitted in a slot by the base station in energy saving state.

In an example, a wireless device may take a time period (duration, or gap) to adapt CSI/beam measurements when the base station dynamically (or semi-persistently) P-CSI-RS resource transmission parameters. The time duration may be determined based on a process capability (power amplifier, AGC, AD/DA converter, RF modules, etc.) of the wireless device. The time duration may be determined based on a process capability (power amplifier, AGC, AD/DA converter, RF modules, etc.) of the base station. When the base station transmits a DCI/MAC CE indicating to switch on/off P-CSI-RSs or adjust parameters of P-CSI-RSs, the wireless device may not be aware of when the base station will use (or switch to) new transmission parameters for P-CSI-RSs. When the base station transmits a DCI/MAC CE indicating P-CSI-RS parameter changes, the wireless device may not be able to catch up the speed of the transmission parameter changing at the base station due to limited capability of the wireless device. Existing technologies may cause misalignment between the base station and the wireless device regarding a timing of the P-CSI-RS transmission parameter adjustment. Misalignment regarding the timing of the P-CSI-RS transmission parameter adjustment may cause the wireless device to incorrectly measure beam/cell channel qualities. There is a need to align the P-CSI-RS transmission parameter adjustment between the base station and the wireless device when the base station dynamically adjusts P-CSI-RS transmission parameters.

Figure 44:
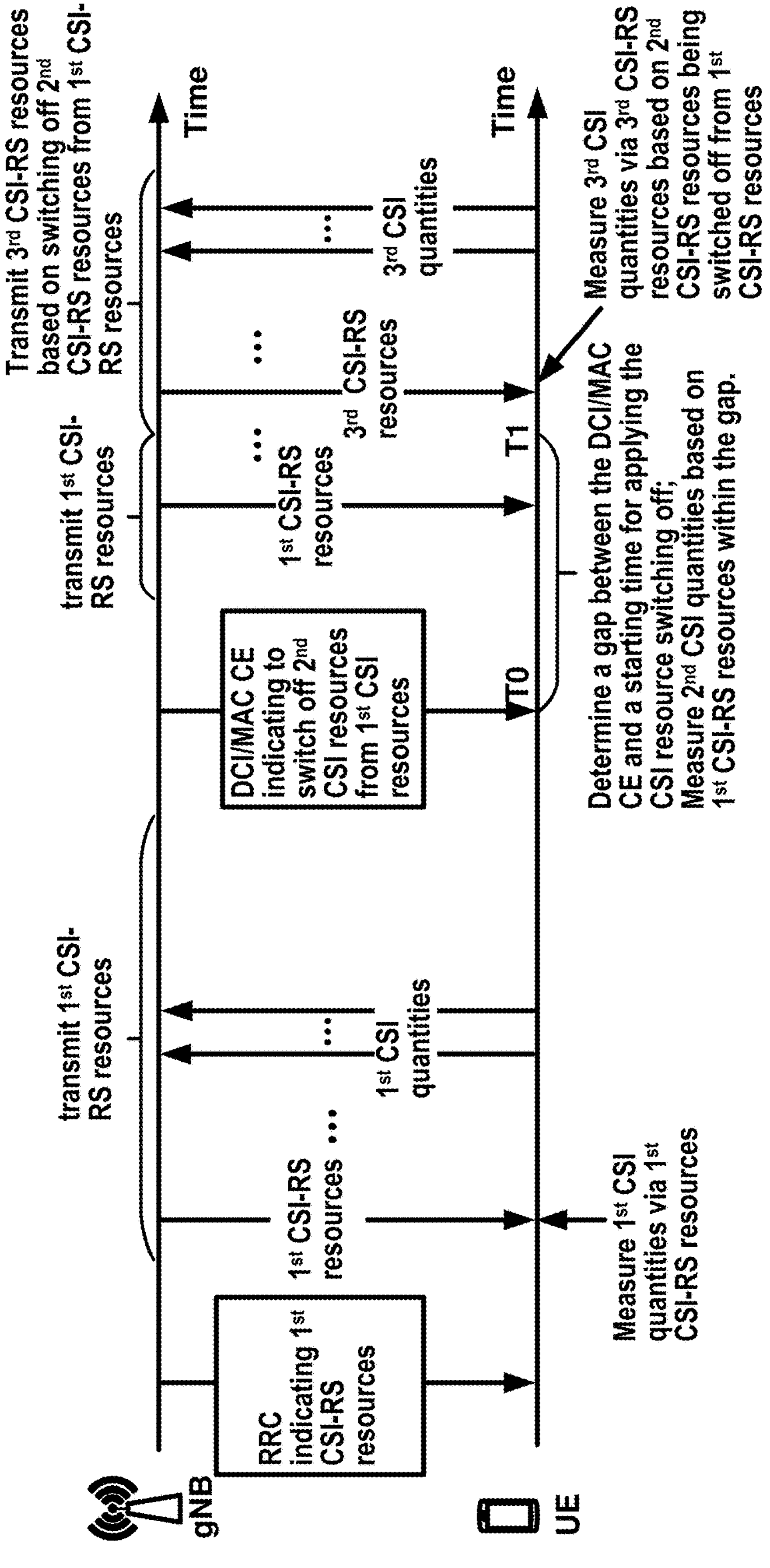
FIG. 44 illustrates an example embodiment of periodic CSI-RS transmissions and CSI reporting in energy saving.

FIG. 44 shows an example embodiment of periodic CSI-RS resource switching on/off for network energy saving, based on example embodiments of FIG. 41, FIG. 42, FIG. 43A and/or FIG. 43B. In an example, a base station may transmit to a wireless device one or more RRC messages comprising configuration parameters of $1^{st}$ (periodic) CSI-RS resources. The one or more RRC messages may be implemented based on example embodiments described above with respect to FIG. 41.

In an example, the base station may transmit $1^{st}$ CSI-RSs periodically according to the configuration parameters of the CSI-RSs. The wireless device may measure $1^{st}$ CSI quantities according to the periodically transmitted $1^{st}$ CSI-RSs. The wireless device may transmit $1^{st}$ CSI quantities to the base station, e.g., based on example embodiments described above with respect to FIG. 41.

As shown in FIG. 44, the base station may transmit, and/or the wireless device may receive, a DCI/MAC CE indicating to switch off $2^{nd}$ CSI-RS resources from the $1^{st}$ CSI-RS resources. The DCI/MAC may indicate a transition from the non-energy-saving state to an energy saving state, based on example embodiments described above with respect to FIG. 41.

In the example of FIG. 44, the DCI/MAC may be received by the wireless device at a first time interval (e.g., TO).

As shown in FIG. 44, based on receiving the DCI (or a MAC CE) indicating to switch off $2^{nd}$ CSI-RS resources, the wireless device may determine a time gap starting from T0 for applying the switching off $2^{nd}$ CSI-RS resources. The time gap may be a threshold (in symbols, symbol groups, slots, slot groups, millisecond, etc.). The time gap may be configured by the base station in RRC, MAC CE and/or DCI. The time gap may be indicated by the wireless device based on a capability indication of the wireless device. The time gap may be preconfigured as a fixed value.

After receiving the DCI (or the MAC CE) at T0, the wireless device may determine (or assume) that the $1^{st}$ CSI-RSs are transmitted by the base station with the same transmission parameters (e.g., a number of beams, ports, density, bandwidth and etc.) during a time window from T0 to T1, wherein a time offset between T0 and T1 is the time gap. The wireless device may obtain $2^{nd}$ CSI quantities based on $1^{st}$ CSI-RS resources, between T0 and T1.

After receiving the DCI (or the MAC CE) at T0, the wireless device may determine (or assume) that the base station switches off $2^{nd}$ CSI-RS from T1, transmits $3^{rd}$ CSI-RSs of $1^{st}$ CSI-RS from T1 and/or changes to new transmission parameters (e.g., ports, density, bandwidth etc.) for CSI-RS resources from T1, wherein a time offset between T0 and T1 is the time gap.

As shown in FIG. 44, based on determining the time gap between T0 and T1, the wireless device may measure and obtain $3^{rd}$ CSI quantities after T1, based on $3^{rd}$ CSI-RSs being transmitted and $2^{nd}$ CSI-RSs being switched off by the base station. The wireless device may measure and obtain CSI quantities via CSI-RSs based on example embodiments described above with respect to FIG. 41. The wireless device may transmit $3^{rd}$ CSI quantities to the base station.

By implementing example embodiment of FIG. 44, the wireless device may determine to receive a parameter adjusted P-CSI-RS with an application delay time for the parameter adjustment. The application delay may be indicated by the base station and/or determined by the wireless device. After receiving a command indicating to switch off one or more of a plurality of P-CSI-RSs, the wireless device may determine that the total number of actual transmitted CSI-RSs is not changed within the application delay time starting from the reception of the command. After receiving a command indicating to switch off one or more of the plurality of P-CSI-RSs, the wireless device may determine that the total number of actual transmitted P-CSI-RSs is changed since the application delay time starting from the reception of the command. Example embodiment may enable the base station and the wireless device to align on when P-CSI-RS switching off indication is applied.

FIG. 44 may be modified to further align the base station and the wireless device regarding when the wireless device may use the adjusted parameters of the P-CSI-RSs in the energy saving state. In an example, the wireless device may transmit HARQ ACK/NACK feedback to the base station at a second slot, after receiving the DCI in a first slot. The wireless device may start the application delay window from the second slot, different from example embodiments of FIG. 44, where the application delay window starts from the first slot (which is T0) where the DCI is received by the wireless device. The length of the application delay window (or gap) may be implemented based one example embodiments described above with respect to FIG. 44. Before the expiry of the window, the wireless device may assume (or determine) that the base station transmit the P-CSI-RSs without changes of the parameters and may measure CSI report based on the $1^{st}$ CSI-RS resources. In response to the expiry of the window, the wireless device may determine that the base station switches off the $2^{nd}$ CSI-RSs and may measure $2^{nd}$ CSI report based on the $3^{rd}$ CSI-RSs.

In an example, a base station may transmit both SSBs and P-CSI-RSs to a wireless device or a group of wireless devices for beam and CSI measurements. In an example, the base station may transmit the SSBs with wider transmission beams, while may transmit the P-CSI-RSs with narrower transmission beams. In an example, the base station may transmit the SSBs with longer transmission periodicity, while may transmit the P-CSI-RSs with shorter transmission periodicity. Transmitting both SSBs and P-CSI-RSs may increase power consumption of the base station, when the base station is in energy saving state. There is a need to improve power consumption for SSB/CSI-RS transmission in energy saving operation.

Figure 45:
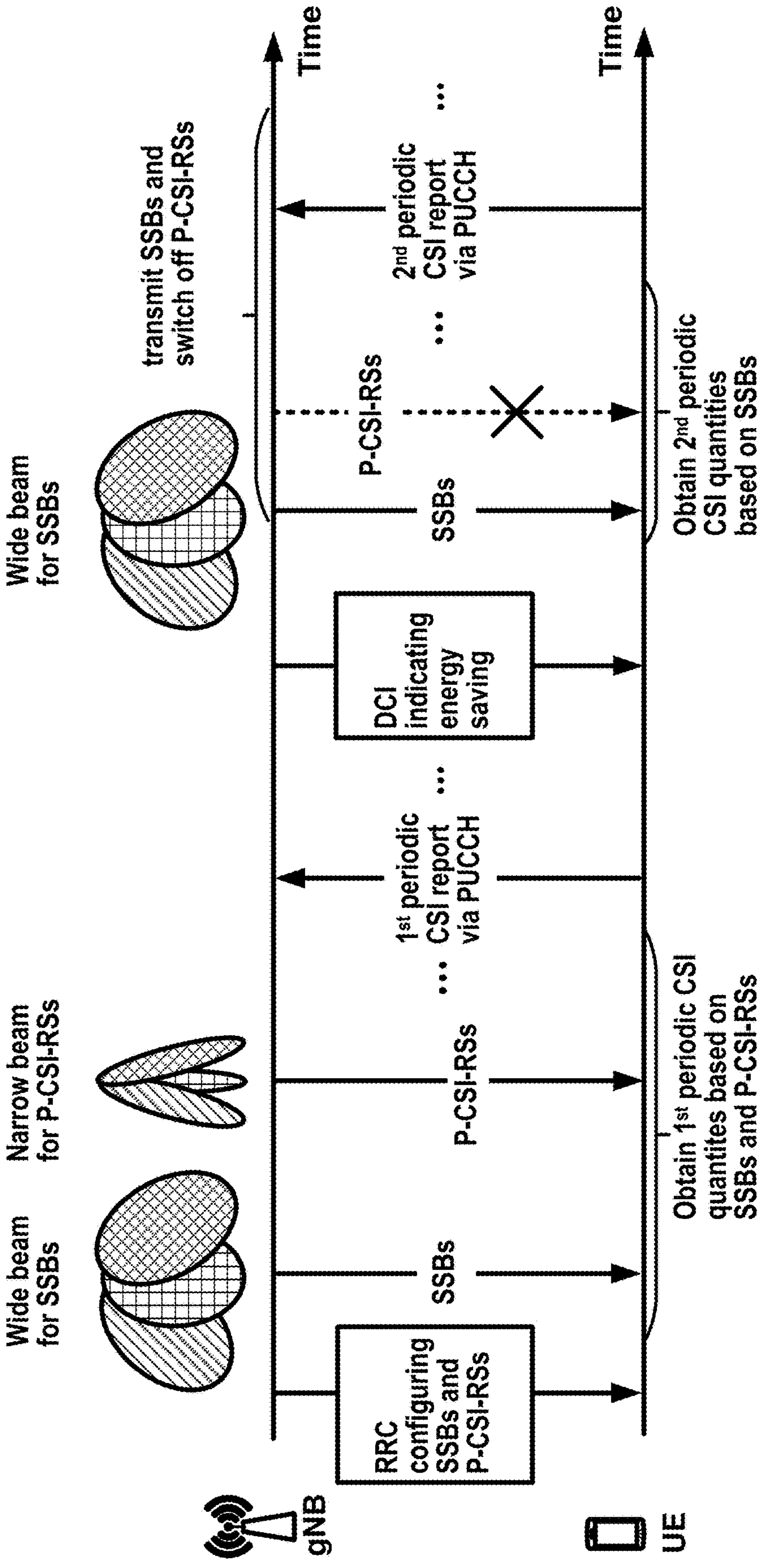
FIG. 45 illustrates an example embodiment of periodic CSI-RS transmissions and CSI reporting in energy saving.

FIG. 45 shows an example embodiment of periodic CSI-RS resource switching on/off for network energy saving. In an example, a base station may transmit to a wireless device (or a group of wireless devices) one or more RRC messages comprising first configuration parameter of SSBs and second configuration parameters of P-CSI-RSs. In an example, the first configuration parameters may be implemented based on example embodiments described above with respect to FIG. 25, FIG. 32 and/or FIG. 33. The second configuration parameters may be implemented based on example embodiments described above with respect to FIG. 35, FIG. 36, FIG. 37 and/or FIG. 38.

In the example of FIG. 45, the base station may periodically transmit the SSBs with wider transmission beams according to the first configuration parameters of the SSBs. The base station may periodically transmit the P-CSI-RSs with narrower transmission beams according to the second configuration parameters of the P-CSI-RSs.

Based on the periodically transmitted SSBs and the P-CSI-RSs, the wireless device may (measure) obtain $1^{st}$ periodic CSI quantities. The wireless device may transmit $1^{st}$ CSI report based on the $1^{st}$ periodic CSI quantities. In an example, the $1^{st}$ CSI report may comprise a SSB index of a SSB (e.g., with the best RSRP value among RSRP values of the SSBs), a CSI-R resource index of a P-CSI-RS (e.g., with the best RSRP value among RSRP values of the P-CSI-RSs), a RSRP value and/or a differential RSRP value. The wireless device may transmit $1^{st}$ CSI report via a PUCCH resource configured for the periodic CSI report.

In an example, the base station may transmit, and/or the wireless device may receive, a DCI (and/or a MAC CE) indicating an energy saving for the base station. The DCI indicating the energy saving may be implemented based on example embodiments of FIG. 41.

In an example, in response to transmitting the DCI indicating the energy saving, the base station may switch off the periodical transmissions of the P-CSI-RSs (or P-CSI-RS resource sets). In response to transmitting the DCI indicating the energy saving, the base station may keep transmitting the SSBs (or one or more of the SSBs) with the same transmission parameters (e.g., periodicity, number of beams/SSBs, transmission power etc.). In an example, in response to transmitting the DCI indicating the energy saving, the base station may transmit the SSBs (or one or more of the SSBs) with adjusted transmission parameters (e.g., longer periodicity, smaller number of beams/SSBs, reduced transmission power etc.).

In the example of FIG. 45, the wireless device, in response to receiving the DCI, may determine that the P-CSI-RSs are switched off by the base station (e.g., or with an application time delay based on example embodiments described above with respect to FIG. 44). In response to receiving the DCI, the wireless device may determine that the SSBs are still transmitted by the base station (with or without parameter changes based on configuration or indication of the DCI).

In an example, based on determining that the P-CSI-RSs are switched off by the base station in the energy saving, the wireless device may obtain (or measure) $2^{nd}$ periodic CSI quantities based on SSBs only. The wireless device may transmit $2^{nd}$ periodic CSI report comprising $2^{nd}$ periodic CSI quantities, to the base station.

In an example, example embodiments of FIG. 41 and FIG. 45 may be combined to further improve channel/beam measurement qualities.

In response to transmitting the DCI indicating the energy saving, the base station may keep transmitting the SSBs (or one or more of the SSBs) with the same transmission parameters (e.g., periodicity, number of beams/SSBs, transmission power etc.).

In an example, in response to transmitting the DCI indicating the energy saving, the base station may transmit the SSBs (or one or more of the SSBs) with adjusted transmission parameters (e.g., longer periodicity, smaller number of beams/SSBs, reduced transmission power etc.).

In an example, in response to transmitting the DCI indicating the energy saving, the base station may keep transmitting one or more P-CSI-RSs (or resource set(s) of the P-CSI-RSs (or P-CSI-RS resource sets).

In an example, the one or more P-CSI-RSs (or resource set(s)) transmitted by the base station in the energy saving may be configured, by the base station (via RRC messages), from the P-CSI-RSs (or the P-CSI-RS resource sets) configured for the non-energy saving state.

In an example, the one or more P-CSI-RSs (or resource set(s) transmitted by the base station in the energy saving may be predefined (or preconfigured) from the P-CSI-RSs (or the P-CSI-RS resource sets) configured for the non-energy saving state. In this case, the one or more P-CSI-RSs (or resource sets) may be referred to as default P-CSI-RSs (or resource sets). The one or more P-CSI-RSs (or sets) for the energy saving may have a lowest (or highest) RS (or set) index among RS (or set) indexes of the P-CSI-RSs (or sets) configured for the non-energy saving state. The one or more P-CSI-RSs set(s) for the energy saving may be a CSI-RS resource set, among the plurality of CSI-RS resource sets, configured with resource type being set 'periodic'. The one or more P-CSI-RSs set(s) for the energy saving may be a CSI-RS resource set, among the plurality of CSI-RS resource sets, configured for a primary TRP (or with a CORESET pool index 0) of a plurality of TRPs of the base station. Predefining or preconfiguring default P-CSI-RS(s) or set(s) for energy saving operation may reduce signaling overhead for indicating which P-CSI-RS(s) will be transmitted by the base station in the energy saving operation.

Based on the periodically transmitted SSBs and predefined/preconfigured (default) P-CSI-RSs (or sets) in the energy saving state of the base station, the wireless device may obtain CSI quantities comprising SSB index, CSI-RS resource index and one or more RSRP values. Example embodiments may allow the wireless device to transmit CSI report based on SSBs and CSI-RSs transmitted by the base station in the energy saving operation.

Figure 46:
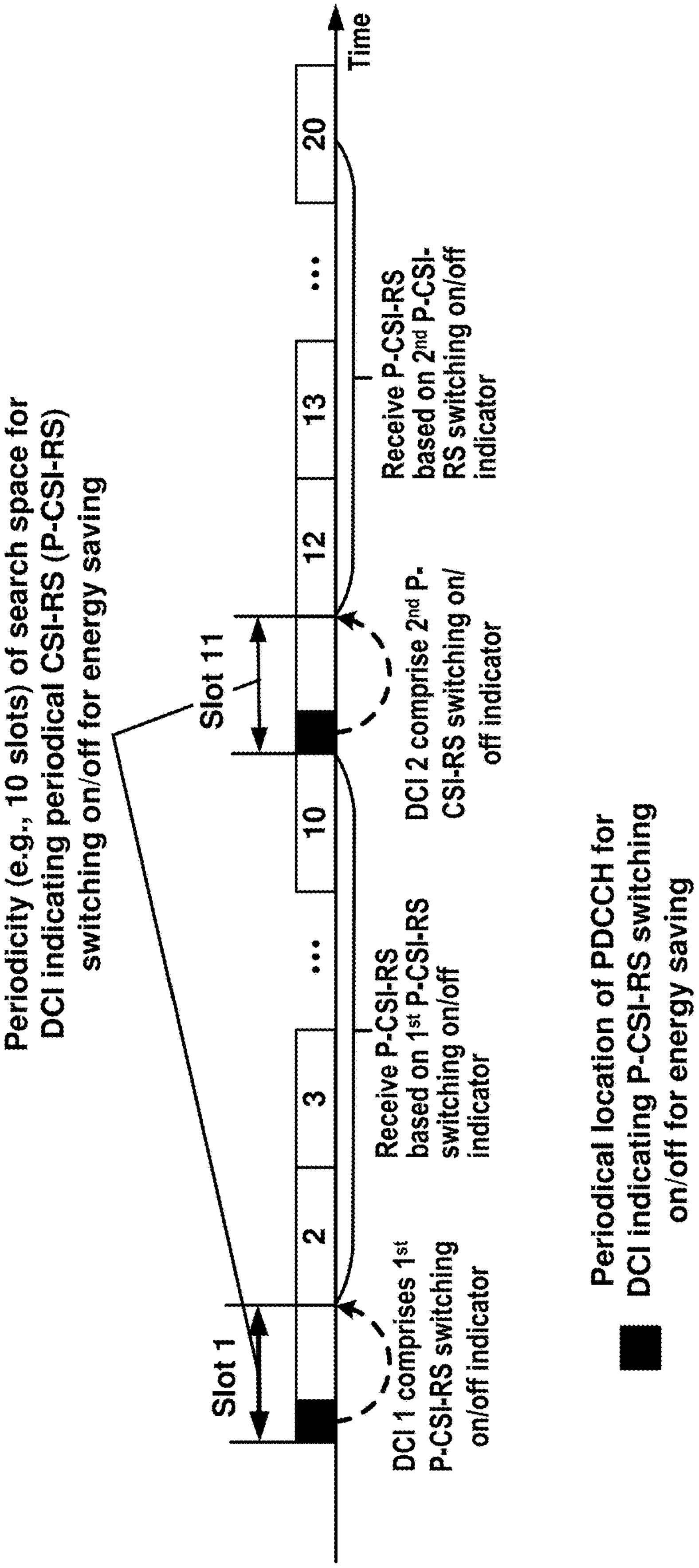
FIG. 46 illustrates an example embodiment of search space configuration for energy saving indication for periodic CSI-RS transmissions of a base station.

FIG. 46 shows an example embodiment of search space configuration for a DCI indicating P-CSI-RS switching on/off for energy saving of a base station, based on example embodiments described above with respect to FIG. 41, FIG. 42, FIG. 43A, FIG. 43B, FIG. 44 and/or FIG. 45.

As shown in FIG. 46, a base station may transmit to a wireless device (or a group of wireless devices) base station energy saving (BS ES) parameters indicating PDCCH configuration for an energy saving DCI transmission and ES time resources. The BS ES parameters may be comprised in common RRC messages (e.g., MIB, SIBx) or wireless device specific RRC messages.

In an example embodiment, the BS ES parameters may indicate a search space (e.g., a common search space or a UE-specific search space) for a (group common or UE-specific) DCI indicating the ES (or an energy saving DCI) for the base station. A search space may be implemented based on example embodiments described above with respect to FIG. 27. The search space may be a type 0/0A/1/2/3 common search space. In an example, the ES indication may be comprised in a DCI format 1_0 scrambled by a SI-RNTI in a type 0/0A common search space. The ES indication may be comprised in a DCI format 1_0 scrambled by a P-RNTI in a type 2 common search space. The ES indication may be comprised in a DCI format 2_0 scrambled by an SFI-RNTI in a type 3 common search space. The ES indication may be comprised in a DCI format 2_1 scrambled by an INT-RNTI in a type 3 common search space. The ES indication may be comprised in a DCI format 2_2 scrambled by a TPC-PUCCH-RNTI/TPC-PUCCH-RNTI in a type 3 common search space. The ES indication may be comprised in a DCI format 2_3 scrambled by a TPC-SRS-RNTI/in a type 3 common search space. The ES indication may be comprised in a DCI format 2_4 scrambled by a CI-RNTI in a type 3 common search space. The ES indication may be comprised in a DCI format 2_5 scrambled by an AI-RNTI in a type 3 common search space. The ES indication may be comprised in a DCI format 2_6 scrambled by a PS-RNTI in a type 3 common search space. In an example, the ES indication may be comprised in a new DCI format in a type 3 common search space, different from legacy 2_x DCI format.

In an example embodiment, the BS ES parameters may indicate one or more P-SI-RS resources (and/or resource sets) of the ES operation for the base station.

In an example embodiment, the base station may be working in a normal power state (or a non-energy-saving state) during which the base station may transmit downlink signals and receive uplink signals with a normal transmission power (or full transmission power). A wireless device may receive downlink signals and transmit uplink signals with the base station in the normal power state. While the base station is in the normal power state, the wireless device may be indicated to perform one or more power saving operations based on example embodiments described above with respect to FIG. 22, FIG. 28, FIG. 29A, FIG. 29B, FIG. 30A, FIG. 30B and/or FIG. 31. While the base station is in the normal power state, the base station may transmit periodic CSI-RS resources in one or more CSI-RS resource sets based on configuration parameters of CSI-RS resources.

As shown in FIG. 46, the wireless device may periodically monitor the search space for receiving a DCI indicating the energy saving for the base station based on configuration parameters of the search space. A periodicity (e.g., 10 slots in FIG. 46) of PDCCH occasion for transmitting the DCI may be comprised in the RRC message for the search space. The base station may determine to transition from the normal power state to an energy saving state based on wireless device assistance information from the wireless device on traffic pattern, data volume. The base station may determine the transition based on uplink signal measurement/assessment/detection at the base station. The base station may determine the transition based on information exchange from a neighbor base station via X2 interface, wherein the information exchange may comprise indication of the transition, traffic load information, etc.

Based on the determination of the transition from the normal power state to the energy saving state, the base station may transmit the DCI, in the PDCCH transmission occasion of the search space, indicating that the base station will switch off one or more CSI-RSs from the periodic CSI-RS resources.

In response to receiving the DCI indicating the energy saving for the base station, the wireless device may determine a reduced number (a longer periodicity, a narrower occupied bandwidth, a smaller transmission density and etc.) of periodic CSI-RS resources, e.g., based on example embodiments described above with respect to FIG. 41, FIG. 42, FIG. 43A, FIG. 43B, FIG. 44 and/or FIG. 45. The wireless device may measure the downlink signals/channels with the reduced number of periodic CSI-RS resources, based on example embodiments described above with respect to FIG. 41, FIG. 42, FIG. 43A, FIG. 43B, FIG. 44 and/or FIG. 45.

Based on example embodiments of FIG. 46, a base station may transmit periodic CSI-RS switching on/off indication in periodic transmission occasions (e.g., periodicity 10 slots in FIG. 46), or in a minimal gap (defined/configured by the base station, or predefined). The base station may keep unchanged of transmission parameters of periodic CSI-RS resources between two continuous periodic CSI-RS switching on/off indications. Maintaining the transmission parameters of CSI-RS resources unchanged with a minimum time duration may enable the wireless device to correctly measure the channel quality (e.g., pathloss, RSRP, CSI report, etc.).

In an example embodiment, when configured with multiple cells (e.g., based on example embodiments described above with respect to FIG. 10A, FIG. 10B, FIG. 21A and/or FIG. 21B, the base station may indicate periodic CSI-RS switching on/off jointly or separately.

In an example embodiment, a base station may transmit a periodic CSI-RS switching on/off indication for all cells (in active state) jointly. A periodic CSI-RS switching on/off indication, implemented based on example embodiments described above with respect to FIG. 41, FIG. 42, FIG. 43A, FIG. 43B, FIG. 44 and/or FIG. 45, may be applied for all active cells, of a plurality of cells, comprising a PCell and one or more active SCells. In this case, the periodic CSI-RS switching on/off indication may be transmitted via the PCell.

In an example embodiment, the base station may transmit separate per-cell periodic CSI-RS switching on/off indication via a cell of a plurality of cells. A per cell periodic CSI-RS switching on/off indication may be applied only on a cell on which the base station transmits the per-cell periodic CSI-RS switching on/off indication. A first periodic CSI-RS switching on/off indication received on a PCell may be applied on the PCell. A second periodic CSI-RS switching on/off indication received on an activated SCell may be applied on the activated SCell, etc.

In an example embodiment, the base station may transmit per cell group periodic CSI-RS switching on/off indication for a group of cells of a plurality of cells. A per cell group periodic CSI-RS switching on/off indication may be applied on a cell group comprising a cell on which the base station transmits the per cell group periodic CSI-RS switching on/off indication. The base station may transmit RRC messages comprising configuration parameters of energy saving operation, wherein the configuration parameters may indicate a plurality of cells are grouped into one or more cell groups.

In an example, the base station may automatically stop transmission of periodic CSI-RSs when the base station determines that there is no active wireless device (e.g., no wireless devices in RRC_CONNECTED state) in the cell. The base station may (automatically) stop transmission of the P-CSI-RSs, without transmitting RRC messages for reconfiguration of the P-CSI-RSs, and/or without transmitting DCI indicating to stop the transmission of the P-CSI-RSs, e.g., in response to determining that there is no active wireless device in a cell. The base station may (automatically) stop transmission of the P-CSI-RSs, without transmitting RRC messages for reconfiguration of the P-CSI-RSs, and/or without transmitting DCI indicating to stop the transmission of the P-CSI-RSs to a wireless device, e.g., in response to determining that the wireless device transitions from RRC_CONNECTED state to RRC_IDLE state or RRC_INACTIVE state. The base station may (automatically) stop transmission of the P-CSI-RSs, without transmitting RRC messages for reconfiguration of the P-CSI-RSs, and/or without transmitting DCI indicating to stop the transmission of the P-CSI-RSs to a wireless device, e.g., in response to receiving an uplink signal, from the wireless device. The uplink signal may indicate that the wireless device has no new data. The uplink signal may indicate a transition of a cell from a non-energy-saving state to an energy saving state. The uplink signal may be a UCI via PUCCH, a MACE CE from the wireless device, a wireless device assistant information in RRC message. Example embodiments may reduce signaling overhead for indication of P-CSI-RS switch off for energy saving of the base station.

In an example, a base station may transmit messages comprising configuration parameters of periodic CSI-RSs resources being grouped to CSI-RS resource sets, wherein each CSI-RS resource set of the CSI-RS resource sets comprises at least one CSI-RS resource of the periodic CSI-RSs resources. The base station may transmit the CSI-RS resource sets in a cell. The base station may transmit a DCI comprising an energy saving indication indicating to switch off a first CSI-RS resource set of the CSI-RS resource sets. The base station may transmit, based on switching off the first CSI-RS resource set, at least a second CSI-RS resource set of the CSI-RS resource sets. In an example, the second CSI-RS resource set is from the CSI-RS resource sets with the first CSI-RS resource set being excluded based on the energy saving indication. In other words, the at least second CSI-RS resource set is not one of the first CSI-RS resource sets switched off.

In an example, a base station may transmit messages comprising configuration parameters of a CSI-RS resource set comprising periodic CSI-RS resources. The base station may transmit the CSI-RS resource set in a cell. The base station may transmit a command comprising an energy saving indication indicating to switch off first CSI-RS resources of the periodic CSI-RS resources of the CSI-RS resource set. The base station may transmit, based on the command and via the cell, at least a second CSI-RS resource of the periodic CSI-RS resources of the CSI-RS resource set. In an example, the second CSI-RS resource set is from the CSI-RS resource sets with the first CSI-RS resource set being excluded based on the energy saving indication. In other words, the at least second CSI-RS resource set is not one of the first CSI-RS resource sets switched off.

In an example, a base station may transmit, RRC messages comprising first parameters of periodic CSI-RS resources. The base station may transmit the periodic CSI-RS resources comprising: first periodic CSI-RS resources and second periodic CSI-RS resources. The base station may transmit a DCI comprising an energy saving indication. In response to the transmitting the DCI, the base state may stop transmissions of the first periodic CSI-RS resources and continue the transmission of the second periodic CSI-RS resources.

In an example, a base station may transmit RRC messages comprising: first parameters of SSBs and second parameters of periodic CSI-RS resources. The base station may transmit the SSBs and the periodic CSI-RS resources. For example, the base station may transmit the SSBs periodically according to a periodicity. The base station may transmit a DCI comprising an energy saving indication. In response to the transmitting the DCI, the base station may continue the transmission of the periodic SSBs and stop periodic transmissions of the periodic CSI-RS resources.

In an example, a wireless device may receive, from a base station, RRC messages comprising configuration parameters of periodic CSI reporting, wherein the configuration parameters comprise first parameters of SSBs and second parameters of periodic CSI-RS resources. The wireless device may receive the SSBs and the periodic CSI-RS resources. The wireless device may transmit, for the periodic CSI reporting, first periodic CSI report based on the SSBs and the periodic CSI-RS resources. The wireless device may receive a DCI comprising an energy saving indication. As discussed above, based on the base station transmitting the DCI with the energy saving indication, the base station may stop transmitting the periodic CSI-RS resources. So, in response to receiving the DCI including the energy saving indication, the wireless device may transmit, for the periodic CSI reporting, second periodic CSI report based on the SSBs (that are periodically received from the base station). Additionally, the second periodic CSI report are not based on (e.g., exclude CSI related measurements of) the periodic CSI RS resources.

In an example, a wireless device may receive, from a base station, RRC messages comprising configuration parameters of periodic CSI reporting, wherein, the configuration parameters comprise parameters of periodic CSI-RS resources and the periodic CSI-RS resources comprise a first periodic CSI-RS resource used for energy saving state. The wireless device may transmit, for the periodic CSI reporting, first periodic CSI report based on receiving the periodic CSI-RS resources. The wireless device may receive a DCI indicating a transition to the energy saving state. For example, the base station may transmit the DCI indicating to transition to the energy saving state in which the base station may stop transmitting periodic CSI-RS resources except the first periodic CSI-RS resource. Based on receiving the DCI indicating to transition to the energy saving state, the wireless device may stop receiving the periodic CSI-RS resources except the first periodic CSI-RS resource. The wireless device may transmit, for the periodic CSI reporting, second periodic CSI report based on the first periodic CSI-RS resource of the periodic CSI-RS resources. Additionally, the second periodic CSI report are not based on (e.g., exclude CSI related measurements of) other periodic CSI-RS resources of the periodic CSI-RS resources.

According to an example embodiment, each CSI-RS resource of the CSI-RES resource set is associated with one or more parameters comprising at least one of: a CSI-RS resource index identifying the CSI-RS resource, parameters of time and frequency resources for mapping the CSI-RS resource, one or more power control parameters, a scrambling identifier, a periodicity and offset indicator and a quasi-correction information indication. The parameters of time and frequency resources for mapping the CSI-RS resource comprise at least one of: indications of one or more subcarriers of a resource block (RB) for the CSI-RS resource, indication of a number of ports for the CSI-RS, indication of first (starting) OFDM symbol in a slot for the CSI-RS resource, a code-division multiplexing (CDM) type indication, a density indication and a frequency band indication. The frequency band indication indicates: a starting RB of a plurality of RBs, of a bandwidth part, for the CSI-RS resource, and a number of the plurality RBs for the CSI-RS resource.

According to an example embodiment, the CSI-RS resource set is associated with one or more parameters comprising at least one of: a CSI-RS resource set identifier identifying the CSI-RS resource set, CSI-RS resource indexes identifying the CSI-RS resources, and a repetition indicator.

According to an example embodiment, the base station may skip, based on the command, a transmission of the first CSI-RS resources of the CSI-RS resource set on the cell.

According to an example embodiment, the command comprises at least one of: DCI, MAC CE and/or RRC message.

According to an example embodiment, the DCI is different from at least one of: DCI format 2_0 for indication of slot format, available RB sets, COT duration and search space set group switching, DCI format 2_1 for indication of downlink pre-emption, DCI format 2_4 for indication of uplink cancellation and DCI format 2_6 for indication of power saving information outside DRX Active time for one or more wireless devices.

According to an example embodiment, the DCI has a same DCI size with at least one of: the DCI format 2_0, the DCI format 2_1, DCI format 2_4 for indication of uplink cancellation, DCI format 2_6 for indication of power saving information outside DRX Active time for one or more wireless devices.

According to an example embodiment, the DCI is with a DCI format comprising a bitmap, wherein each bit of the bitmap corresponds to a respective CSI-RS resource of the CSI-RS resources of the CSI-RS resource set and a bit of the bitmap indicates whether to switch off a corresponding CSI-RS resource of the CSI-RS resources of the CSI-RS resource set.

According to an example embodiment, the DCI is with a DCI format comprising a bit field indicating a CSI-RS switching on/off pattern of a plurality of CSI-RS switching on/off patterns. The plurality of CSI-RS switching on/off patterns comprise a first CSI-RS switching on/off pattern wherein CSI-RS resources with even CSI-RS indexes, of the CSI-RS resources in the CSI-RS resource set, are switched on for transmissions in slots with even slot number and CSI-RS resources with odd CSI-RS indexes, of the CSI-RS resources in the CSI-RS resource set, are switched off for transmissions in the slots with even slot number. The plurality of CSI-RS switching on/off patterns comprise a second CSI-RS switching on/off pattern wherein CSI-RS resources with even CSI-RS indexes, of the CSI-RS resources in the CSI-RS resource set, are switched off for transmission in slots with even slot number and CSI-RS resources with odd CSI-RS indexes, of the CSI-RS resources in the CSI-RS resource set, are switched on for transmissions in the slots with even slot number.

According to an example embodiment, the transmitting the CSI-RS resource set comprises transmitting the CSI-RS resources comprised in the CSI-RS resource set. The transmitting the CSI-RS resources, in response to a repetition indicator of the CSI-RS resource set being set to a first value, comprises transmitting a first CSI-RS resources, of the CSI-RS resources, with a first transmission spatial domain filter and transmitting a first CSI-RS resources, of the CSI-RS resources, with a second transmission spatial domain filter. The first transmission spatial domain filter is different from the second transmission spatial domain filter. The transmitting the CSI-RS resources, in response to a repetition indicator of the CSI-RS resource set being set to a second value, comprises transmitting a first CSI-RS resources, of the CSI-RS resources, with a transmission spatial domain filter and transmitting a first CSI-RS resources, of the CSI-RS resources, with the same transmission spatial domain filter.

According to an example embodiment, the base station transmits the DCI via a second cell. The second cell is a primary cell. In an example, the second cell is a secondary cell.

According to an example embodiment, the base station transmits the DCI via the cell. The cell is a primary cell of a plurality of cells comprising one or more secondary cells.

According to an example embodiment, the base station may receive, from a wireless device, a wireless device assistance information indicating a transition of the base station from a non-energy-saving state to an energy saving state. The base station transmits the DCI based on receiving the wireless device assistance information. The wireless device assistance information is a second RRC message transmitted from the wireless device to the base station. The wireless device assistance information is an uplink control information (UCI) transmitted via a physical uplink channel (PUCCH and/or PUSCH) to the base station.

According to an example embodiment, the messages comprise RRC message and/or SIB1 message.

According to an example embodiment, the base station transmits the CSI-RS resources with a first transmission periodicity based on the base station being in a non-energy-saving state. The non-energy-saving state comprises a time duration when the base station transmits downlink signals with a first transmission power and a first number of beams and receives uplink signals. The downlink signals comprise at least one of: SSBs/SIBs/PDSCH/PDCCH/CSI-RS/DM-RS. The uplink signals comprise at least one of: CSI reports/PUSCH/PUCCH/SRS/RACH.

According to an example embodiment, the energy saving indication indicates a transition of the base station from the non-energy-saving state to an energy saving state. The configuration parameters indicate the at least second CSI-RS resource, of the CSI-RS resources of the CSI-RS resource set, for transmission in the energy saving state. The at least second CSI-RS resource may have a lowest CSI-RS index among CSI-RS indexes of the CSI-RS resources of the CSI-RS resource set. The at least second CSI-RS resource may have a longest transmission periodicity among transmission periodicities of the CSI-RS resources of the CSI-RS resource set. The at least second CSI-RS resource may have a smallest transmission density among transmission densities of the CSI-RS resources of the CSI-RS resource set. The at least second CSI-RS resource may have a smallest transmission bandwidth among transmission bandwidths of the CSI-RS resources of the CSI-RS resource set. The configuration parameters indicate the first CSI-RS resources, of the CSI-RS resources of the CSI-RS resource set, for switching off transmission in the energy saving state.

According to an example embodiment, the energy saving state may comprise a second time duration when the base station transmits the downlink signals with a second transmission power, wherein the second transmission power is less than the first transmission power. The energy saving state may comprise a second time duration when the base station transmits the downlink signals with a second number of beams, wherein the second number is smaller than the first number. The energy saving state may comprise a second time duration when the base station stops the receiving uplink signals.

According to an example embodiment, the base station may transition from the non-energy-saving state to the energy saving state based on the transmitting the DCI.

According to an example embodiment, the messages further comprise configuration parameters of a search space for transmitting the DCI comprising the energy saving indication. The search space may be a type 0 common search space, wherein the configuration parameters is comprised in master information block (MIB) message, wherein the base station transmits the MIB message via a physical broadcast channel (PBCH) and indicating system information of the base station. The search space may be a type 0 common search space, wherein the configuration parameters is comprised in system information block 1 (SIB1) message, wherein the base station transmits the SIB1 message, scheduled by a physical downlink control channel, indicating at least one of: information for evaluating if a wireless device is allowed to access a cell of the base station, information for scheduling of other system information, radio resource configuration information that is common for all wireless devices and barring information applied to access control. The search space may be a type 2 common search space, wherein the type 2 common search space is further used for downlink paging message transmission. The search space may be a type 3 common search space, wherein the type 3 common search space is further used for transmission, via a cell, of a second group common DCI with CRC bits scrambled by at least one of: INT-RNTI/SFI-RNTI/CI-RNTI/TPC-PUSCH-RNTI/TPC-PUCCH-RNTI/TPC-SRS-RNTI. In response to the cell being a primary cell of a plurality of cells of the base station, the type 3 common search space is further used for transmission of a second group common DCI with CRC bits scrambled by at least one of: PS-RNTI/C-RNTI/MCS-C-RNTI/CS-RNTI.

According to an example embodiment, the configuration parameters comprise a RNTI for a transmission of the DCI comprising the energy saving indication, wherein the DCI is a group common DCI. The base station may transmit the DCI comprising the energy saving indication based on CRC bits of the DCI being scrambled by the RNTI.

According to an example embodiment, the DCI may have a same DCI format as a DCI format 1_0.

According to an example embodiment, the RNTI associated with the DCI is different from a C-RNTI identifying a specific wireless device.

According to an example embodiment, the DCI may have a same DCI format as at least one of: DCI format 2_0 for indication of slot format, available resource block (RB) sets, channel occupancy time (COT) duration and search space set group switching, DCI format 2_1 for indication of downlink pre-emption, DCI format 2_4 for indication of uplink cancellation and DCI format 2_6 for indication of power saving information outside DRX Active time for one or more wireless devices.

According to an example embodiment, the RNTI associated with the DCI may be different from: a slot format indication RNTI (SFI-RNTI) associated with the DCI format 2_0, an interruption RNTI (INT_RNTI) associated with DCI format 2_1, a cancellation RNTI (CI-RNTI) associated with the DCI format 2_4 and a power saving RNTI (PS-RNTI) associated with the DCI format 2_6.

According to an example embodiment, the configuration parameters may comprise a PDCCH monitoring periodicity value for the search space, wherein the PDCCH monitoring periodicity value indicates a number of slots between two contiguous transmissions of two DCIs for the energy saving indication. The base station may transmit the DCI at a beginning slot of the number of slots. The DCI may comprise a DCI field indicating a second transmission periodicity of the CSI resource set. The DCI field may indicate a ratio between the second transmission periodicity and the first transmission periodicity.

According to an example embodiment, the base station transmits the command at a first slot. The base station may switch off, based on transmitting the command at the first slot, the first CSI-RS resources at a second slot, wherein a time gap between the first slot and the second slot is greater than a time threshold for an application of a transition from the non-energy-saving state to the energy saving state. The time threshold may be configured in the messages. The wireless device may transmit to the base station, a RRC message indicating the time threshold. The RRC message may comprise a wireless device capability information comprising the time threshold. The RRC message may comprise a wireless device assistance information comprising the time threshold.

What is claimed is:

1. A wireless device comprising:
one or more processors; and
memory storing instructions that, when executed by the one or more processors, cause the wireless device to:
receive one or more radio resource control (RRC) messages comprising configuration parameters of:
a first number of periodic channel state information (CSI) reference signals (P-CSI-RSs) of a cell; and
a number of synchronization signal (SS) blocks (SSBs) of the cell; during a network non-energy-saving state of the cell, receive via the cell:
the number of the SSBs; and
the first number of the P-CSI-RSs;
receive, via a type 3 common search space, downlink control information (DCI) comprising a network energy saving indication indicating a transition of the cell from the network non-energy-saving state to a network energy saving state of the cell;
based on receiving the DCI and during the network energy saving state:
continue to receive the same number of the SSBs;
stop receiving a second number of the P-CSI-RSs from the first number of the P-CSI-RSs; and
receive a third number of the P-CSI-RSs from the first number of the P-CSI-RSs; and
transmit a CSI report obtained based on the third number of the P-CSI-RSs.

2. The wireless device of claim 1, wherein the DCI indicates that the second number of the P-CSI-RSs are switched off from the first number of the P-CSI-RSs.

3. The wireless device of claim 1, wherein the third number of the P-CSI-RSs does not comprise any RS resource of the second number of the P-CSI-RSs.

4. The wireless device of claim 1, wherein the one or more RRC messages configure the third number of the P-CSI-RSs of the first number of the P-CSI-RSs.

5. A base station comprising:
one or more processors; and
memory storing instructions that, when executed by the one or more processors, cause the base station to:
transmit to a wireless device, one or more radio resource control (RRC) messages comprising configuration parameters of:
a first number of periodic channel state information (CSI) reference signals (P-CSI-RSs) of a cell; and
a number of synchronization signal (SS) blocks (SSBs) of the cell;
during a network non-energy-saving state of the cell, transmit to the wireless device:
the number of the SSBs; and
the first number of the P-CSI-RSs;
transmit, to the wireless device and via a type 3 common search space, downlink control information (DCI) comprising a network energy saving indication indicating a transition of the cell from the network non-energy-saving state to a network energy saving state of the cell;
based on transmitting the DCI and during the network energy saving state:
continue to transmit the same number of the SSBs;
stop transmitting, via the cell, a second number of the P-CSI-RSs from the first number of the P-CSI-RSs; and
transmit, via the cell, a third number of the P-CSI-RSs from the first number of the P-CSI-RSs; and
receive, from the wireless device, a CSI report obtained based on the third number of the P-CSI-RSs.

6. The base station of claim 5, wherein the DCI indicates that the second number of the P-CSI-RSs are switched off from the first number of the P-CSI-RSs.

7. The base station of claim 5, wherein the third number of the P-CSI-RSs does not comprise any RS resource of the second number of the P-CSI-RSs.

8. The base station of claim 5, wherein the one or more RRC messages configure the third number of the P-CSI-RSs of the first number of the P-CSI-RSs.

9. A non-transitory computer-readable medium comprising instructions that, when executed by one or more processors of a wireless device, cause the wireless device to:
receive one or more radio resource control (RRC) messages comprising configuration parameters of:
a first number of periodic channel state information (CSI) reference signals (P-CSI-RSs) of a cell; and
a number of synchronization signal (SS) blocks (SSBs) of the cell; during a network non-energy-saving state of the cell, receive via the cell:

the number of the SSBs; and the first number of the P-CSI-RSs;

receive, via a type 3 common search space, downlink control information (DCI) comprising a network energy saving indication indicating a transition of the cell from the network non-energy-saving state to a network energy saving state of the cell;

based on receiving the DCI and during the network energy saving state:

continue to receive the same number of the SSBs;

stop receiving a second number of the P-CSI-RSs from the first number of the P-CSI-RSs; and receive a third number of the P-CSI-RSs from the first number of the P-CSI-RSs; and transmit a CSI report obtained based on the third number of the P-CSI-RSs.

10. The non-transitory computer-readable medium of claim 9, wherein the DCI indicates that the second number of the P-CSI-RSs are switched off from the first number of the P-CSI-RSs.

11. The non-transitory computer-readable medium of claim 9, wherein the third number of the P-CSI-RSs does not comprise any RS resource of the second number of the P-CSI-RSs.

12. The non-transitory computer-readable medium of claim 9, wherein the one or more RRC messages configure the third number of the P-CSI-RSs of the first number of the P-CSI-RSs.

13. The wireless device of claim 1, wherein:

the cell is a cell of a base station; and during the network energy saving state, the base station stops transmitting the second number of the P-CSI-RSs on the cell and transmits the third number of the P-CSI-RSs on the cell.

14. The base station of claim 5, wherein:

the transmitting the DCI is to a group of wireless devices in the cell;

the group of wireless devices comprises the wireless device; and the DCI is a group common DCI.

15. The non-transitory computer-readable medium of claim 9, wherein:

the cell is a cell of a base station; and during the network energy saving state, the base station stops transmitting the second number of the P-CSI-RSs on the cell and transmits the third number of the P-CSI-RSs on the cell.

16. The wireless device of claim 1, wherein:

the configuration parameters comprise transmission parameters of the SSBs; and the SSBs are received based on the same transmission parameters during the network energy saving state and the network non-energy-saving state of the cell.

17. The wireless device of claim 16, wherein the transmission parameters indicate at least one of:

a periodicity of the SSBs;

the number of the SSBs; or transmission power of the SSBs.

18. The base station of claim 5, wherein:

the configuration parameters comprise transmission parameters of the SSBs; and the SSBs are transmitted based on the same transmission parameters during the network energy saving state and the network non-energy-saving state of the cell.

19. The base station of claim 18, wherein the transmission parameters indicate at least one of:

a periodicity of the SSBs;

the number of the SSBs; or transmission power of the SSBs.

20. The non-transitory computer-readable medium of claim 9, wherein:

the configuration parameters comprise transmission parameters of the SSBs; and the SSBs are received based on the same transmission parameters during the network energy saving state and the network non-energy-saving state of the cell.

* * * * *